United States Patent [19]

Plach et al.

[11] Patent Number: 5,480,581

[45] Date of Patent: * Jan. 2, 1996

[54] LIQUID-CRYSTALLINE MEDIUM

[75] Inventors: Herbert Plach, Darmstadt; Ulrich Finkenzeller, Plankstadt; Volker Reiffenrath, Rossdorf; Eike Poetsch, Mühltal; Bernhard Rieger; Hiroshi Numata, both of Yokohama, all of Japan

[73] Assignee: Merck Patent Gesellschaft mit Beschrankter Haftung, Darmstadt, Germany

[ * ] Notice: The portion of the term of this patent subsequent to Mar. 28, 2012, has been disclaimed.

[21] Appl. No.: 224,377

[22] Filed: Apr. 7, 1994

Related U.S. Application Data

[63] Continuation of Ser. No. 781,151, Oct. 31, 1991, abandoned.

[30] Foreign Application Priority Data

Aug. 3, 1990 [DE] Germany .......................... 40 24 760.0
Mar. 6, 1991 [DE] Germany .......................... 41 07 119.0

[51] Int. Cl.⁶ .......................... C09K 19/30; C09K 19/12
[52] U.S. Cl. .................. 252/299.63; 252/299.66
[58] Field of Search .......................... 252/299.63, 299.66

[56] References Cited

U.S. PATENT DOCUMENTS

| | | | |
|---|---|---|---|
| 5,032,313 | 7/1991 | Goto et al. .......................... | 252/299.63 |
| 5,230,829 | 7/1993 | Bartmann et al. .................. | 252/299.63 |
| 5,286,411 | 2/1994 | Rieger et al. ...................... | 252/299.63 |
| 5,308,541 | 5/1994 | Hittich et al. ...................... | 252/299.63 |
| 5,308,542 | 5/1994 | Poetsch et al. ..................... | 252/299.63 |
| 5,308,543 | 5/1994 | Sasaki et al. ....................... | 252/299.63 |

FOREIGN PATENT DOCUMENTS 9001056  2/1990  WIPO .

*Primary Examiner*—Gary L. Geist
*Assistant Examiner*—C. Harris
*Attorney, Agent, or Firm*—Millen, White, Zelano, & Branigan

[57] ABSTRACT

The invention relates to a liquid-crystalline medium based on a mixture of polar compounds having positive dielectric anisotropy, characterized in that it contains one or more compounds of the general formula I

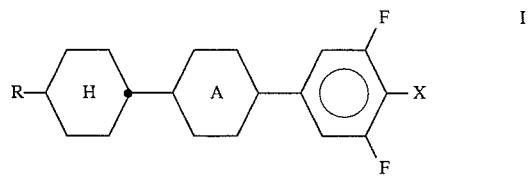

in which X is fluorine, chlorine, $CF_3$, $OCF_3$ or $OCHF_2$, ring A is trans-1,4-cyclohexylene or 1,4-phenylene, and R is alkyl, oxaalkyl, fluoroalkyl or alkenyl, in each case having up to 7 carbon atoms.

23 Claims, No Drawings

LIQUID-CRYSTALLINE MEDIUM

This application is a continuation of application Ser. No. 07/781,151, filed Oct. 31, 1991, abandoned which is based on international application PCT/EP91/01337, filed Jul. 16, 1991 abandoned.

The present invention relates to a liquid-crystalline medium, to the use thereof for electrooptical purposes, and to displays containing this medium.

The main use of liquid crystals is as dielectrics in display devices since the optical properties of such substances can be affected by an applied voltage. Electrooptical devices based on liquid crystals are extremely well known to persons skilled in the art and may be based on various effects. Examples of devices of this type are cells having dynamic scattering, DAP cells (deformation of aligned phases), guest/host cells, TN cells having a twisted nematic structure, STN cells ("supertwisted nematic"), SBE cells ("super-birefringence effect") and OMI cells ("optical mode interference"). The most common display devices are based on the Schadt-Helfrich effect and have a twisted nematic structure.

The liquid-crystal materials must have good chemical and thermal stability and good stability towards electrical fields and electromagnetic radiation. Furthermore, the liquid-crystal materials should have low viscosity and give short addressing times, low threshold voltages and high contrast in the cells. Furthermore, at customary operating temperatures, i.e., in the broadest possible range above and below room temperature, they should have a suitable mesophase, for example a nematic or cholesteric mesophase for the abovementioned cells. Since liquid crystals are generally used as mixtures of a plurality of components, it is important that the components are readily miscible with one another. Further properties, such as the electrical conductivity, dielectric anisotropy and optical anisotropy, must meet various requirements depending on the cell type and the area of application. For example, materials for cells having a twisted nematic structure should have positive dielectric anisotropy and low electrical conductivity.

For example, the media desired for matrix liquid-crystal displays containing integrated nonlinear elements for switching individual image points (MLC displays) are those having high positive dielectric anisotropy, broad nematic phases, relatively low birefringence, very high specific resistance, good UV and temperature stability of the resistance and low vapor pressure.

Matrix liquid-crystal displays of this type are known. Examples of nonlinear elements which can be used to individually switch the individual image points are active elements (i.e., transistors). This is then referred to as an "active matrix", and a differentiation can be made between two types:

1. MOS (metal oxide semiconductor) transistors on a silicon wafer as substrate.
2. Thin-film transistors (TFTs) on a glass plate as substrate.

The use of monocrystalline silicon as a substrate material limits the display size since even the modular assembly of the various part displays results in problems at the joints.

In the case of the more promising type 2, which is preferred, the electrooptical effect used is usually the TN effect. A differentiation is made between two technologies: TFTs comprising compound semiconductors, such as for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counterelectrode. Compared with the size of the image point electrode, the TFT is very small and has virtually no adverse effect on the image. This technology can also be extended to fully color-compatible image displays, in which a mosaic of red, green and blue filters is arranged in such a manner that each filter element is located opposite a switchable image element.

The TFT displays usually operate as TN cells with crossed polarizers in transmission and are illuminated from the back.

The term MLC display here covers any matrix display containing integrated nonlinear elements, i.e., in addition to the active matrix, also displays containing passive elements such as varistors or diodes (MIM=metal-insulator-metal).

MLC displays of this type are particularly suitable for TV applications (for example pocket TV sets) or for high-information displays for computer applications (laptops) and in automobile or aircraft construction. In addition to problems with respect to the angle dependence of the contrast and the response times, problems result in MLC displays due to inadequate specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, Sept. 1984: A 210–288 Matrix LCD Controlled by Double Stage Diode Rings, p. 141 ff, Paris; STROMER, M., Proc. Eurodisplay 84, Sept. 1984: Design of Thin Film Transistors for Matrix Adressing of Television Liquid Crystal Displays, p. 145 ff, Paris]. As the resistance decreases, the contrast of an MLC display worsens and the problem of "after image elimination" may occur. Since the specific resistance of liquid crystal mixture generally decreases over the life of an MLC display due to interaction with the internal surfaces of the display, a high (initial) resistance is very important to give acceptable service lives. In particular in the case of low-voltage mixtures, it was hitherto not possible to achieve very high specific resistances. It is furthermore important that the specific resistance increases as little as possible with increasing temperature and after heating and/or exposure to UV radiation. In addition, certain applications require very low birefringence and other applications require high birefringence, low threshold voltages, relatively high surface tilt angles in order to avoid "reversed tilt" domains, low viscosity, broad nematic mesophases and good low-temperature stability. The MLC displays of the prior art thus do not satisfy current demands.

It has hitherto been possible to prepare liquid-crystalline media having birefringence and phase range values necessary for practical use (for example clearing point of $\geq 70°$) and having threshold voltages of about 1.8 volts if values of about 98% for the holding ratio under extreme conditions (for example after UV exposure) are desired.

Thus, there continues to be a great demand for MLC displays having very high specific resistance and at the same time a broad operating temperature range, short response times and low threshold voltage which do not have these disadvantages or only do so to a lesser extent.

For TN (Schadt-Helfrich) cells, media are desired which facilitate the following advantages in the cells:

broadened nematic phase range (in particular down to low temperatures), switchability at extremely low temperatures (outdoor use, automobiles, avionics), increased stability to UV radiation (longer life).

The media available from the prior art do not make it possible to achieve these advantages whilst simultaneously retaining the other parameters.

For supertwisted (STN) cells, media are desired which have a greater multiplexing ability and/or lower threshold voltages and/or broader nematic phase ranges (in particular at low temperatures). To this end, a further extension of the parameter latitude available (clearing point, smectic-nematic transition or melting point, viscosity, dielectric values, elastic values) is urgently desired.

The object of the invention is to provide media, in particular for MLC, TN or STN displays of this type, which do not have the abovementioned disadvantages or only do so to a lesser extent, and preferably simultaneously have very high specific resistances and low threshold voltages.

It has now been found that this object can be achieved if media according to the invention are used in displays.

The invention thus relates to a liquid-crystalline medium based on a mixture of polar compounds having positive dielectric anisotropy, characterized in that it contains one or more compounds of the general formula I

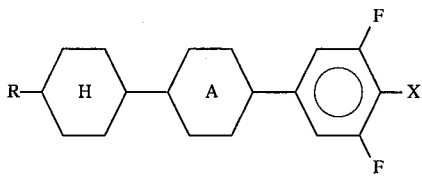

in which X is fluorine, chlorine, $CF_3$, $OCF_3$ or $OCHF_2$, ring A is-trans-1,4-cyclohexylene or 1,4-phenylene, and R is alkyl, oxaalkyl, fluoroalkyl or alkenyl, in each case having up to 7 carbon atoms.

The invention also relates to electrooptical displays (in particular STN or MLC displays having two plane-parallel outer plates which, together with a frame, form a cell, integrated nonlinear elements for switching individual image points on the outer plates, and a nematic liquid-crystal mixture of positive dielectric anisotropy and high specific resistance located in the cell) which contains media of this type, and to the use of these media for electrooptical purposes.

The liquid-crystal mixtures according to the invention facilitate a significant broadening of the parameter latitude available.

The media according to the invention are based on a mixture of polar compounds. These are preferably not highly polar compounds such as the known nitriles, but instead medium-polarity compounds having a rod-like structure containing two, three or four six-membered carbo- or heterocyclic rings which are linked to one another in the 1,4-position either directly or via divalent bridging members and are linked terminally to two wing groups. One of these wing groups is a nonpolar group such as, for example, alkyl, alkoxy, oxaalkyl, dioxaalkyl, alkenyl, fluoroalkyl or fluoroalkenyl, and the other wing group is a halogenated medium-polarity group, such as, for example, fluorine, chlorine, difluoroalkyl, higher fluorinated alkyl, alkoxy, alkenyl, alkenyloxy or alkanoyloxy.

The compounds of the formula I are representatives of this group of medium-polarity compounds, whose ring structures may also be laterally substituted by halogen, preferably fluorine.

The achievable combinations of clearing point, birefringence, viscosity at low temperature, thermal and UV stability and dielectric anisotropy are far superior to the previous materials from the prior art.

The requirement for a high clearing point, a nematic phase at −40° C. and a high Δε was previously only achievable to an unsatisfactory extent. Although systems such as, for example, ZLI-3119 have a comparable clearing point and comparatively favorable viscosities, they have, however, a Δε of only +3.

Other mixture systems have comparable viscosities and values of Δε, but only have clearing points in the region of 60° C.

The liquid-crystal mixtures according to the invention make it possible to simultaneously achieve low viscosities at low temperatures (≦600, preferably ≦550 mPa.S at −30° C.; ≦1,800, preferably ≦1,700 mPa.s at −40° C.) and dielectric anisotropy values of ≧3.5, preferably ≧4.0, clearing points above 65°, preferably above 70°, and a high value for the specific resistance, which allows excellent STN and MLC displays to be achieved.

It goes without saying that a suitable choice of components of the mixtures according to the invention also allows higher clearing points (for example above 90°) to be achieved at higher threshold voltage or lower clearing points to be achieved at lower threshold voltages while retaining the other advantageous properties. The MLC displays according to the invention preferably operate in the first transmission minimum of Gooch and Tarry [C. H. Gooch and H. A. Tarry, Electron. Lett. 10, 2–4, 1974; C. H. Gooch and H. A. Tarry, Appl. Phys., Vol. 8, 1575–1584, 1975]; in this case, a lower dielectric anisotropy in the second minimum is sufficient in addition to particularly favorable electrooptical properties, such as, for example, high gradient of the characteristic line and low angle dependence of the contrast (German Patent 30 22 818) at the same threshold voltage as in an analogous display. This allows significantly higher specific resistances to be achieved in the first minimum using the mixtures according to the invention than using mixtures containing cyano compounds. A person skilled in art can use simple routine methods to establish the birefringence necessary for a prespecified layer thickness of the MLC display through a suitable choice of the individual components and their proportions by weight.

The viscosity at 20° C. is preferably ≦18 mPa.s, in particular ≦15 mPa.s.

The nematic phase range is preferably at least 70°, in particular at least 80°. This range preferably extends at least from −30° to +85°.

Measurements of the "capacity holding ratio" (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention containing compounds of the formula I exhibit a considerably smaller decrease in the HR with increasing temperature than do analogous mixtures in which the compounds of the formula I are replaced by cyanophenyl-cyclohexanes of the formula

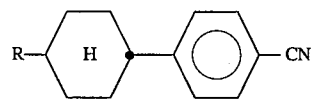

The UV stability of the mixtures according to the invention is also considerably better, i.e. they exhibit a significantly smaller decrease in the HR on exposure to UV radiation.

The threshold voltages $V_{10/0/20}$ achieved are generally ≦1.6 volts and preferably in the range from 1.4 to 1.6 volts.

The media according to the invention are distinguished by extremely favorable elastic constants and very favorable viscosity values in addition to an unusually broad nematic phase range, resulting, in particular when used in TFT displays, in significant advantages over prior-art media.

The media according to the invention are preferably based on a plurality (preferably two or more) compounds of the formula I, i.e. the proportion of these compounds is ≧25%, preferably ≧40%.

The individual compounds of the formulae I to XII and their subformulae which can be used in the media according to the invention are either known or can be prepared analogously to the known compounds.

Preferred embodiments are given below:

The medium additionally contains one or more compounds selected from the group comprising the general formulae II, III and IV:

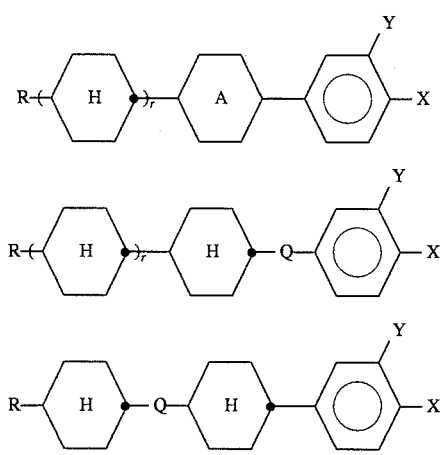

in which the individual radicals have the following meanings:

R: alkyl, oxaalkyl, fluoroalkyl or alkenyl, in each case having up to 7 carbon atoms
Q: —$C_2H_4$—, —$C_4H_8$— or —CO—O,
X: F, Cl, $CF_3$, $OCF_3$ or $OCHF_2$
Y: H or F
A: trans-1,4-cyclohexylene or 1,4-phenylene
r: 0 or 1.

The medium contains one or more compounds of the formula II and/or III in which r is 0:

The medium contains one or more compounds selected from the group comprising the general formulae V and VI:

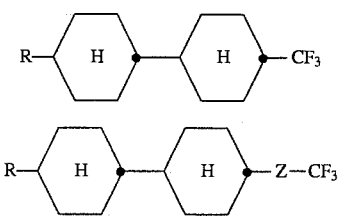

in which R is as defined above, and Z is —$C_2H_4$—, —CO—O— or —O—CO—.

The medium additionally contains one or more compounds selected from the group comprising the general formulae VII to XII:

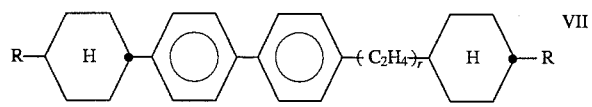

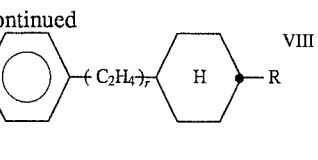

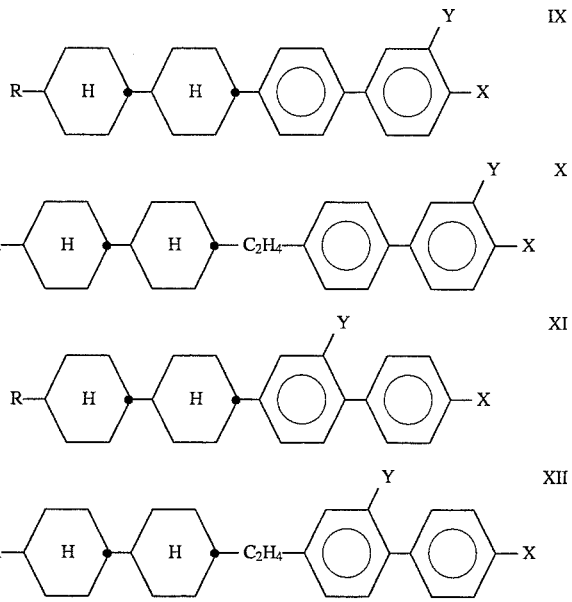

in which R, r, X and Y are each, independently of one another, as defined above.

The proportion of compounds of the formulae I to IV together in the total mixture is at least 50% by weight The proportion of compounds of the formula I in the total mixture is from 10 to 50% by weight The proportion of compounds of the formulae II to IV in the total mixture is from 30 to 70% by weight

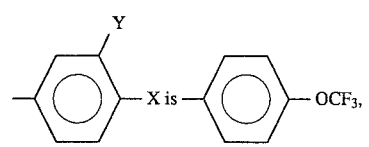

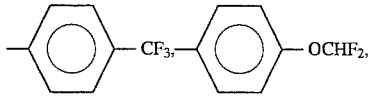

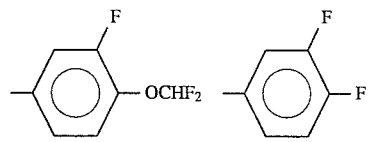

or

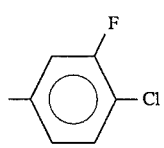

The medium contains compounds of the formulae II and III or IV

R is straight-chain alkyl or alkenyl having 2 to 7 carbon atoms

The medium essentially comprises compounds of the formulae I to IV

The medium contains further compounds, preferably selected from the following group:

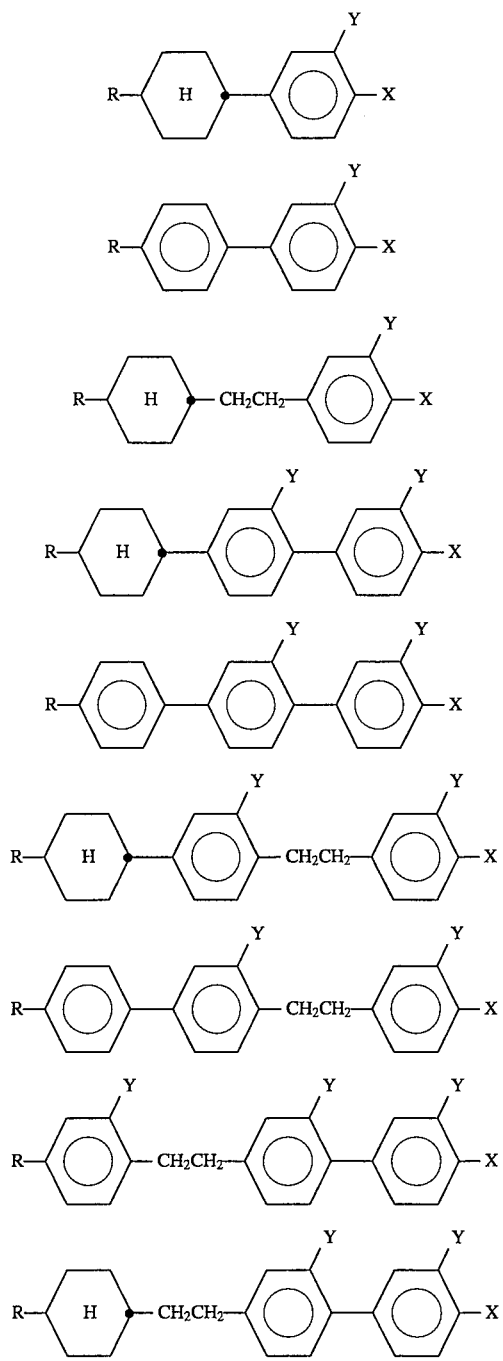

The I:(II+III+IV) ratio by weight is preferably from 1:4 to 1:1.

The medium essentially comprises compounds selected from the group comprising the general formulae I to XII.

It has been found that even a relatively a small proportion of compounds of the formula I mixed with conventional liquid-crystal materials, but in particular containing one or more compounds of the formula II, III and/or IV, results in a significant improvement in the addressing times and in lower threshold voltages, and at the same time broad nematic phases with low smectic-nematic transition temperatures are observed. The compounds of the formulae I to IV are colorless, stable and readily miscible with one another and with other liquid-crystal materials.

Depending on the choice of specific compounds of the formula I or combinations of a plurality of types of compounds of the formula I, the compounds according to the invention can be decisively improved for various requirements. The table below shows the effect of various compounds of the formula I on selected, important parameters, an increasing number of + signs indicating an increasingly positive effect, 0 indicating an indifferent effect and − denoting an impairment of the parameter indicated. Since it is always necessary to make compromises when improving LC media, however, even compounds with "−" for one parameter are extremely helpful in developing the mixture if their concentration is chosen appropriately.

Preferred media simultaneously contain compounds of the formula A

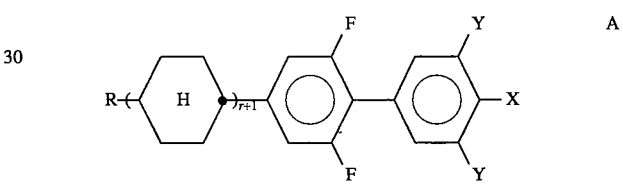

in which R is alkyl, oxaalkyl, fluoroalkyl or alkenyl, in each case having up to 7 carbon atoms; r is 0 or 1; X is F, Cl, $CF_3$, $OCF_3$ or $OCHF_2$; and Y is H or F.

r is preferably 0. X is preferably F, Cl, $OCF_3$ or $OCHF_2$. The following combinations of X and Y are particularly preferred:

| Y | X | Y | |
|---|---|---|---|
| F | F | H | (a) |
| H | $OCF_3$ | H | (b) |
| F | $OCF_3$ | H | (c) |
| F | $OCHF_2$ | H | (d) |

Particular preference is given to combinations of the compounds of the formula I where A=cyclohexylene and X=$OCHF_2$ with A (a) due to the particularly low birefringence and simultaneously low threshold voltage. Similarly advantageous are A (b) with compounds I where A=cyclohexylene and X=$CF_3$.

The preferred compounds of the formula A

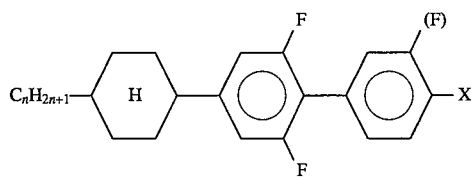

are denoted by the acronym CUP-nX(.F):

| Formula I | | | Nematic phase | Threshold | Birefringence low Δn | Birefringence high Δn | Viscosity | Low-temp. stability |
|---|---|---|---|---|---|---|---|---|
| A | X | Acronym | | | | | | |
| Cy | F | CCP-nF.F.F | + | + | ++ | | + | + |
| Ph | F | BCH-nF.F.F | ++ | ++ | + | | ++ | + |
| Cy | Cl | CCP-nCl.F.F | ++ | + | + | | 0 | ++ |
| Ph | Cl | BCH-nCl.F.F | ++ | ++ | | ++ | 0 | 0 |
| Cy | CF$_3$ | CCP-nCF$_3$.F.F | 0 | ++ | ++ | | + | − |
| Ph | CF$_3$ | BCH-nCF$_3$.F.F | + | ++ | 0 | 0 | + | − |
| Cy | OCHF$_2$ | CCP-nOCF$_2$.F.F | ++ | + | ++ | | ++ | ++ |
| Ph | OCHF$_2$ | BCH-nOCF$_2$.F.F | ++ | ++ | 0 | | + | ++ |
| Cy | OCF$_3$ | CCP-nOCF$_3$.F.F | ++ | ++ | ++ | | 0 | ++ |
| Ph | OCF$_3$ | BCH-nOCF$_3$.F.F | ++ | ++ | + | | 0 | ++ |
| Formula A (r = 0) R = C$_n$H$_{2n+1}$ | | | | | | | | |
| X | Y | Y | | | | | | |
| F | F | H | CUP-nF.F | + | ++ | ++ | 0 | + |
| OCF$_3$ | H | H | CUP-nOCF$_3$ | 0 | + | + | 0 | + |
| OCF$_3$ | F | H | CUP-nOCF$_3$.F | ++ | +++ | ++ | − | ++ |

The term "alkyl" includes straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" includes straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$- 4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably includes straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably includes straight-chain radicals of the formula $C_nH_{2n+1}$—O—$(CH_2)_m$ in which n and m are each, independently of one another, 1 to 6 or m is alternatively 0. n is preferably 1 and m is preferably from 1 to 6.

Through a suitable choice of the meanings of R, A, X and Y, the addressing times, the threshold voltage, the gradient of the transmission characteristic lines, etc., can be modified as desired. For example, 1E-alkenyl radicals, 3E-alkenyl radicals, 2E-alkenyloxyradicals and the like generally give shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. A —$CH_2CH_2$— group in $Z^1$ or $Z^2$ generally results in higher values of $k_{33}/k_{11}$ compared with a simple covalent bond. Higher values of $k_{33}/k_{11}$ facilitate, for example, flatter transmission characteristic lines in TN cells with a 90° twist (for achieving gray tones) and steeper transmission characteristic lines in STN, SBE and OMI cells (greater multiplexing ability), and vice versa.

The optimum mixing ratio of the compounds of the formulae I and II+III+IV depends substantially on the desired properties, on the choice of the components of the formulae I, II, III and/or IV and on the choice of any other components which may be present. Suitable mixing ratios within the abovementioned range can easily be determined from case to case.

The total amount of compounds of the formulae I to XII in the mixtures according to the invention is not crucial. The mixtures may therefore contain one or more further components in order to optimize various properties. However, the observed effect on the addressing times and the threshold voltage is generally greater the higher the total concentration of compounds of the formulae I to XII.

In a particularly preferred embodiment, the media according to the invention contain compounds of the formula II, III, V and/or VII (preferably II and/or III) in which X is $CF_3$, $OCF_3$ or $OCHF_2$. A favorable synergistic effect with the compounds of the formula I results in particularly advantageous properties.

For STN applications, the media preferably contain compounds selected from the group comprising the formulae V to VIII in which X is preferably $OCHF_2$.

The media according to the invention may furthermore contain a component A comprising one or more compounds of the general formula I' having a dielectric anisotropy of −1.5 to +1.5

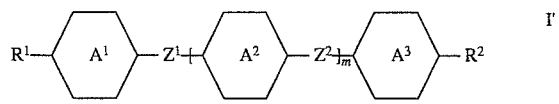

I' in which

R$^1$ and R$^2$ are each, independently of one another, n-alkyl, ω-fluoroalkyl or n-alkenyl having up to 9 carbon atoms, the rings A$^1$, A$^2$ and A$^3$ are each, independently of one another, 1,4-phenylene, 2- or 3-fluoro-1,4-phenylene, trans-1,4-cyclohexylene or 1,4-cyclohexenylene, Z$^1$ and Z$^2$ are each, independently of one another, —$CH_2CH_2$—, C≡C—, —CO—O—, —O—CO—, or a single bond, and m is 0, 1 or 2.

Component A preferably contains one or more compounds selected from the group comprising II1 to II7:

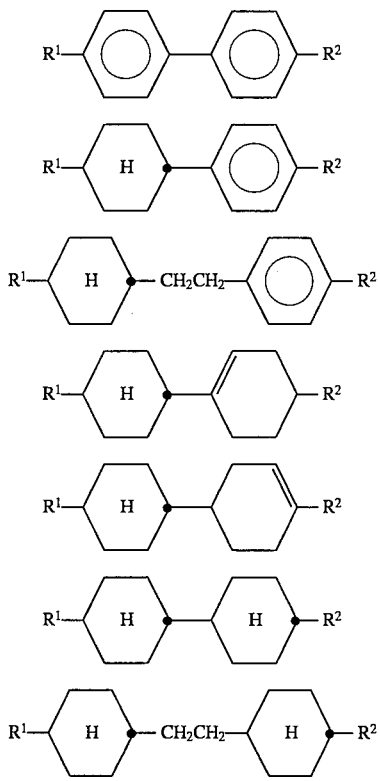

in which $R^1$ and $R^2$ are as defined under the formula I'.

Component A preferably additionally contains one or more compounds selected from the group comprising II8 to II20:

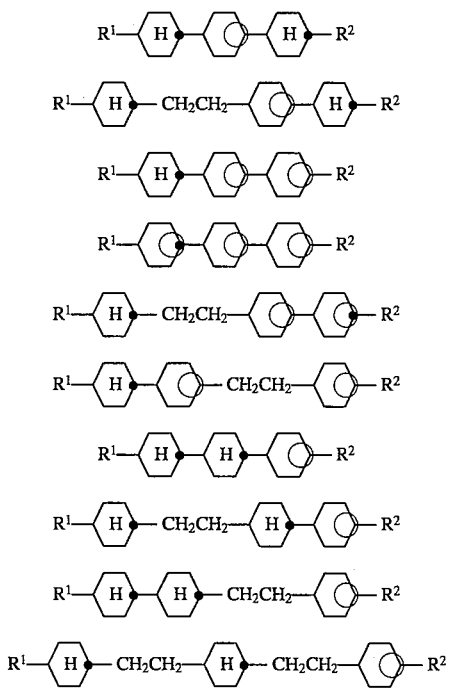

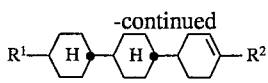
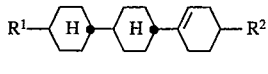
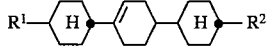

in which $R^1$ and $R^2$ are as defined under the formula I', and the 1,4-phenylene groups in II8 to II17 may each, independently of one another, also be monosubstituted or polysubstituted by fluorine.

Furthermore, component A preferably additionally contains one or more compounds selected from the group comprising II21 to II25:

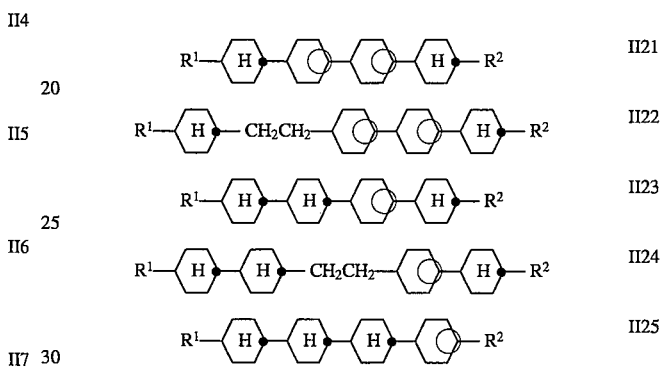

in which $R^1$ and $R^2$ are as defined under the formula I' and the 1,4-phenylene groups in II21 to II25 may each, independently of one another, also be monosubstituted or polysubstituted by fluorine.

Finally, preferred mixtures of this type are those in which component A contains one or more compounds selected from the group comprising II26 and II27:

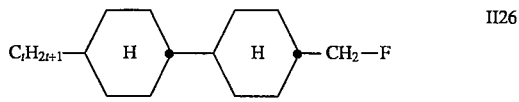
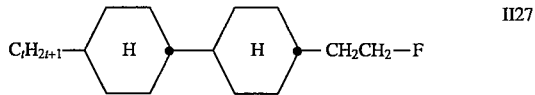

in which $C_lH_{2l+1}$ is a straight-chain alkyl group having up to 7 carbon atoms.

In some cases, the addition of compounds of the formula

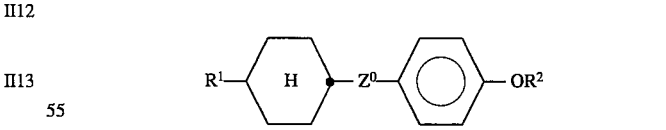

in which $R^1$ and $R^2$ are as defined under the formula I'
and

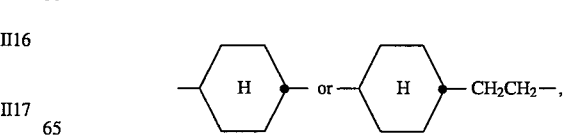

proves advantageous for suppressing smectic phases, although this may reduce the specific resistance. In order to achieve parameter combinations which are ideal for the application, a person skilled in the art can easily determine whether and, if yes, in what amount these compounds may be added. Normally, less than 15%, in particular 5–10%, are used.

Preference is also given to liquid-crystal mixtures which contain one or more compounds selected from the group comprising III' and IV':

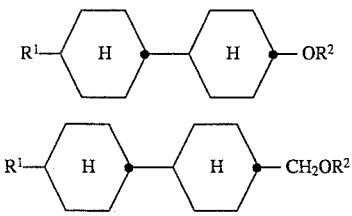

in which $R^1$ and $R^2$ are as defined under the formula I'.

The type and amount of the polar compounds having positive dielectric anisotropy is not crucial per se. A person skilled in the art can use simple routine experiments to select suitable materials form a wide range of known and, in many cases, also commercially available components and base mixtures. The media according to the invention preferably contain one or more compounds of the formula I"

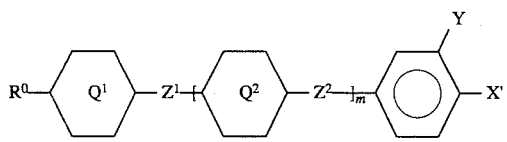

in which $Z^1$, $Z^2$ and m are as defined under the formula I', $Q^1$ and $Q^2$ are each, independently of one another, 1,4-phenylene, trans-1,4-cyclohexylene or 3-fluoro- 1,4-phenylene, or one of the radicals $Q^1$ and $Q^2$ is alternatively trans-1,3-dioxane-2,5-diyl, pyrimidine- 2,5-diyl, pyridine-2, 5-diyl or 1,4-cyclohexenylene.

$R^0$ is n-alkyl, n-alkenyl, n-alkoxyor n-oxaalkyl, in each case having up to 9 carbon atoms, Y is H or F and X' is CN, halogen, $CF_3$, $OCF_3$ or $OCHF_2$.

In a preferred embodiment, the media according to the invention for STN or TN applications are based on compounds of the formula I" in which X' is CN. It goes without saying that smaller or larger proportions of other compounds of the formula I" (X'≠CN) are also possible. For MLC applications, the media according to the invention preferably contain only up to about 10% of nitriles of the formula I" (but preferably no nitriles of the formula I", but instead compounds of the formula I' where X' is halogen, $CF_3$, $OCF_3$ or $OCHF_2$). These media are preferably based on the compounds of the formulae II to XII.

The construction of the STN and MLC displays according to the invention from polarizers, electrode base plates and electrodes with surface treatment corresponds to the construction which is conventional for displays of this type. The term conventional construction here is widely drawn and also covers all derivatives and modifications of the MLC display, in particular also matrix display elements based on poly-Si TFTs or MIMs.

An essential difference between the displays according to the invention and those customary hitherto based on the twisted nematic cell is, however, the choice of liquid-crystal parameters in the liquid-crystal layer.

The liquid-crystal mixtures which can be used according to the invention are prepared in a manner which is conventional per se. In general, the desired amount of the components used in a lesser amount is dissolved in the components making up the principal constituent, expediently at elevated temperature. It is also possible to mix solutions of the components in an organic solvent, for example acetone, chloroform or methanol, and, after thorough mixing, to remove the solvent again, for example by distillation.

The dielectrics may also contain other additives known to those skilled in the art and described in the literature. For example, 0–15% of pleochroic dyes or chiral dopes can be added. C denotes a crystalline phase, S a smectic phase, $S_B$ a smectic B phase, N a nematic phase and I the isotropic phase.

$V_{10}$ denotes the voltage for 10% transmission (viewing direction perpendicular to the plate surface). $t_{on}$ denotes the switch-on time and $t_{off}$ the switch-off time at an operating voltage corresponding to 2.5 times the value of $V_{10}$. An denotes the optical anisotropy and $n_o$ the refractive index. $\Delta\epsilon$ denotes the dielectric anisotropy ($\Delta\epsilon=\epsilon_{\|}-\epsilon_{\perp}$, where $\epsilon_{\|}$ is the dielectric constant parallel to the longitudinal molecular axes and $\epsilon_{\perp}$ is the dielectric constant perpendicular thereto. The electrooptical data were measured in a TN cell in the 1st minimum (i.e. at a d.Δn value of 0.4μ) at 20° C., unless expressly stated otherwise. The optical data were measured at 20° C., unless expressly stated otherwise.

The examples below are intended to illustrate the invention, but do not represent a limitation. Above and below, all temperatures are given in °C. The percentages are percent by weight.

In the present application and in the examples below, the structures of the liquid-crystal compounds are indicated by acronyms, with the transformation into chemical formulae taking place in accordance with Tables A and B below. All radicals $C_nH_{2n+1}$ and $C_mH_{2m+1}$ are straight-chain alkyl radicals containing n or m carbon atoms respectively. The coding in Table B is self evident. In Table A, only the acronym for the base structure is given. In individual cases, the acronym for the base structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nOmFF | $C_nH_{2n+1}$ | $OC_mH_{2m+1}$ | F | F |
| nmF | $C_nH_{2n+1}$ | $C_mH_{2m+1}$ | F | H |
| nCF3 | $C_nH_{2n+1}$ | $CF_3$ | H | H |
| nOCF3 | $C_nH_{2n+1}$ | $OCF_3$ | H | H |
| nOCF2 | $C_nH_{2n+1}$ | $OCHF_2$ | H | H |
| nS | $C_nH_{2n+1}$ | NCS | H | H |
| rVsN | $C_rH_{2r+1}-CH=CH-C_sH_{2s}-$ | CN | H | H |
| rEsN | $C_rH_{2r+1}-O-C_sH_{2s}-$ | CN | H | H |
| nNF | $C_nH_{2n+1}$ | CN | F | H |
| nAm | $C_nH_{2n+1}$ | $COOC_mH_{2m+1}$ | H | H |

The compounds listed below are preferred components for media according to the invention, in particular those in which $R^2$ and/or X is F, Cl, $CF_3$, $OCF_3$ or $OCHF_2$.

TABLE A
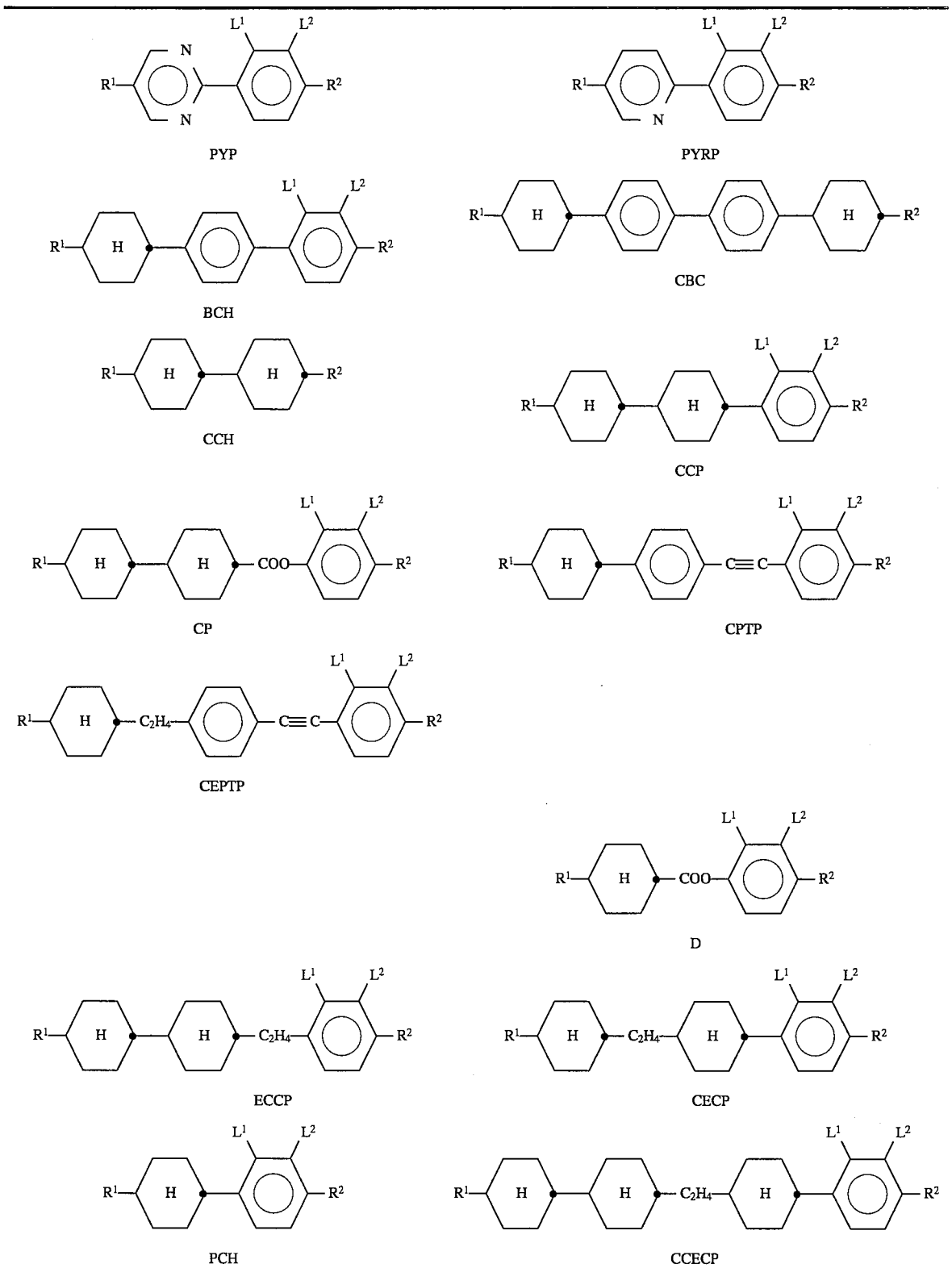

TABLE A-continued
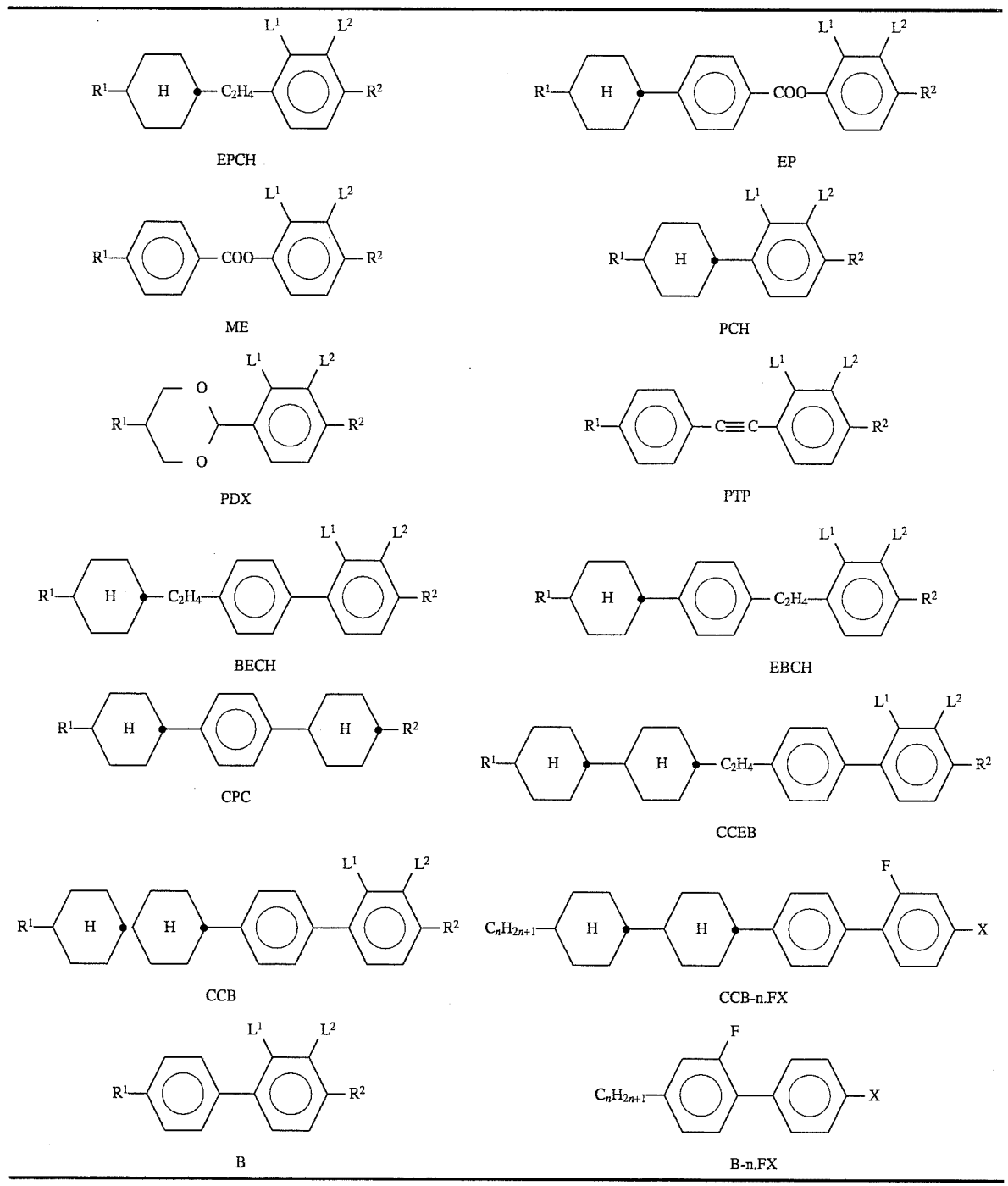
TABLE B
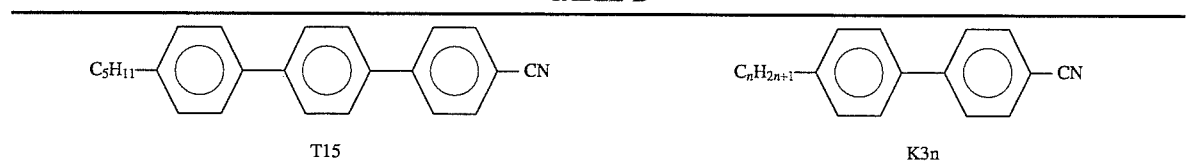

TABLE B-continued
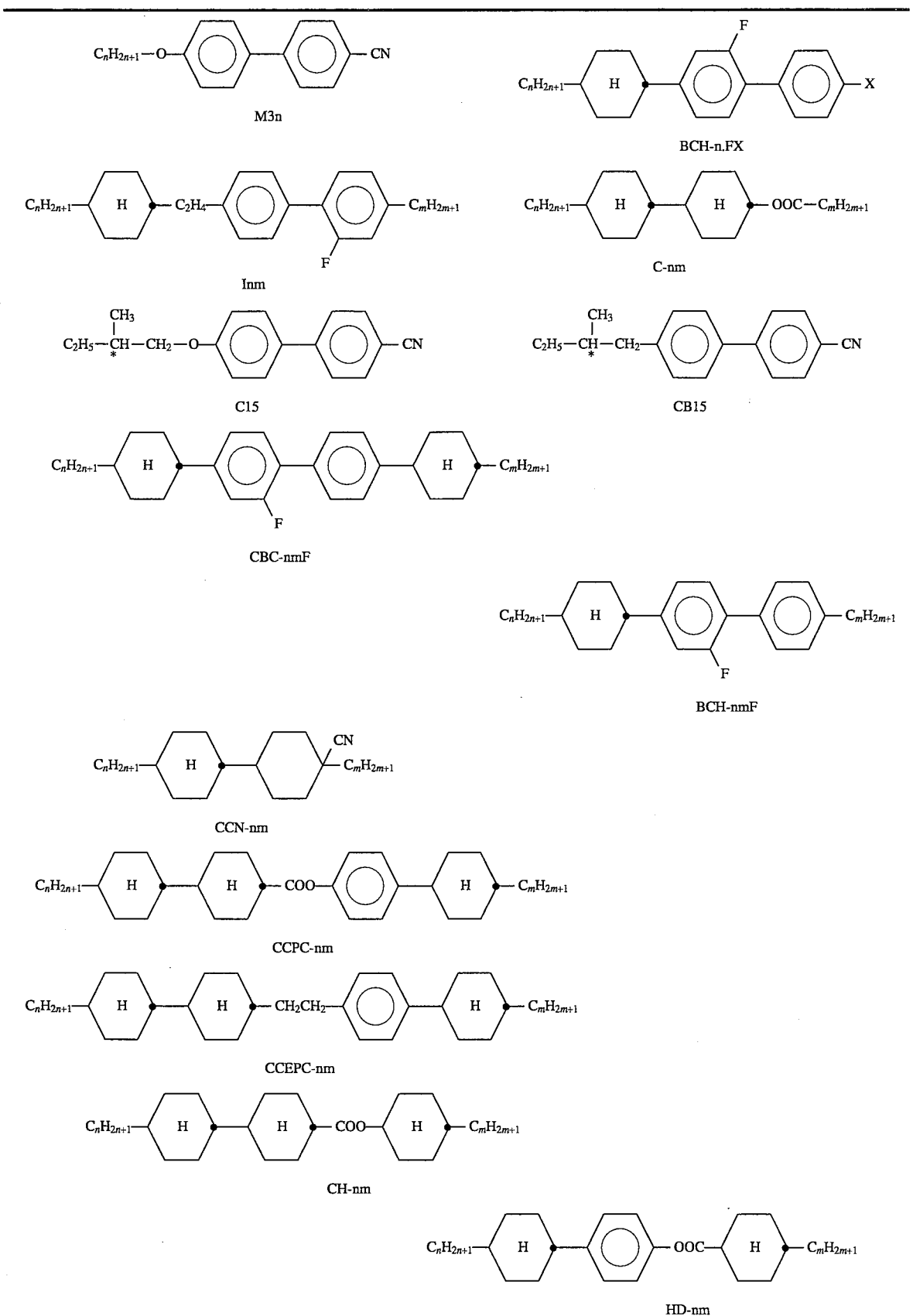

TABLE B-continued
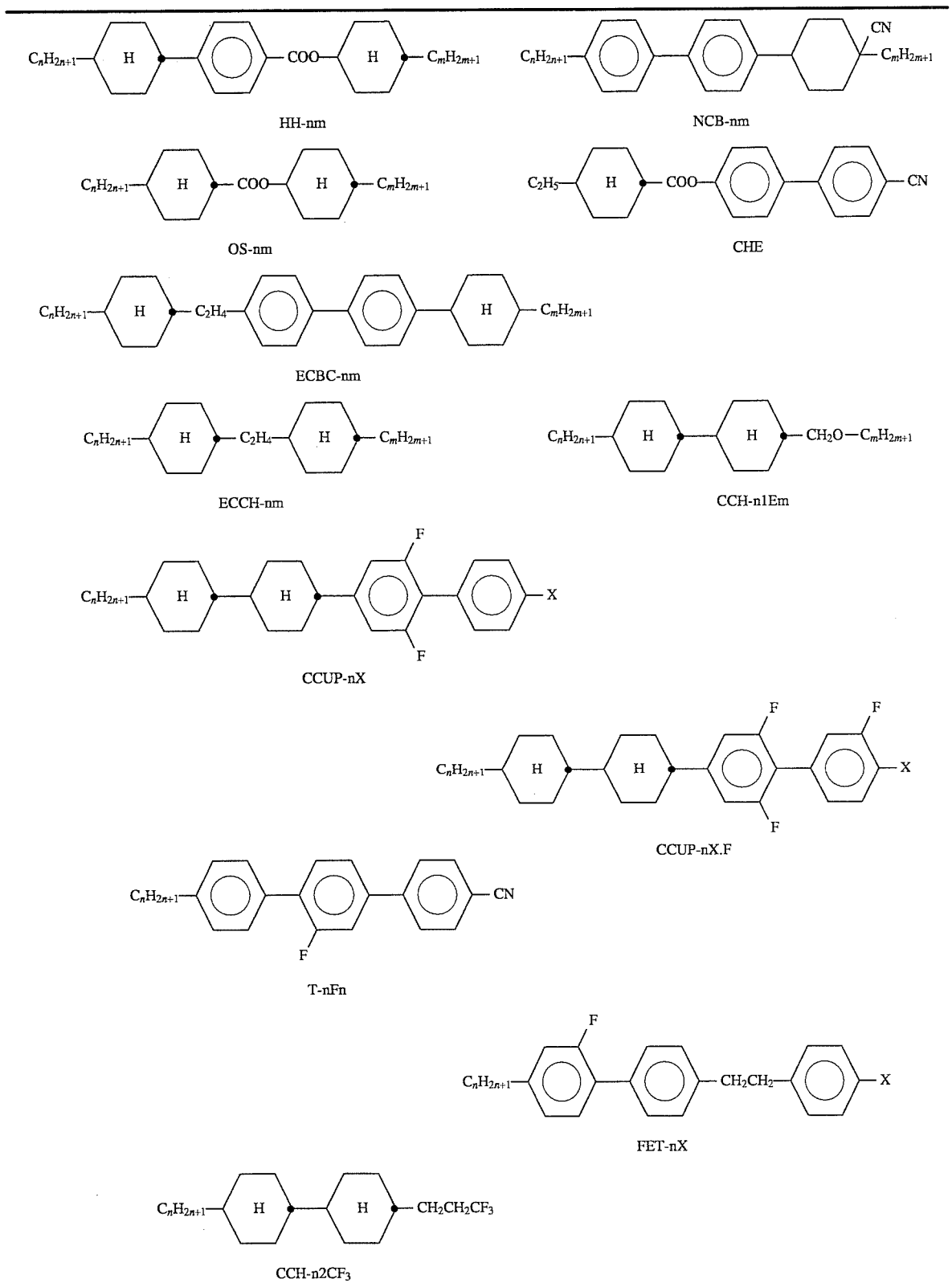

TABLE B-continued

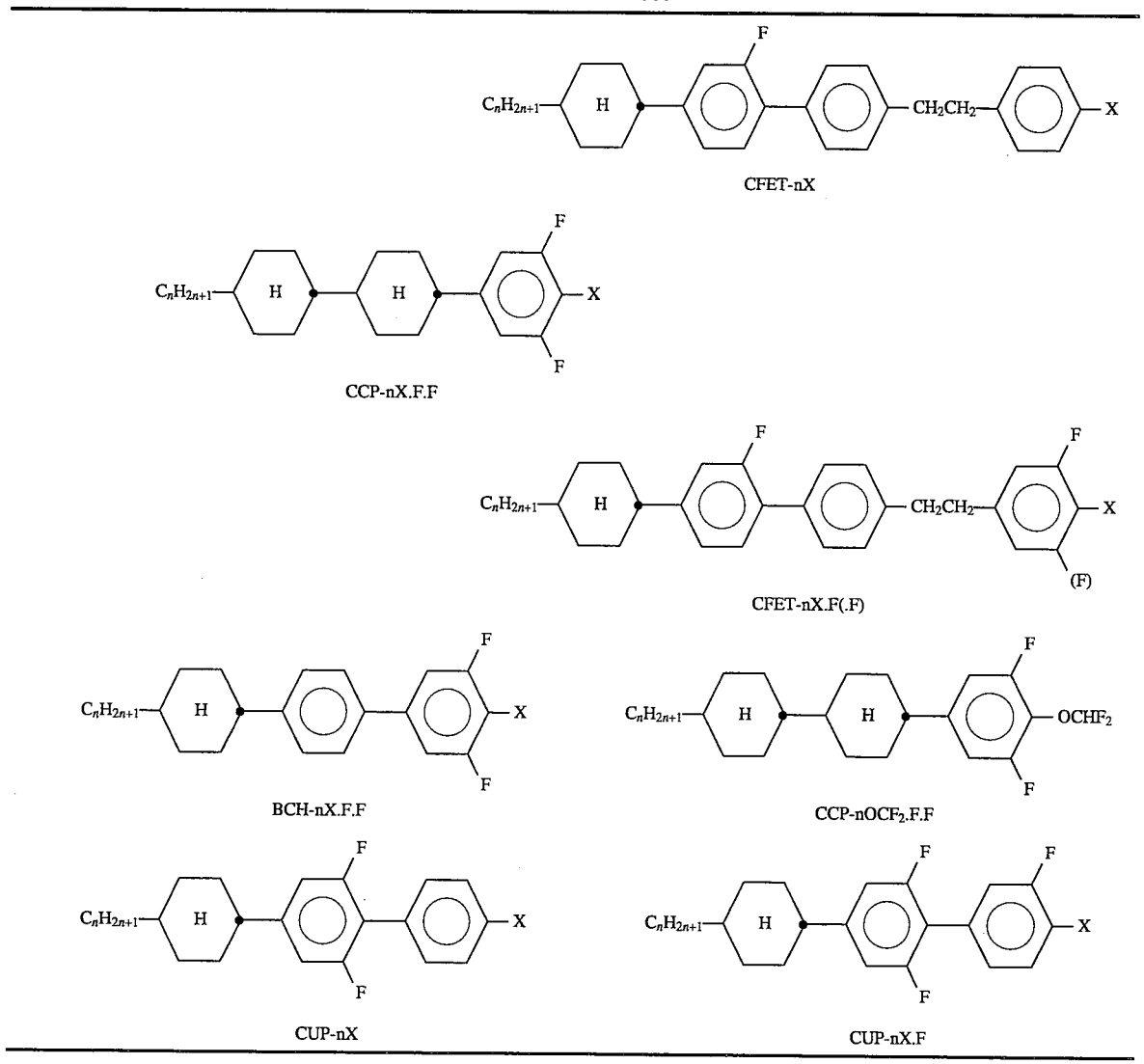

| Example 1 | | | |
|---|---|---|---|
| PCH-5F | 10.0% | S → N [°C.] | <−40 |
| PCH-6F | 7.0% | Clearing point [°C.] | +64 |
| PCH-7F | 15.0% | Viscosity 20° C. | 4 |
| CCP-20CF$_3$ | 10.0% | Δn (589 nm, 20° C.) | 0.0800 |
| CCP-30CF$_3$ | 12.0% | n$_e$ (589 nm, 20° C.) | 1.5576 |
| CCP-40CF$_3$ | 8.0% | V$_{(10,0,20)}$ | 1.61 |
| CCP-50CF$_3$ | 12.0% | V$_{(50,0,20)}$ | 2.04 |
| CCP-3F.F.F | 10.0% | V$_{(90,0,20)}$ | 2.66 |
| BCH-5F.F | 16.0% | | |
| Example 2 | | | |
| PCH-5F | 12.0% | S → N [°C.] | <−30 |
| PCH-7F | 8.0% | Clearing point [°C.] | +80 |
| CCP-20CF$_3$ | 10.0% | Viscosity 20° C. | — |
| CCP-30CF$_3$ | 12.0% | Δn (589 nm, 20° C.) | +0.0756 |
| CCP-40CF$_3$ | 8.0% | n$_e$ (589 nm, 20° C.) | 1.5489 |
| CCP-50CF$_3$ | 12.0% | V$_{(10,0,20)}$ | 1.66 |
| ECP-3F.F | 12.0% | V$_{(50,0,20)}$ | 2.12 |
| CCP-3F.F.F | 14.0% | V$_{(90,0,20)}$ | 2.73 |
| CCP-3F.F.F | 12.0% | | |
| Example 3 | | | |
| PCH-5F | 12.0% | S → N [°C.] | — |
| PCH-7F | 7.0% | Clearing point [°C.] | +78 |
| CCP-20CF$_3$ | 10.0% | Viscosity 20° C. | 16 |
| CCP-30CF$_3$ | 12.0% | Δn (589 nm, 20° C.) | 0.0844 |
| CCP-40CF$_3$ | 8.0% | n$_e$ (589 nm, 20° C.) | 1.5610 |
| CCP-50CF$_3$ | 12.0% | V$_{(10,0,20)}$ | 1.61 |
| BCH-3F.F | 8.0% | V$_{(50,0,20)}$ | 2.06 |
| BCH-5F.F | 6.0% | V$_{(90,0,20)}$ | 2.72 |
| CCP-3F.F.F | 13.0% | | |
| CCP-5F.F.F | 12.0% | | |
| Example 4 | | | |
| PCH-5F | 12.0% | S → N [°C.] | — |
| PCH-7F | 8.0% | Clearing point [°C.] | +77 |
| CCP-20CF$_3$ | 10.0% | Viscosity 20° C. | — |
| CCP-30CF$_3$ | 12.0% | Δn (589 nm, 20° C.) | +0.0847 |
| CCP-40CF$_3$ | 8.0% | n$_e$ (589 nm, 20° C.) | 1.5605 |
| CCP-50CF$_3$ | 12.0% | V$_{(10,0,20)}$ | 1.59 |
| BCH-3F.F.F | 14.0% | V$_{(50,0,20)}$ | — |
| ECCP-3F.F | 12.0% | V$_{(90,0,20)}$ | — |
| CCP-5F.F.F | 12.0% | | |
| Example 5 | | | |
| PCH-5F | 11.0% | S → N [°C.] | — |

-continued

| | | | |
|---|---|---|---|
| PCH-7F | 9.0% | Clearing point [°C.] | +75 |
| CCP-20CF$_3$ | 8.0% | Viscosity 20° C. | — |
| CCP-30CF$_3$ | 10.0% | Δn (589 nm, 20° C.) | 0.0876 |
| CCP-40CF$_3$ | 7.0% | n$_e$ (589 nm, 20° C.) | 1.5666 |
| CCP-50CF$_3$ | 10.0% | V$_{(10,0,20)}$ | 1.51 |
| BCH-3F.F | 10.0% | V$_{(50,0,20)}$ | 1.95 |
| BCH-5F.F | 10.0% | V$_{(90,0,20)}$ | 2.54 |
| CCP-3F.F.F | 13.0% | | |
| CCP-5F.F.F | 12.0% | | |

Example 6

| | | | |
|---|---|---|---|
| PCH-5F | 12.0% | S → N [°C.] | — |
| PCH-7F | 7.0% | Clearing point [°C.] | +76 |
| CCP-20CF$_3$ | 10.0% | Viscosity 20° C. | — |
| CCP-30CF$_3$ | 12.0% | Δn (589 nm, 20° C.) | 0.0835 |
| CCP-40CF$_3$ | 8.0% | n$_e$ (589 nm, 20° C.) | 1.5595 |
| CCP-50CF$_3$ | 12.0% | V$_{(10,0,20)}$ | 1.49 |
| BCH-3F.F.F | 8.0% | V$_{(50,0,20)}$ | 1.93 |
| BCH-5F.F | 6.0% | V$_{(90,0,20)}$ | 2.52 |
| CCP-3F.F.F | 13.0% | | |
| CCP-5F.F.F | 12.0% | | |

Example 7

| | | | |
|---|---|---|---|
| PCH-5F | 8.0% | S → N [°C.] | — |
| PCH-7F | 4.0% | Clearing point [°C.] | +81 |
| CCP-20CF$_3$ | 10.0% | Viscosity 20° C. | — |
| CCP-30CF$_3$ | 12.0% | Δn (589 nm, 20° C.) | +0.0907 |
| CCP-40CF$_3$ | 8.0% | n$_e$ (589 nm, 20° C.) | 1.5672 |
| CCP-50CF$_3$ | 12.0% | V$_{(10,0,20)}$ | 1.46 |
| BCH-3F.F | 14.0% | V$_{(50,0,20)}$ | — |
| BCH-5F.F.F | 10.0% | V$_{(90,0,20)}$ | — |
| CCP-3F.F.F | 10.0% | | |
| CCP-5F.F.F | 8.0% | | |
| ECCP-3F.F | 4.0% | | |

Example 8

| | | | |
|---|---|---|---|
| PCH-5F | 8.0% | S → N [°C.] | — |
| CCP-20CF$_3$ | 10.0% | Clearing point [°C.] | +86 |
| CCP-30CF$_3$ | 12.0% | Viscosity 20° C. | — |
| CCP-40CF$_3$ | 8.0% | Δn (589 nm, 20° C.) | +0.0930 |
| CCP-50CF$_3$ | 12.0% | n$_e$ (589 nm, 20° C.) | 1.5697 |
| BCH-3F.F.F | 14.0% | V$_{(10,0,20)}$ | 1.45 |
| BCH-5F.F.F | 11.0% | V$_{(50,0,20)}$ | 1.89 |
| CCP-3F.F.F | 12.0% | V$_{(90,0,20)}$ | 2.46 |
| CCP-5F.F.F | 7.0% | | |
| ECCP-3F.F | 6.0% | | |

Example 9

| | | | |
|---|---|---|---|
| PCH-5F | 11.0% | S → N [°C.] | — |
| PCH-7F | 7.0% | Clearing point [°C.] | +84 |
| CCP-20CF$_3$ | 10.0% | Viscosity 20° C. | — |
| CCP-30CF$_3$ | 12.0% | Δn (589 nm, 20° C.) | +0.0908 |
| CCP-40CF$_3$ | 10.0% | n$_e$ (589 nm, 20° C.) | 1.5655 |
| CCP-50CF$_3$ | 12.0% | V$_{(10,0,20)}$ | 1.65 |
| BCH-3F.F.F | 10.0% | V$_{(50,0,20)}$ | 2.13 |
| BCH-5FCF$_3$ | 10.0% | V$_{(90,0,20)}$ | 2.76 |
| ECCP-3F.F | 10.0% | | |
| ECCP-5F.F | 8.0% | | |

Example 10

| | | | |
|---|---|---|---|
| PCH-5F | 11.0% | S → N [°C.] | — |
| PCH-7F | 7.0% | Clearing point [°C.] | +82 |
| CCP-20CF$_3$ | 10.0% | Viscosity 20° C. | — |
| CCP-30CF$_3$ | 12.0% | Δn (589 nm, 20° C.) | 0.0887 |
| CCP-40CF$_3$ | 10.0% | n$_e$ (589 nm, 20° C.) | 1.5657 |
| CCP-50CF$_3$ | 12.0% | V$_{(10,0,20)}$ | 1.62 |
| BCH-3F.F.F | 10.0% | V$_{(50,0,20)}$ | 2.10 |
| BCH-5F.F.F | 10.0% | V$_{(90,0,20)}$ | 2.73 |
| ECCP-3F.F | 10.0% | | |
| ECCP-5F.F | 8.0% | | |

Example 11

| | | | |
|---|---|---|---|
| PCH-5F | 12.0% | S → N [°C.] | — |
| PCH-7F | 10.0% | Clearing point [°C.] | +77 |
| CCP-20CF$_3$ | 10.0% | Viscosity 20° C. | — |
| CCP-30CF$_3$ | 12.0% | Δn (589 nm, 20° C.) | 0.0837 |
| CCP-40CF$_3$ | 8.0% | n$_e$ (589 nm, 20° C.) | 1.5601 |
| CCP-50CF$_3$ | 12.0% | V$_{(10,0,20)}$ | 1.71 |
| ECCP-3F.F | 10.0% | V$_{(50,0,20)}$ | 2.17 |
| ECCP-5F.F | 10.0% | V$_{(90,0,20)}$ | 2.76 |
| BCH-5F.F.F | 16.0% | | |

Example 12

| | | | |
|---|---|---|---|
| PCH-5F | 12.0% | S → N [°C.] | — |
| PCH-7F | 10.0% | Clearing point [°C.] | +77 |
| CCP-20CF$_3$ | 10.0% | Viscosity 20° C. | — |
| CCP-30CF$_3$ | 12.0% | Δn (589 nm, 20° C.) | 0.0853 |
| CCP-40CF$_3$ | 8.0% | n$_e$ (589 nm, 20° C.) | 1.5613 |
| CCP-50CF$_3$ | 12.0% | V$_{(10,0,20)}$ | 1.64 |
| ECCP-3F.F | 10.0% | V$_{(50,0,20)}$ | 2.12 |
| ECCP-5F.F | 10.0% | V$_{(90,0,20)}$ | 2.75 |
| BCH-3F.F.F | 8.0% | | |
| BCH-5F.F.F | 8.0% | | |

Example 13

| | | | |
|---|---|---|---|
| PCH-5F | 12.0% | S → N [°C.] | — |
| PCH-7F | 10.0% | Clearing point [°C.] | +77 |
| CCP-20CF$_3$ | 10.0% | Viscosity 20° C. | — |
| CCP-30CF$_3$ | 12.0% | Δn (589 nm, 20° C.) | 0.0837 |
| CCP-40CF$_3$ | 8.0% | n$_e$ (589 nm, 20° C.) | 1.5601 |
| CCP-50CF$_3$ | 12.0% | V$_{(10,0,20)}$ | 1.71 |
| ECCP-3F.F | 10.0% | V$_{(50,0,20)}$ | 2.17 |
| ECCP-5F.F | 10.0% | V$_{(90,0,20)}$ | 2.76 |
| BCH-5F.F.F | 16.0% | | |

Example 14

| | | | |
|---|---|---|---|
| PCH-5F | 14.0% | S → N [°C.] | — |
| PCH-7F | 6.0% | Clearing point [°C.] | +78 |
| CCP-20CF$_3$ | 10.0% | Viscosity 20° C. | — |
| CCP-30CF$_3$ | 12.0% | Δn (589 nm, 20° C.) | 0.0871 |
| CCP-40CF$_3$ | 8.0% | n$_e$ (589 nm, 20° C.) | 1.5644 |
| CCP-50CF$_3$ | 12.0% | V$_{(10,0,20)}$ | 1.64 |
| ECCP-3F.F | 10.0% | V$_{(50,0,20)}$ | 2.10 |
| ECCP-5F.F | 8.0% | V$_{(90,0,20)}$ | 2.68 |
| BCH-3F.F.F | 8.0% | | |
| BCH-5F.F.F | 12.0% | | |

Example 15

| | | | |
|---|---|---|---|
| PCH-5F | 14.0% | S → N [°C.] | — |
| PCH-7F | 8.0% | Clearing point [°C.] | +74 |
| CCP-20CF$_3$ | 10.0% | Viscosity 20° C. | — |
| CCP-30CF$_3$ | 12.0% | Δn (589 nm, 20° C.) | +0.0867 |
| CCP-40CF$_3$ | 7.0% | n$_e$ (589 nm, 20° C.) | 1.5643 |
| CCP-50CF$_3$ | 11.0% | V$_{(10,0,20)}$ | 1.61 |
| ECCP-3F.F | 10.0% | V$_{(50,0,20)}$ | 2.04 |
| ECCP-5F.F | 8.0% | V$_{(90,0,20)}$ | 2.62 |
| BCH-3F.F.F | 12.0% | | |
| BCH-5F.F.F | 8.0% | | |

Example 16

| | | | |
|---|---|---|---|
| PCH-5F | 12.0% | S → N [°C.] | — |
| PCH-7F | 9.0% | Clearing point [°C.] | +75 |
| CCP-20CF$_3$ | 11.0% | Viscosity 20° C. | 15 |
| CCP-30CF$_3$ | 12.0% | Δn (589 nm, 20° C.) | +0.0874 |
| CCP-40CF$_3$ | 7.0% | n$_e$ (589 nm, 20° C.) | 1.5650 |
| CCP-50CF$_3$ | 11.0% | V$_{(10,0,20)}$ | 1.55 |
| ECCP-3F.F | 10.0% | V$_{(50,0,20)}$ | 2.00 |
| ECCP-5F.F | 7.0% | V$_{(90,0,20)}$ | 2.60 |
| BCH-3F.F.F | 12.0% | | |
| BCH-5F.F.F | 9.0% | | |

Example 17

| | | | |
|---|---|---|---|
| PCH-5F | 11.0% | S → N [°C.] | — |
| PCH-7F | 7.0% | Clearing point [°C.] | +84 |
| CCP-20CF$_3$ | 10.0% | Viscosity 20° C. | — |
| CCP-30CF$_3$ | 12.0% | Δn (589 nm, 20° C.) | +0.0908 |
| CCP-40CF$_3$ | 10.0% | n$_e$ (589 nm, 20° C.) | 1.5655 |
| CCP-50CF$_3$ | 12.0% | V$_{(10,0,20)}$ | 1.65 |
| BCH-3F.F.F | 10.0% | V$_{(50,0,20)}$ | 2.13 |
| BCH-5FCF$_3$ | 10.0% | V$_{(90,0,20)}$ | 2.76 |
| ECCP-3F.F | 10.0% | | |
| ECCP-5F.F | 8.0% | | |

Example 18

| | | | |
|---|---|---|---|
| PCH-5F | 11.0% | S → N [°C.] | — |
| PCH-7F | 7.0% | Clearing point [°C.] | +88 |
| CCP-20CF$_3$ | 10.0% | Viscosity 20° C. | — |
| CCP-30CF$_3$ | 12.0% | Δn (589 nm, 20° C.) | +0.0925 |

| | | | |
|---|---|---|---|
| CCP-40CF$_3$ | 10.0% | n$_e$ (589 nm, 20° C.) | 1.5641 |
| CCP-50CF$_3$ | 12.0% | V$_{(10,0,20)}$ | 1.74 |
| BCH-3F.F.F | 10.0% | V$_{(50,0,20)}$ | 2.21 |
| BCH-5FCF$_3$ | 10.0% | V$_{(90,0,20)}$ | 2.84 |
| ECCP-30CF$_3$ | 10.0% | | |
| ECCP-50CF$_3$ | 8.0% | | |

Example 19

| | | | |
|---|---|---|---|
| CCH-32CF$_3$ | 14.0% | S → N [°C.] | — |
| CCH-52CF$_3$ | 14.0% | Clearing point [°C.] | +83 |
| CCP-20CF$_3$ | 10.0% | Viscosity 20° C. | — |
| CCP-30CF$_3$ | 12.0% | Δn (589 nm, 20° C.) | +0.0905 |
| CCP-40CF$_3$ | 8.0% | n$_e$ (589 nm, 20° C.) | 1.5575 |
| CCP-50CF$_3$ | 12.0% | V$_{(10,0,20)}$ | 1.68 |
| BCH-3F.F.F | 15.0% | V$_{(50,0,20)}$ | 2.14 |
| BCH-5F.F.F | 15.0% | V$_{(90,0,20)}$ | 2.75 |

Example 20

| | | | |
|---|---|---|---|
| PCH-5F | 11.0% | S → N [°C.] | — |
| PCH-7F | 7.0% | Clearing point [°C.] | +86 |
| CCP-20CF$_3$ | 10.0% | Viscosity 20° C. | — |
| CCP-30CF$_3$ | 12.0% | Δn (589 nm, 20° C.) | +0.0903 |
| CCP-40CF$_3$ | 10.0% | n$_e$ (589 nm, 20° C.) | 1.5636 |
| CCP-50CF$_3$ | 12.0% | V$_{(10,0,20)}$ | 1.70 |
| BCH-3F.F.F | 10.0% | V$_{(50,0,20)}$ | 2.18 |
| BCH-5F.F.F | 10.0% | V$_{(90,0,20)}$ | 2.82 |
| ECCP-30CF$_3$ | 10.0% | | |
| ECCP-50CF$_3$ | 8.0% | | |

Example 21

| | | | |
|---|---|---|---|
| PCH-5F | 11.0% | S → N [°C.] | — |
| PCH-7F | 7.0% | Clearing point [°C.] | +82 |
| CCP-20CF$_3$ | 10.0% | Viscosity 20° C. | — |
| CCP-30CF$_3$ | 12.0% | Δn (589 nm, 20° C.) | 0.0887 |
| CCP-40CF$_3$ | 10.0% | n$_e$ (589 nm, 20° C.) | 1.5657 |
| CCP-50CF$_3$ | 12.0% | V$_{(10,0,20)}$ | 1.62 |
| BCH-3F.F.F | 10.0% | V$_{(50,0,20)}$ | 2.10 |
| BCH-5F.F.F | 10.0% | V$_{(90,0,20)}$ | 2.73 |
| ECCP-3F.F | 10.0% | | |
| ECCP-5F.F | 8.0% | | |

Example 22

| | | | |
|---|---|---|---|
| PCH-5F | 10.0% | S → N [°C.] | — |
| PCH-7F | 6.0% | Clearing point [°C.] | +83 |
| CCP-20CF$_3$ | 10.0% | Viscosity 20° C. | — |
| CCP-30CF$_3$ | 12.0% | Δn (589 nm, 20° C.) | +0.0918 |
| CCP-40CF$_3$ | 8.0% | n$_e$ (589 nm, 20° C.) | 1.5697 |
| CCP-50CF$_3$ | 12.0% | V$_{(10,0,20)}$ | 1.58 |
| BCH-3F.F.F | 15.0% | V$_{(50,0,20)}$ | 2.02 |
| BCH-5F.F.F | 9.0% | V$_{(90,0,20)}$ | 2.61 |
| ECCP-3F.F | 10.0% | | |
| ECCP-5F.F | 8.0% | | |

Example 23

| | | | |
|---|---|---|---|
| PCH-5F | 9.0% | S → N [°C.] | — |
| PCH-7F | 4.0% | Clearing point [°C.] | +87 |
| CCP-20CF$_3$ | 10.0% | Viscosity 20° C. | — |
| CCP-30CF$_3$ | 12.0% | Δn (589 nm, 20° C.) | 0.0938 |
| CCP-40CF$_3$ | 9.0% | n$_e$ (589 nm, 20° C.) | — |
| CCP-50CF$_3$ | 12.0% | V$_{(10,0,20)}$ | 1.58 |
| BCH-3F.F.F | 15.0% | V$_{(50,0,20)}$ | — |
| BCH-5F.F.F | 10.0% | V$_{(90,0,20)}$ | — |
| ECCP-3F.F | 11.0% | | |
| ECCP-5F.F | 8.0% | | |

Example 24

| | | | |
|---|---|---|---|
| PCH-5F | 10.0% | S → N [°C.] | — |
| PCH-7F | 5.0% | Clearing point [°C.] | +84.7 |
| CCP-20CF$_3$ | 11.0% | Viscosity 20° C. | — |
| CCP-30CF$_3$ | 12.0% | Δn (589 nm, 20° C.) | 0.0910 |
| CCP-40CF$_3$ | 8.0% | n$_e$ (589 nm, 20° C.) | — |
| CCP-50CF$_3$ | 12.0% | V$_{(10,0,20)}$ | 1.60 |
| BCH-3F.F.F | 14.0% | V$_{(50,0,20)}$ | — |
| BCH-5F.F.F | 9.0% | V$_{(90,0,20)}$ | — |
| ECCP-3F.F | 11.0% | | |
| ECCP-5F.F | 8.0% | | |

Example 25

| | | | |
|---|---|---|---|
| PCH-5F | 8.0% | S → N [°C.] | — |
| PCH-7F | 7.0% | Clearing point [°C.] | +85.3 |
| CCP-20CF$_3$ | 12.0% | Viscosity 20° C. | — |
| CCP-30CF$_3$ | 14.0% | Δn (589 nm, 20° C.) | 0.0914 |
| CCP-40CF$_3$ | 9.0% | n$_e$ (589 nm, 20° C.) | — |
| CCP-50CF$_3$ | 12.0% | V$_{(10,0,20)}$ | — |
| BCH-3F.F.F | 14.0% | V$_{(50,0,20)}$ | — |
| BCH-5F.F.F | 9.0% | V$_{(90,0,20)}$ | — |
| ECCP-3F.F | 8.0% | | |
| ECCP-5F.F | 7.0% | | |

Example 26

| | | | |
|---|---|---|---|
| PCH-5F | 8.0% | S → N [°C.] | — |
| PCH-7F | 7.0% | Clearing point [°C.] | +84.7 |
| CCP-20CF$_3$ | 12.0% | Viscosity 20° C. | — |
| CCP-30CF$_3$ | 12.0% | Δn (589 nm, 20° C.) | +0.0910 |
| CCP-40CF$_3$ | 10.0% | n$_e$ (589 nm, 20° C.) | 1.5679 |
| CCP-50CF$_3$ | 12.0% | V$_{(10,0,20)}$ | 1.61 |
| BCH-3F.F.F | 12.0% | V$_{(50,0,20)}$ | 2.07 |
| BCH-5F.F.F | 11.0% | V$_{(90,0,20)}$ | 2.68 |
| ECCP-3F.F | 8.0% | | |
| ECCP-5F.F | 8.0% | | |

Example 27

| | | | |
|---|---|---|---|
| PCH-5F | 10.0% | S → N [°C.] | — |
| PCH-7F | 10.0% | Clearing point [°C.] | +84 |
| CCP-20CF$_3$ | 10.0% | Viscosity 20° C. | — |
| CCP-30CF$_3$ | 12.0% | Δn (589 nm, 20° C.) | +0.0880 |
| CCP-40CF$_3$ | 8.0% | n$_e$ (589 nm, 20° C.) | 1.5606 |
| CCP-50CF$_3$ | 12.0% | V$_{(10,0,20)}$ | 1.76 |
| CCH-52CF$_3$ | 15.0% | V$_{(50,0,20)}$ | 2.24 |
| BCH-3F.F.F | 15.0% | V$_{(90,0,20)}$ | 2.89 |
| CBC-33F | 4.0% | | |
| CBC-53F | 4.0% | | |

Example 28

| | | | |
|---|---|---|---|
| | | S → N [°C.] | — |
| | | Clearing point [°C.] | +101 |
| PCH-7F | 4.0% | Viscosity 20° C. | — |
| CCP-20CF$_3$ | 10.0% | Δn (589 nm, 20° C.) | +0.0934 |
| CCP-30CF$_3$ | 12.0% | n$_e$ (589 nm, 20° C.) | 1.5608 |
| CCP-40CF$_3$ | 8.0% | V$_{(10,0,20)}$ | 1.90 |
| CCP-50CF$_3$ | 12.0% | V$_{(50,0,20)}$ | 2.42 |
| CCH-32CF$_3$ | 10.0% | V$_{(90,0,20)}$ | 3.07 |
| CCH-52CF$_3$ | 10.0% | | |
| ECCP-3F.F | 10.0% | | |
| BCH-3F.F.F | 12.0% | | |
| BCH-5.FCF$_3$ | 12.0% | | |

Example 29

| | | | |
|---|---|---|---|
| PCH-7F | 4.0% | S → N [°C.] | — |
| CCP-20CF$_3$ | 10.0% | Clearing point [°C.] | +82 |
| CCP-30CF$_3$ | 12.0% | Viscosity 20° C. | — |
| CCP-40CF$_3$ | 8.0% | Δn (589 nm, 20° C.) | +0.0883 |
| CCP-50CF$_3$ | 12.0% | n$_e$ (589 nm, 20° C.) | 1.5519 |
| CCH-32CF$_3$ | 15.0% | V$_{(10,0,20)}$ | 1.82 |
| CCH-52CF$_3$ | 15.0% | V$_{(50,0,20)}$ | 2.29 |
| BCH-3F.F.F | 12.0% | V$_{(90,0,20)}$ | 2.89 |
| BCH-5.FCF$_3$ | 12.0% | | |

Example 30

| | | | |
|---|---|---|---|
| CCH-32CF$_3$ | 14.0% | S → N [°C.] | — |
| CCH-52CF$_3$ | 14.0% | Clearing point [°C.] | +83 |
| CCP-20CF$_3$ | 10.0% | Viscosity 20° C. | — |
| CCP-30CF$_3$ | 12.0% | Δn (589 nm, 20° C.) | +0.0905 |
| CCP-40CF$_3$ | 8.0% | n$_e$ (589 nm, 20° C.) | 1.5575 |
| CCP-50CF$_3$ | 12.0% | V$_{(10,0,20)}$ | 1.68 |
| BCH-3F.F.F | 15.0% | V$_{(50,0,20)}$ | 2.14 |
| BCH-5F.F.F | 15.0% | V$_{(90,0,20)}$ | 2.75 |

Example 31

| | | | |
|---|---|---|---|
| CCP-20CF$_3$ | 10.0% | S → N [°C.] | — |
| CCP-30CF$_3$ | 12.0% | Clearing point [°C.] | +99 |
| CCP-40CF$_3$ | 8.0% | Viscosity 20° C. | — |
| CCP-50CF$_3$ | 12.0% | Δn (589 nm, 20° C.) | 0.0840 |
| ECCP-3F.F | 10.0% | n$_e$ (589 nm, 20° C.) | 1.5520 |
| ECCP-5F.F | 10.0% | V$_{(10,0,20)}$ | 1.99 |
| BCH-5F.F.F | 16.0% | V$_{(50,0,20)}$ | 2.51 |
| CCH-32CF$_3$ | 12.0% | V$_{(90,0,20)}$ | 3.22 |

Example 32

| | | | |
|---|---|---|---|
| CCH-52CF$_3$ | 10.0% | | |
| PCH-5F | 8.0% | S → N [°C.] | — |
| CCP-20CF$_3$ | 10.0% | Clearing point [°C.] | +74.5 |
| CCP-30CF$_3$ | 12.0% | Viscosity 20° C. | — |
| CCP-40CF$_3$ | 8.0% | Δn (589 nm, 20° C.) | 0.0893 |
| CCP-50CF$_3$ | 12.0% | n$_e$ (589 nm, 20° C.) | 1.5598 |
| BCH-3F.F.F | 15.0% | V$_{(10,0,20)}$ | 1.55 |
| BCH-5F.F.F | 15.0% | V$_{(50,0,20)}$ | 1.99 |
| CCH-32CF$_3$ | 10.0% | V$_{(90,0,20)}$ | 2.57 |
| CCH-52CF$_3$ | 10.0% | | |

Example 33

| | | | |
|---|---|---|---|
| PCH-5F | 10.0% | S → N [°C.] | — |
| PCH-7F | 10.0% | Clearing point [°C.] | +89 |
| CCP-20CF$_3$ | 10.0% | Viscosity 20° C. | — |
| CCP-30CF$_3$ | 12.0% | Δn (589 nm, 20° C.) | +0.1019 |
| CCP-40CF$_3$ | 8.0% | n$_e$ (589 nm, 20° C.) | 1,5801 |
| CCP-50CF$_3$ | 12.0% | V$_{(10,0,20)}$ | 1.66 |
| BCH-3F.F.F | 15.0% | V$_{(50,0,20)}$ | 2.11 |
| BCH-5.FCF$_3$ | 15.0% | V$_{(90,0,20)}$ | 2.74 |
| CBC-33F | 4.0% | | |
| CBC-53F | 4.0% | | |

Example 34

| | | | |
|---|---|---|---|
| PCH-5F | 10.0% | S → N [°C.] | — |
| PCH-7F | 10.0% | Clearing point [°C.] | +84 |
| CCP-20CF$_3$ | 10.0% | Viscosity 20° C. | — |
| CCP-30CF$_3$ | 12.0% | Δn (589 nm, 20° C.) | +0.0880 |
| CCP-40CF$_3$ | 8.0% | n$_e$ (589 nm, 20° C.) | 1.5606 |
| CCP-50CF$_3$ | 12.0% | V$_{(10,0,20)}$ | 1.76 |
| CCH-52CF$_3$ | 15.0% | V$_{(50,0,20)}$ | 2.24 |
| BCH-3F.F.F | 15.0% | V$_{(90,0,20)}$ | 2.89 |
| CBC-33F | 4.0% | | |
| CBC-53F | 4.0% | | |

Example 35

| | | | |
|---|---|---|---|
| PCH-5F | 10.0% | S → N [°C.] | — |
| CCP-20CF$_3$ | 10.0% | Clearing point [°C.] | +86 |
| CCP-30CF$_3$ | 12.0% | Viscosity 20° C. | — |
| CCP-40CF$_3$ | 8.0% | Δn (589 nm, 20° C.) | +0.0976 |
| CCP-50CF$_3$ | 12.0% | n$_e$ (589 nm, 20° C.) | 1.5695 |
| CCH-32CF$_3$ | 7.0% | V$_{(10,0,20)}$ | 1.70 |
| CCH-52CF$_3$ | 7.0% | V$_{(50,0,20)}$ | 2.17 |
| BCH-3F.F.F | 15.0% | V$_{(90,0,20)}$ | 2.76 |
| BCH-5.FCF$_3$ | 15.0% | | |
| CBC-33F | 4.0% | | |

Example 36

| | |
|---|---|
| PCH-5F | 9.0% |
| PCH-7F | 5.0% |
| CCP-20CF$_3$ | 10.0% |
| CCP-30CF$_3$ | 12.0% |
| CCP-40CF$_3$ | 9.0% |
| CCP-50CF$_3$ | 12.0% |
| BCH-3F.F.F | 15.0% |
| BCH-5F.F.F | 10.0% |
| ECCP-3F.F | 10.0% |
| ECCP-5F.F | 8.0% |

Example 37

| | |
|---|---|
| PCH-5F | 9.0% |
| PCH-7F | 6.0% |
| CCP-20CF$_3$ | 12.0% |
| CCP-30CF$_3$ | 12.0% |
| CCP-40CF$_3$ | 10.0% |
| CCP-50CF$_3$ | 12.0% |
| BCH-3F.F.F | 12.0% |
| BCH-5F.F.F | 10.0% |
| ECCP-3F.F | 10.0% |
| ECCP-5F.F | 7.0% |

Example 38

| | | | |
|---|---|---|---|
| PCH-5F | 12.0% | S → N [°C.] | — |
| PCH-7F | 7.0% | Clearing point [°C.] | +85 |
| CCP-20CF$_3$ | 10.0% | Viscosity 20° C. | — |
| CCP-30CF$_3$ | 12.0% | Δn (589 nm, 20° C.) | +0.0895 |
| CCP-40CF$_3$ | 10.0% | | |
| CCP-50CF$_3$ | 12.0% | V$_{(10,0,20)}$ | 1.76 |
| BCH-3F.F.F | 26.0% | V$_{(50,0,20)}$ | 2.10 |
| CP-3F | 6.0% | V$_{(90,0,20)}$ | 2.60 |
| CP-5F | 5.0% | | |

Example 39

| | | | |
|---|---|---|---|
| PCH-6F | 13.0% | S → N [°C.] | — |
| PCH-7F | 7.0% | Clearing point [°C.] | +86 |
| CCP-20CF$_3$ | 10.0% | Viscosity 20° C. | — |
| CCP-30CF$_3$ | 11.0% | Δn (589 nm, 20° C.) | +0.0905 |
| CCP-40CF$_3$ | 10.0% | | |
| CCP-50CF$_3$ | 12.0% | V$_{(10,0,20)}$ | 1.72 |
| BCH-3F.F.F | 24.0% | V$_{(50,0,20)}$ | 2.06 |
| CP-3F | 6.0% | V$_{(90,0,20)}$ | 2.51 |
| CP-5F | 7.0% | | |

Example 40

| | | | |
|---|---|---|---|
| PCH-5F | 8.0% | S → N [°C.] | — |
| PCH-7F | 5.0% | Clearing point [°C.] | +89 |
| CCP-20CF$_3$ | 10.0% | Viscosity 20° C. | — |
| CCP-30CF$_3$ | 12.0% | Δn (589 nm, 20° C.) | +0.0927 |
| CCP-40CF$_3$ | 8.0% | | |
| CCP-50CF$_3$ | 10.0% | V$_{(10,0,20)}$ | 1.61 |
| BCH-3F.F | 10.0% | V$_{(50,0,20)}$ | 2.07 |
| BCH-5F.F | 10.0% | V$_{(90,0,20)}$ | 2.69 |
| CCP-5F.F.F | 9.0% | | |
| ECCP-3F.F | 6.0% | | |
| CCP-3CF$_3$.F.F | 12.0% | | |

Example 41

| | | | |
|---|---|---|---|
| PCH-5F | 10.0% | S → N [°C.] | — |
| PCH-6F | 7.0% | Clearing point [°C.] | 63 |
| PCH-7F | 15.0% | Viscosity 20° C. | — |
| CCP-20CF$_3$ | 10.0% | Δn (589 nm, 20° C.) | 0.0816 |
| CCP-30CF$_3$ | 12.0% | | |
| CCP-40CF$_3$ | 8.0% | V$_{(10,0,20)}$ | 1.55 |
| CCP-50CF$_3$ | 12.0% | V$_{(50,0,20)}$ | 1.99 |
| CCP-3CF$_3$.F.F | 10.0% | V$_{(90,0,20)}$ | 2.62 |
| BCH-5F.F | 16.0% | | |

Example 42

| | | | |
|---|---|---|---|
| PCH-5F | 12.0% | S → N [°C.] | — |
| | | Clearing point [°C.] | 79.7 |
| PCH-7F | 8.0% | Viscosity 20° C. | — |
| CCP-20CF$_3$ | 10.0% | Δn (589 nm, 20° C.) | 0.0779 |
| CCP-30CF$_3$ | 12.0% | | |
| CCP-40CF$_3$ | 8.0% | V$_{(10,0,20)}$ | 1.64 |
| CCP-50CF$_3$ | 12.0% | V$_{(50,0,20)}$ | — |
| ECCP-3F.F | 12.0% | V$_{(90,0,20)}$ | — |
| CCP-5F.F.F | 12.0% | | |
| CCP-3CF$_3$.F.F | 14.0% | | |

Example 43

| | | | |
|---|---|---|---|
| PCH-5F | 10.0% | S → N [°C.] | — |
| PCH-7F | 8.0% | Clearing point [°C.] | 84 |
| CCP-20CF$_3$ | 10.0% | Viscosity 20° C. | — |
| CCP-30CF$_3$ | 12.0% | Δn (589 nm, 20° C.) | 0.0791 |
| CCP-40CF$_3$ | 10.0% | | |
| CCP-50CF$_3$ | 12.0% | V$_{(10,0,20)}$ | 1.78 |
| ECCP-3F.F | 12.0% | V$_{(50,0,20)}$ | — |
| CCP-3CF$_3$.F.F | 26.0% | V$_{(90,0,20)}$ | — |

The following are further examples of media according to the invention:

| example | 44 | 45 | 46 | 47 | 48 | 49 | 50 |
|---|---|---|---|---|---|---|---|
| Clearing point [°C.] | +77 | +76 | +81 | +86 | +89 | +81.2 | +80 |
| Viscosity [mm²s⁻¹] -20° C. | — | — | — | — | — | — | — |
| Δn (589 nm, 20° C.) | +0.0847 | 0.0835 | +0.0907 | +0.0930 | +0.0857 | +0.0865 | +0.0881 |
| nₒ (589 nm, 20° C.) | 1.5605 | 1.5595 | 1.5672 | 1.5697 | 1.5587 | 1.5630 | 1.5635 |
| Δε (1 kHz, 20° C.) | — | — | — | — | — | — | — |
| ε∥ (1 kHz, 20° C.) | — | — | — | — | — | — | — |
| d · Δn [μm] = 0.4 | — | — | — | — | — | — | — |
| V$_{(10,0,20)}$ [V] | 1.59 | 1.49 | 1.46 | 1.45 | 1.74 | 1.47 | 1.42 |
| V$_{(60,0,20)}$ [V] | — | 1.93 | — | 1.89 | 2.23 | 1.90 | 1.84 |
| V$_{(90,0,20)}$ [V] | — | 2.52 | — | 2.46 | 2.90 | 2.48 | — |
| Composition [%] | 12.0 PCH-5F | 12.0 PCH-5F | 8.0 PCH-5F | 8.0 PCH-5F | 9.0 PCH-5F | 5.0 PCH-5F | 8.0 PCH-5F |
| | 8.0 PCH-7F | 7.0 PCH-7F | 4.0 CCP-20CF3 | 10.0 PCH-7F | 6.0 PCH-7F | 5.0 CCP-20CF3 | 11.0 CCP-20CF3 |
| | 10.0 CCP-20CF3 | 10.0 CCP-20CF3 | 10.0 CCP-30CF3 | 12.0 CCP-20CF3 | 12.0 CCP-20CF3 | 10.0 CCP-30CF3 | 12.0 CCP-30CF3 |
| | 12.0 CCP-30CF3 | 12.0 CCP-30CF3 | 12.0 CCP-40CF3 | 8.0 CCP-30CF3 | 12.0 CCP-30CF3 | 12.0 CCP-40CF3 | 9.0 CCP-40CF3 |
| | 8.0 CCP-40CF3 | 8.0 CCP-40CF3 | 8.0 CCP-50CF3 | 8.0 CCP-40CF3 | 12.0 CCP-40CF3 | 8.0 CCP-50CF3 | 11.0 CCP-50CF3 |
| | 12.0 CCP-50CF3 | 12.0 CCP-50CF3 | 12.0 BCH-3F.F | 14.0 CCP-50CF3 | 10.0 CCP-50CF3 | 10.0 BCH-3F.F | 10.0 BCH-3F.F |
| | 14.0 BCH-3F.F | 11.0 BCH-3F.F | 14.0 BCH-5F.F | 11.0 BCH-3F.F | 12.0 BCH-3F.F | 10.0 BCH-5F.F | 11.0 BCH-5F.F |
| | 12.0 BCCP-5F.F | 12.0 CCP-3F.F | 10.0 CCP-3F.F | 12.0 BCH-5F.F | 12.0 BCH-5F.F | 10.0 CCP-3F.F | 12.0 CCP-3F.F |
| | 12.0 CCP-5F.F | 10.0 CCP-5F.F | 10.0 CCP-5F.F | 10.0 CCP-3F.F | 10.0 CCP-3F.F | 12.0 CCP-5F.F | 11.0 CCP-5F.F |
| | | 2.0 CBC-33F | 8.0 ECCP-5F.F | 7.0 ECCP-3F.F | 7.0 ECCP-5F.F | 9.0 ECCP-3F.F | |
| | | | 4.0 CBC-33F | 6.0 CCP-3CF3.F.F | 12.0 CCP-5F.F | 6.0 | |

| example | 51 | 52 | 53 | 54 | 55 | 56 | 32 |
|---|---|---|---|---|---|---|---|
| Clearing point [°C.] | +87.5 | 84.3 | +86 | +87 | +87 | +87 | +82 |
| Viscosity [mm²s⁻¹] -20° C. | +0.0930 | — | 200 | 188 | 188 | — | — |
| Δn (589 nm, 20° C.) | | +0.0928 | +0.0920 | +0.0919 | +0.0919 | — | +0.0942 |
| nₒ (589 nm, 20° C.) | 1.5695 | 1.5693 | 1.5683 | 1.5679 | 1.5679 | — | 1.5679 |
| Δε (1 kHz, 20° C.) | — | — | — | 7.9 | 7.9 | — | — |
| ε∥ (1 kHz, 20° C.) | — | — | — | 11.1 | 11.1 | — | — |
| d · Δn [μm] = 0.4 | — | — | — | — | — | — | — |
| V$_{(10,0,20)}$ [V] | 1.48 | 1.43 | 1.46 | 1.56 | 1.56 | — | 1.46 |
| V$_{(60,0,20)}$ [V] | 1.92 | 1.84 | 1.89 | 1.93 | 1.93 | — | 1.88 |
| V$_{(90,0,20)}$ [V] | 2.50 | 2.38 | 2.47 | 2.41 | 2.41 | — | 2.45 |
| Composition [%] | 7.0 PCH-5F | 10.0 PCH-5F | 7.0 PCH-5F | 5.0 PCH-5F | 5.0 PCH-5F | — | 4.0 PCH-5F |
| | 4.0 CCP-20CF3 | 10.0 PCH-7F | 4.0 PCH-7F | 6.0 PCH-7F | 6.0 PCH-7F | | 10.0 PCH-7F |
| | 11.0 CCP-30CF3 | 14.0 CCP-20CF3 | 11.0 CCP-20CF3 | 11.0 CCP-20CF3 | 11.0 CCP-20CF3 | | 12.0 CCP-20CF3 |
| | 9.0 CCP-40CF3 | 10.0 CCP-30CF3 | 14.0 CCP-30CF3 | 12.0 CCP-30CF3 | 12.0 CCP-30CF3 | | 12.0 CCP-30CF3 |
| | 11.0 CCP-50CF3 | 10.0 CCP-40CF3 | 10.0 CCP-40CF3 | 10.0 CCP-40CF3 | 10.0 CCP-40CF3 | | 10.0 CCP-40CF3 |
| | 11.0 BCH-3F.F | 14.0 CCP-50CF3 | 11.0 CCP-50CF3 | 12.0 CCP-50CF3 | 12.0 CCP-50CF3 | | 8.0 CCP-50CF3 |
| | 11.0 BCH-5F.F | 10.0 BCH-3F.F | 11.0 BCH-3F.F | 12.0 BCH-3F.F | 12.0 BCH-3F.F | | 12.0 BCH-3F.F |
| | 12.0 CCP-3F.F | 14.0 BCH-5F.F | 11.0 BCH-5F.F | 11.0 BCH-5F.F | 11.0 BCH-5F.F | | 14.0 BCH-5F.F |
| | 10.0 CCP-5F.F | 8.0 CCP-3F.F | 12.0 ECCP-3F.F | 12.0 CCP-3F.F | 12.0 CCP-3F.F | | 10.0 CCP-3F.F |
| | 2.0 CBC-33F | CCP-5F.F | 10.0 CCP-5F.F | 9.0 CCP-3CF3.F.F | 9.0 CCP-3CF3.F.F | | 10.0 CCP-5F.F |
| | | CBC-33F | 1.0 | ECCP-3F.F | ECCP-3F.F | | 8.0 CCP-3CF3.F.F |
| | | | | | | | 4.0 ECCP-3F.F |

| example | 57 | 58 | 59 | 60 | 61 | 62 |
|---|---|---|---|---|---|---|
| Clearing Point [°C.] | +88 | +85 | 59.7 | +85 | +90 | +96.5 |
| Viscosity [mm²s⁻¹]—20° C. | — | smect. | — | — | — | — |
| Δn (589 nm, 20° C.) | +0.0978 | +0.1348 | 0.1006 | +0.1363 | +.0990 | +0.1020 |
| n₀ (589 nm, 20° C.) | 1.5714 | 1.6176 | 1.5905 | 1.6173 | 1.5775 | 1.5804 |
| Δε (1 kHz, 20° C.) | — | — | +9.36 | — | — | — |
| ε‖ (1 kHz, 20° C.) | — | — | 13.07 | — | — | — |
| d · Δn [μm] = 0.4 | — | — | — | — | — | — |
| V₍₁₀,₀,₂₀₎ [V] | 1.46 | — | — | — | 1.51 | 1.55 |
| V₍₆₀,₀,₂₀₎ [V] | 1.89 | — | — | — | 1.96 | 2.01 |
| V₍₉₀,₀,₂₀₎ [V] | 2.46 | — | — | — | 2.56 | 2.60 |
| Composition [%] | 8.0 PCH-5F | 10.0 CCP-3F.F.F | 25.0 PCH-5F | 10.0 PCH-5F | 8.0 PCH-5F | 8.0 PCH-5F |
| | 10.0 CCP-20CF3 | 10.0 CCP-5F.F.F | 15.0 PTP-40F | 10.0 PCH-7F | 4.0 CCP-20CF3 | 10.0 CCP-20CF3 |
| | 12.0 CCP-30CF3 | 10.0 BCH-3F.F.F | 20.0 PTP-50F | 10.0 CCP-20CF3 | 10.0 CCP-30CF3 | 12.0 CCP-30CF3 |
| | 8.0 CCP-40CF3 | 7.0 BCH-5F.F.F | 40.0 CCP-20CF3 | 7.0 CCP-30CF3 | 12.0 CCP-40CF3 | 8.0 CCP-40CF3 |
| | 12.0 CCP-50CF3 | 7.0 | | 7.0 CCP-40CF3 | 8.0 CCP-50CF3 | 12.0 CCP-50CF3 |
| | 14.0 BCH-3F.F | 7.0 | CCP-30CF3 | 7.0 CCP-50CF3 | 12.0 BCH-3F.F | 14.0 BCH-3F.F |
| | 5.0 BCH-5F.F | 7.0 | CCP-40CF3 | 7.0 BCH-3F.F.F | 14.0 BCH-5F.F | 1.0 BCH-5F.F |
| | 11.0 CCP-3CF3.F | 5.0 | CCP-50CF3 | 5.0 BCH-5F.F.F | 10.0 CCP-3CL.F.F | 12.0 CCP-3CL.F.F |
| | 12.0 CCP-5CF3.F | 5.0 | BCCP-30CF3 | 7.0 CCP-3CL.F.F | 10.0 CCP-5CL.F.F | 7.0 CCP-5CL.F.F |
| | 8.0 ECCP-3F.F | 5.0 | BCH-3F.F | 5.0 CCP-5CL.F.F | 8.0 ECCP-3F.F | 6.0 |
| | | 5.0 | BCH-3F.F.F | 5.0 ECCP-3F.F | 4.0 | |
| | | 5.0 | BCH-5F.F.F | 10.0 | | |
| | | 5.0 | CCP-5CF3.F.F | 5.0 | | |
| | | | CCP-3F.F | 5.0 | | |
| | | | CCP-5F.F | | | |
| | | | CPTP-30CF3 | | | |
| | | | CPTP-50CF3 | | | |

| example | 63 | 64 | 65 | 66 | 67 | 68 |
|---|---|---|---|---|---|---|
| Clearing Point [°C.] | +94 | +100 | +83 | +85 | +85 | +64 |
| Viscosity [mm²s⁻¹]—20° C. | — | — | — | — | — | — |
| Δn (589 nm, 20° C.) | +0.1010 | +0.1045 | +0.0903 | +0.0934 | +0.0864 | +0.0897 |
| n₀ (589 nm, 20° C.) | 1.5795 | 1.5832 | 1.5650 | 1.5667 | 1.5594 | 1.5716 |
| Δε (1 kHz, 20° C.) | — | — | — | — | — | — |
| ε‖ (1 kHz, 20° C.) | — | — | — | — | — | — |
| d · Δn [μm] = 0.4 | — | — | — | — | — | — |
| V₍₁₀,₀,₂₀₎ [V] | 1.57 | 1.54 | 1.37 | 1.51 | 1.50 | 1.22 |
| V₍₆₀,₀,₂₀₎ [V] | 2.02 | 1.98 | 1.78 | 1.96 | 1.96 | 1.60 |
| V₍₉₀,₀,₂₀₎ [V] | 2.60 | 2.58 | 2.32 | 2.55 | 2.58 | 2.08 |
| Composition [%] | 8.0 PCH-5F | 8.0 PCH-5F | 5.0 PCH-5F | 5.0 PCH-5F | 6.0 PCH-5F | 6.0 PCH-5F |
| | 4.0 CCP-7P | 10.0 PCH-7F | 6.0 PCH-7F | 6.0 PCH-7F | 7.0 PCH-7F | 10.0 CCP-20CF3 |
| | 10.0 CCP-20CF3 | 12.0 CCP-30CF3 | 11.0 CCP-20CF3 | 11.0 CCP-20CF3 | 12.0 CCP-20CF3 | 10.0 CCP-30CF3 |
| | 12.0 CCP-30CF3 | 8.0 CCP-40CF3 | 12.0 CCP-30CF3 | 12.0 CCP-30CF3 | 13.0 CCP-30CF3 | 9.0 CCP-40CF3 |
| | 8.0 CCP-40CF3 | 12.0 CCP-50CF3 | 10.0 CCP-40CF3 | 10.0 CCP-40CF3 | 12.0 CCP-40CF3 | 10.0 BCH-3F.F |
| | 12.0 CCP-50CF3 | 12.0 BCH-5CL.F.F | 12.0 CCP-50CF3 | 12.0 CCP-50CF3 | 13.0 CCP-50CF3 | 9.0 BCH-5F.F |
| | 24.0 BCH-5CL.F.F | 24.0 CCP-3F.F | 12.0 CUP-3F.F | 12.0 BCH-3F.F.F | 12.0 CUP-3F.F | 15.0 CCP-5CF3.F.F |
| | 10.0 CCP-3F.F | 10.0 CCP-5F.F | 7.0 BCH-5F.F.F | 11.0 BCH-5.F0CF3 | 11.0 BCH-3F.F.F | 15.0 CCP-3CL.F.F |
| | 8.0 CCP-5F.F | 8.0 ECCP-3F.F | 6.0 CCP-3F.F.F | 12.0 CCP-3F.F.F | 12.0 CCP-3F.F.F | 14.0 CCP-5CL.F.F |
| | 4.0 ECCP-3F.F | 4.0 | CCP-5F.F.F | 9.0 CCP-5F.F.F | 9.0 CCP-5F.F.F | |

| example | 69 | 70 | 71 | 72 | 73 | 74 |

-continued

| | | | | | | |
|---|---|---|---|---|---|---|
| Clearing Point [°C.] | +88 | +88 | >−30 / +87 | +90 | +68 | +94 |
| Viscosity [mm²s⁻¹] −20° C. | — | — | — | — | — | — |
| $\Delta n$ (589 nm, 20° C.) | +0.0963 | +0.0958 | +0.0945 | +0.0993 | +0.0818 | +0.0885 |
| $n_e$ (589 nm, 20° C.) | 1.5776 | 1.5727 | 1.5710 | 1.5767 | 1.5573 | 1.5635 |
| $\Delta\varepsilon$ (1 kHz, 20° C.) | — | — | — | — | — | +7.2 |
| $\varepsilon_\parallel$ (1 kHz, 20° C.) | — | — | — | — | — | 10.4 |
| $d \cdot \Delta n$ [μm] = 0.4 | | | | | | |
| $V_{(10,0,20)}$ [V] | 1.31 | 1.49 | 1.48 | 1.51 | 1.42 | 1.62 |
| $V_{(60,0,20)}$ [V] | 1.73 | 1.95 | 1.93 | 1.96 | 1.80 | 2.11 |
| $V_{(90,0,20)}$ [V] | 2.28 | 2.54 | 2.51 | 2.55 | 2.27 | 2.74 |
| Composition [%] | 5.0 PCH-5F | 5.0 PCH-5F | 5.0 PCH-5F | 5.0 PCH-5F | 10.0 PCH-5F | 5.0 PCH-5F |
| | 4.0 PCH-7F | 6.0 PCH-7F | 6.0 PCH-7F | 6.0 PCH-7F | 8.0 PCH-6F | 8.0 PCH-6F |
| | 10.0 CCP-20CF3 | 11.0 CCP-20CF3 | 11.0 CCP-20CF3 | 11.0 CCP-20CF3 | 7.0 CCP-20CF3 | 11.0 CCP-20CF3 |
| | 10.0 CCP-30CF3 | 12.0 CCP-30CF3 | 12.0 CP-30CF3 | 12.0 CCP-30CF3 | 11.0 CP-30CF3 | 12.0 CP-30CF3 |
| | 10.0 CCP-40CF3 | 10.0 CCP-40CF3 | 10.0 CCP-40CF3 | 10.0 CCP-40CF3 | 12.0 CCP-40CF3 | 10.0 CCP-40CF3 |
| | 8.0 CCP-50CF3 | 12.0 CCP-50CF3 | 12.0 CCP-50CF3 | 12.0 CCP-50CF3 | 10.0 CCP-50CF3 | 12.0 CCP-50CF3 |
| | 15.0 BCH-3RF | 12.0 BCH-3RF | 12.0 BCH-3RF | 7.0 CCP-3RF | 12.0 ECCP-3RF | 7.0 ECCP-3RF |
| | 14.0 BCH-5RF | 11.0 BCH-5RF | 11.0 BCH-5RF | 7.0 CCP-5RF | 8.0 ECCP-5RF | 7.0 ECCP-5RF |
| | 14.0 CCP-3CL.FF | 12.0 BCH-3F.FF | 12.0 BCH-3FFF | 7.0 BCH-3F.FF | 8.0 BCH-3F.FF | 8.0 BCH-3F.FF |
| | 14.0 CCP-5CL.FF | 9.0 CCP-3F.FF | 9.0 CCP-3FFF | 8.0 BCH-5F.FF | 8.0 BCH-5F.FF | 8.0 BCH-5F.FF |
| | 5.0 CP-3F | 5.0 CCP-5CL.FF | 9.0 CCP-5F.FF | 8.0 CCP-3F.FF | 6.0 CCP-3F.FF | 8.0 CCP-3F.FF |
| | | | | 6.0 CCP-5F.FF | | 6.0 CCP-5F.FF |

| example | 75 | 76 | 77 | 78 | 79 | 80 |
|---|---|---|---|---|---|---|
| Clearing Point [°C.] | +92 | +96 | +78 | +84 | +78 | +86 |
| Viscosity [mm²s⁻¹] −20° C. | — | — | — | — | — | — |
| $\Delta n$ (589 nm, 20° C.) | +0.0915 | +0.0909 | +0.0861 | +0.0896 | +0.0886 | +0.0920 |
| $n_e$ (589 nm, 20° C.) | 1.5680 | 1.5670 | 1.5612 | 1.5658 | 1.5645 | 1.5695 |
| $\Delta\varepsilon$ (1 kHz, 20° C.) | — | — | — | — | — | — |
| $\varepsilon_\parallel$ (1 kHz, 20° C.) | — | — | — | — | — | — |
| $d \cdot \Delta n$ [μm] = 0.4 | | | | | | |
| $V_{(10,0,20)}$ [V] | 1.59 | 1.61 | 1.55 | 1.39 | 1.33 | 1.36 |
| $V_{(60,0,20)}$ [V] | 2.05 | 2.07 | 1.99 | 1.81 | 1.72 | 1.79 |
| $V_{(90,0,20)}$ [V] | 2.66 | 2.67 | 2.58 | 2.35 | 2.25 | 2.36 |
| Composition [%] | 5.0 PCH-5F | 6.0 PCH-5F | 5.0 PCH-5F | 5.0 PCH-5F | 5.0 PCH-5F | 4.0 PCH-5F |
| | 6.0 PCH-7F | 6.0 PCH-7F | 6.0 PCH-7F | 6.0 PCH-7F | 6.0 PCH-7F | 5.0 PCH-7F |
| | 1.0 CCP-20CF3 | 11.0 CCP-20CF3 | 11.0 CCP-20CF3 | 11.0 CCP-20CF3 | 8.0 CCP-20CF3 | 8.0 CCP-20CF3 |
| | 12.0 CCP-30CF3 | 12.0 CCP-30CF3 | 12.0 CCP-30CF3 | 12.0 CCP-30CF3 | 10.0 CCP-30CF3 | 10.0 CCP-30CF3 |
| | 10.0 CCP-40CF3 | 10.0 CCP-40CF3 | 10.0 CCP-40CF3 | 10.0 CCP-40CF3 | 8.0 CCP-40CF3 | 8.0 CCP-40CF3 |
| | 12.0 CCP-50CF3 | 12.0 CCP-50CF3 | 12.0 CCP-50CF3 | 12.0 CCP-50CF3 | 10.0 CCP-50CF3 | 10.0 CCP-50CF3 |
| | 7.0 ECCP-3RF | 8.0 PCH-53 | 12.0 CCP-50CF3 | 12.0 BCH-3RF | 10.0 BCH-3RF | 12.0 BCH-3RF |
| | 7.0 BCH-3RF | 8.0 ECCP-53 | 8.0 BCH-3RF | 11.0 BCH-5RF | 11.0 BCH-5RF | 11.0 BCH-5RF |
| | 8.0 BCH-3F.FF | 9.0 BCH-3F.FF | 9.0 BCH-3F.FF | 6.0 CCP-2FFF | 6.0 CCP-2FFF | 7.0 CCP-2FFF |
| | 8.0 BCH-5F.FF | 8.0 BCH-5F.FF | 9.0 CCP-2FFF | 6.0 CCP-3FFF | 6.0 CCP-3FFF | 8.0 CCP-3FFF |
| | 8.0 CCP-3F.FF | 9.0 CCP-3F.FF | 9.0 CCP-3F.FF | 5.0 CCP-4FFF | 5.0 CCP-4FFF | 7.0 CCP-4FFF |
| | 8.0 CCP-5F.FF | 9.0 CCP-5F.FF | 9.0 CCP-5F.FF | 4.0 CCP-5F.FF | 8.0 CCP-5F.FF | 8.0 CCP-5F.FF |
| | 6.0 | | | | CBC-53F | 2.0 CBC-53F |
| | | | | | CBC-53F | 2.0 CBC-53F |

5,480,581

-continued

| example | 81 | 82 | 83 | 84 | 85 | 86 |
|---|---|---|---|---|---|---|
| Clearing Point [°C.] | +86 | +112 | +72 | +79 | +84 | +76 |
| Viscosity [mm²s⁻¹]−20° C. | — | — | 540 | — | — | — |
| $\Delta n$ (589 nm, 20° C.) | +0.0919 | +0.1589 | +0.1271 | 0.0970 | +0.0979 | +0.0954 |
| $n_e$ (589 nm, 20° C.) | 1.5696 | 1.6584 | 1.6229 | 1.5750 | 1.5737 | 1.5718 |
| $\Delta\varepsilon$ (1 kHz, 20° C.) | — | — | — | — | — | — |
| $\eta\|$ (1 kHz, 20° C.) | — | — | — | — | — | — |
| $d \cdot \Delta n$ [µm] = 0.5 | — | — | — | — | — | — |
| $V_{(10,0,20)}$ [V] | 1.35 | 2.00 | 1.41 | 1.33 | 1.40 | 1.29 |
| $V_{(60,0,20)}$ [V] | 1.78 | 2.27 | 1.79 | 1.75 | 1.83 | 1.69 |
| $V_{(90,0,20)}$ [V] | 2.33 | 2.78 | 2.35 | 2.33 | 2.41 | 2.25 |
| Composition [%] | | | | | | |
| PCH-5F | 4.0 | | | | | |
| PCH-7F | 5.0 | | | | | |
| CCP-20CF3 | 6.0 | | | | | |
| CCP-30CF3 | 8.0 | | | | | |
| CCP-40CF3 | 8.0 | | | | | |
| CCP-50CF3 | 10.0 | | | | | |
| CCP-2FFF | 7.0 | | | | | |
| CCP-3FFF | 8.0 | | | | | |
| CCP-4FFF | 7.0 | | | | | |
| CCP-5FFF | 8.0 | | | | | |
| BCH-3FFF | 6.0 | | | | | |
| BCH-4FFF | 10.0 | | | | | |
| BCH-5FFF | 7.0 | | | | | |
| CBC-53F | 2.0 | | | | | |
| PCH-5F | | 11.2 | 10.0 | 5.0 | 5.0 | 5.0 |
| PCH-7F | | 21.4 | 10.0 | 6.0 | 6.0 | 6.0 |
| CCP-3CL.FF / CCP-20CF3 | | 25.9 | 10.0 | 11.0 | 11.0 | 11.0 |
| CCP-5CL.FF / CCP-30CF3 | | 41.5 | 20.0 | 12.0 | 12.0 | 12.0 |
| BCH-3CL.FF / CCP-40CF3 | | | 20.0 | 10.0 | 10.0 | 10.0 |
| BCH-5CL.FF / CCP-50CF3 | | | 30.0 | 12.0 | 12.0 | 12.0 |
| BCH-3FFF | | | | 12.0 | 11.0 | 12.0 |
| BCH-5FFF | | | | 12.0 | 12.0 | 11.0 |
| CUP-3FF / CUP-30CF3 / CUP-3FFF | | | | 11.0 | 9.0 | 6.0 |
| CCP-5FFF / CUP-5FFF | | | | 12.0 | 9.0 | 6.0 |
| | | | | 9.0 | | |
| | | | | 9.0 | | |

| example | 87 | 88 | 89 | 90 | 91 | 92 |
|---|---|---|---|---|---|---|
| Clearing Point [°C.] | +92 | +85 | +95 | +88 | +88 | +83 |
| Viscosity [mm²s⁻¹]−20° C. | — | — | — | — | — | — |
| $\Delta n$ (589 nm, 20° C.) | 0.096 | 0.096 | 0.100 | 0.097 | 0.096 | 0.0905 |
| $n_e$ (589 nm, 20° C.) | 1.569 | 1.568 | 1.577 | 1.572 | 1.570 | 1.5654 |
| $\Delta\varepsilon$ (1 kHz, 20° C.) | — | — | — | — | — | — |
| $\eta\|$ (1 kHz, 20° C.) | — | — | — | — | — | — |
| $d \cdot \Delta n$ [µm] = 0.5 | — | — | — | — | — | — |
| $V_{(10,0,20)}$ [V] | 1.61 | 1.54 | 1.63 | 1.67 | 1.60 | 1.40 |
| $V_{(60,0,20)}$ [V] | 2.05 | 1.95 | 2.09 | 2.14 | 2.03 | 1.84 |
| $V_{(90,0,20)}$ [V] | 2.67 | 2.52 | 2.72 | 2.79 | 2.63 | 2.43 |
| Composition [%] | | | | | | |
| PCH-5F | 5.0 | 5.0 | 5.0 | 5.0 | 5.0 | 5.0 |
| PCH-7F | 6.0 | 6.0 | 6.0 | 6.0 | 6.0 | 6.0 |
| CCP-20CF3 | 11.0 | 11.0 | 11.0 | 11.0 | 11.0 | 11.0 |
| CCP-30CF3 | 12.0 | 12.0 | 12.0 | 12.0 | 12.0 | 12.0 |
| CCP-40CF3 | 10.0 | 10.0 | 10.0 | 10.0 | 10.0 | 10.0 |
| CCP-50CF3 | 12.0 | 12.0 | 12.0 | 12.0 | 12.0 | 12.0 |
| BCH-3FFF / CUP-30CF3 | 12.0 | 12.0 | 11.0 | 12.0 | 12.0 | 12.0 |
| BCH-5FFF | 11.0 | 11.0 | 11.0 | 11.0 | 11.0 | 11.0 |
| CCP-3CF3.FF / CCP-3CL.FF / CCP-30CF2.F / CCP-5FFF / CCP-3FFF | 12.0 | 12.0 | 12.0 | | | 12.0 |
| CCP-5CF3.FF / CCP-5CL.FF / CCP-40CF2.F / CCP-3CF3.F / CCP-5FFF | 9.0 | 9.0 | 9.0 | 12.0 | 9.0 | 9.0 |
| | | | | 9.0 | 12.0 | |

-continued

| example | 93 | 94 | 95 | 96 | 97 |
|---|---|---|---|---|---|
| Clearing Point [°C.] | +88 | +86 | +92 | +92 | +88 |
| Viscosity [mm²s⁻¹] −20° C. | — | — | — | — | — |
| Δn (589 nm, 20° C.) | +0.0913 | +0.0946 | +0.0941 | +0.0984 | 0.093 |
| n₀ (589 nm, 20° C.) | 1.5633 | 1.5681 | 1.5674 | 1.5748 | 1.569 |
| Δε (1 kHz, 20° C.) | — | — | — | — | — |
| εǁ (1 kHz, 20° C.) | — | — | — | — | — |
| d · Δn [μm] = 0.5 | — | — | — | — | — |
| V₍₁₀,₀,₂₀₎ [V] | 1.49 | 1.41 | 1.50 | 1.46 | 1.53 |
| V₍₆₀,₀,₂₀₎ [V] | 1.93 | 1.85 | 1.96 | 1.92 | 1.96 |
| V₍₉₀,₀,₂₀₎ [V] | 2.54 | 2.44 | 2.57 | 2.55 | 2.56 |
| Composition [%] | PCH-5F 5.0 | PCH-5F 5.0 | PCH-5F 5.0 | PCH-5F 5.0 | PCH-5F 5.0 |
| | PCH-7F 6.0 | PCH-7F 6.0 | PCH-7F 6.0 | PCH-7F 6.0 | PCH-7F 6.0 |
| | CCP-20CF3 11.0 | CCP-20CF3 11.0 | CCP-20CF3 11.0 | CCP-20CF3 11.0 | CCP-20CF3 11.0 |
| | CCP-30CF3 12.0 | CCP-30CF3 12.0 | CCP-30CF3 12.0 | CCP-30CF3 12.0 | CCP-30CF3 12.0 |
| | CCP-40CF3 10.0 | CCP-40CF3 10.0 | CCP-40CF3 10.0 | CCP-40CF3 10.0 | CCP-40CF3 10.0 |
| | CCP-50CF3 12.0 | CCP-50CF3 12.0 | CCP-50CF3 12.0 | CCP-50CF3 12.0 | CCP-50CF3 12.0 |
| | BCH-3CF3.F.F 12.0 | BCH-3CF3.F.F 12.0 | BCH-3CF3.F.F 12.0 | BCH-3F.F.F 11.0 | BCH-3F.F.F 11.0 |
| | BCH-5F.F.F 11.0 | BCH-5F.F.F 11.0 | BCH-5F.F.F 11.0 | BCH-5CL.F.F 12.0 | CCP-3F.F.F 12.0 |
| | CCP-3F.F.F 12.0 | CCP-3F.F.F 12.0 | CCP-3F.F.F 12.0 | CCP-3F.F.F 12.0 | CCP-5F.F.F 9.0 |
| | CCP-5F.F.F 9.0 | CCP-5CF3.F.F 9.0 | CCP-5F.F.F 9.0 | CCP-5F.F.F 9.0 | |

| example | 98 | 99 | 100 | 101 | 102 |
|---|---|---|---|---|---|
| Clearing Point [°C.] | +84 | +86 | +94 | +98 | +82 |
| Viscosity [mm²s⁻¹] −20° C. | — | — | — | — | — |
| Δn (589 nm, 20° C.) | 0.090 | 0.096 | 0.089 | 0.087 | +0.0936 |
| n₀ (589 nm, 20° C.) | 1.560 | 1.568 | 1.558 | 1.552 | 1.5707 |
| Δε (1 kHz, 20° C.) | — | — | — | +4.8 | — |
| εǁ (1 kHz, 20° C.) | — | — | — | 8.1 | — |
| d · Δn [μm] = 0.5 | — | — | — | — | — |
| V₍₁₀,₀,₂₀₎ [V] | 1.55 | 1.56 | 1.69 | 1.86 | 1.75 |
| V₍₆₀,₀,₂₀₎ [V] | 1.99 | 1.98 | 2.15 | 2.37 | 2.71 |
| V₍₉₀,₀,₂₀₎ [V] | 2.55 | 2.55 | 2.78 | 3.12 | — |
| Composition [%] | CCP-20CF3 10.0 | PCH-5F 5.0 | PCH-5F 5.0 | CCH-3CF3 6.0 | PCH-5F 5.0 |
| | CCP-30CF3 11.0 | PCH-7F 6.0 | PCH-7F 6.0 | CCH-5CF3 6.0 | PCH-7F 6.0 |
| | CCP-40CF3 9.0 | CCP-20CF3 11.0 | CCP-20CF3 8.0 | CCP-20CF3 8.0 | CCP-20CF3 11.0 |
| | CCP-50CF3 11.0 | CCP-30CF3 12.0 | CCP-30CF3 9.0 | CCP-30CF3 8.0 | CCP-30CF3 12.0 |
| | BCH-3F.F.F 12.0 | CCP-40CF3 10.0 | CCP-40CF3 8.0 | CCP-40CF3 8.0 | CCP-40CF3 10.0 |
| | BCH-5F.F.F 11.0 | CCP-50CF3 12.0 | CCP-50CF3 9.0 | CCP-50CF3 9.0 | CCP-50CF3 12.0 |
| | CCP-3F.F.F 12.0 | BCH-3F.F.F 12.0 | CCP-3CL.F.F 12.0 | CCP-3CL.F.F 12.0 | BCH-3F.F.F 12.0 |
| | CCP-5F.F.F 9.0 | BCH-5F.F.F 11.0 | CCP-5CL.F.F 11.0 | CCP-5CL.F.F 11.0 | BCH-5F.F.F 11.0 |
| | CCH-3CF3 8.0 | CCP-3F.F.F 0.0 | CCP-3CF3.F.F 16.0 | CCP-3CF3.F.F 16.0 | CCP-3F.F.F 12.0 |
| | CCH-5CF3 7.0 | CCP-5F.F.F 0.0 | CCP-5CF3.F.F 16.0 | CCP-5CF3.F.F 16.0 | CCP-5F.F.F 9.0 |
| | | CCP-5CF3.F.F 21.0 | | | |

| example | 103 | 104 | 105 | 106 | 107 | 108 |
|---|---|---|---|---|---|---|

-continued

| example | 109 | 110 | 111 | 112 | 113 | 114 |
|---|---|---|---|---|---|---|
| Clearing Point [°C] | 74.3 | 72.8 | 69.8 | 07.90 | 07.90 | — |
| Viscosity [mm²s⁻¹] −20° C. | — | — | — | <−40 | <−40 | +89 |
| | — | — | — | +63 | +64 | — |
| | — | — | — | 122 | 124 | — |
| | — | — | — | cr. > 3 h | cr. < 3 h | — |
| $d \cdot \Delta n$ (μm) = 0.4 | 0.1064 | 0.1076 | 0/1098 | 0.0873 | 0.800 | +0.1019 |
| $\Delta n$ (589 nm, 20° C.) | 0.0880 | | | | | |
| $n_e$ (589 nm, 20° C.) | 1.5606 | | | 1.5669 | 1.5576 | 1.5801 |
| $\Delta\epsilon$ (1 kHz, 20° C.) | — | — | — | — | — | — |
| $\epsilon_\parallel$ (1 kHz, 20° C.) | 1.76 | 1.70 | 1.51 | 1.61 | 1.66 | |
| $V_{(10,0,20)}$ [V] | 2.24 | 2.17 | 1.93 | 2.04 | 2.11 | |
| $V_{(60,0,20)}$ [V] | 2.89 | 2.76 | 2.52 | 2.66 | 2.74 | |
| $V_{(90,0,20)}$ [V] | | | | | | |
| Composition [%]: | 15.0 PCH-5F | 14.2 PCH-5F | 12.6 PCH-5F | 10.0 PCH-5F | 10.0 PCH-5F | |
| | 7.5 PCH-7F | 7.1 PCH-7F | 6.3 PCH-6F | 7.0 PCH-7F | 10.0 CCP-20CF3 | |
| | 5.6 CCP-20CF3 | 5.3 CCP-20CF3 | 4.7 PCH-7F | 10.0 CCP-20CF3 | 12.0 CCP-30CF3 | |
| | 11.2 CCP-30CF3 | 10.6 CCP-30CF3 | 9.4 CCP-20CF3 | 10.0 CCP-30CF3 | 8.0 CCP-40CF3 | |
| | 3.7 CCP-40CF3 | 3.5 CCP-40CF3 | 3.1 CCP-30CF3 | 12.0 CCP-30CF3 | 12.0 CCP-50CF3 | |
| | 9.2 CCP-50CF3 | 8.7 CCP-50CF3 | 7.8 CCP-40CF3 | 8.0 CCP-40CF3 | 8.0 BCH-3F.F | |
| | 21.4 BCH-3F.F | 20.2 BCH-3F.F | 18.0 CCP-50CF3 | 12.0 CCP-50CF3 | | |
| | 21.4 BCH-5F.F | 20.2 BCH-5F.F | 18.0 CCP-3F.F | 10.0 CCP-3F.F | 15.0 BCH-5.FCF3 | |
| | 5.0 BCH-3F.F.F | 10.0 BCH-3F.F.F | 20.0 BCH-5F.F | 15.0 BCH-3F.F.F | 15.0 BCH-5.FCF3 | |
| | | | 10.0 BCH-3F.F.F | 16.0 BCH-3F.F.F | 4.0 CBC-33F | |
| | | | | | | 4.0 CBC-53F |

| example | | | 110 | 111 | 112 | 113 | 114 |
|---|---|---|---|---|---|---|---|
| Clearing Point [°C] | | | +84 | +86 | +91 | — | +80 |
| Viscosity [mm²s⁻¹] −20° C. | | | — | — | — | +101 | — |
| $d \cdot \Delta n$ (μm) = 0.4 | | | +0.0880 | +0.0976 | +0.0916 | +0.0934 | +0.0756 |
| $\Delta n$ (589 nm, 20° C.) | | | | | | | |
| $n_e$ (589 nm, 20° C.) | | | 1.5606 | 1.5695 | 1.5664 | 1.5608 | 1.5489 |
| $\Delta\epsilon$ (1 kHz, 20° C.) | | | 1.76 | 1.70 | 1.72 | 1.90 | 1.66 |
| $\epsilon_\parallel$ (1 kHz, 20° C.) | | | 2.24 | 2.17 | 2.21 | 2.42 | 2.12 |
| $V_{(10,0,20)}$ [V] | | | 2.89 | 2.76 | 2.87 | 3.07 | 2.73 |
| $V_{(60,0,20)}$ [V] | | | | | | | |
| $V_{(90,0,20)}$ [V] | | | 10.0 PCH-5F | 10.0 PCH-5F | 7.0 PCH-5F | 4.0 PCH-5F | 12.0 PCH-5F |
| Composition [%]: | | | 10.0 | | 7.0 PCH-7F | 7.0 PCH-7F | 8.0 |
| | | | 10.0 CCP-20CF3 | 10.0 CCP-20CF3 | 10.0 CCP-20CF3 | 10.0 CCP-20CF3 | 10.0 CCP-20CF3 |
| | | | 12.0 CCP-30CF3 | 12.0 CCP-30CF3 | 12.0 CCP-30CF3 | 12.0 CCP-30CF3 | 12.0 CCP-30CF3 |
| | | | 8.0 CCP-40CF3 | 8.0 CCP-40CF3 | 8.0 CCP-40CF3 | 8.0 CCP-40CF3 | 8.0 CCP-40CF3 |
| | | | 12.0 CCP-50CF3 | 12.0 CCP-50CF3 | 12.0 CCP-50CF3 | 12.0 CCP-50CF3 | 12.0 CCP-50CF3 |
| | | | | | | ECCP-3F.F | 12.0 BCH-3F.F |
| | | | | | | CCP-3F.F.F | 14.0 BCH-5F.F |
| | | | 15.0 CCH-32CF3 | 7.0 CCH-32CF3 | 10.0 CCH-32CF3 | 10.0 CCP-3F.F | 12.0 CCP-3F.F.F |
| | | | 15.0 CCH-52CF3 | 7.0 CCH-52CF3 | 10.0 CCH-52CF3 | 10.0 CCP-5F.F | |
| | | | .0 BCH-3F.F.F | 15.0 ECCP-3F.F | 12.0 ECCP-3F.F | 12.0 | |
| | | | 4.0 BCH-5.FCF3 | 15.0 ECCP-5F.F | 10.0 BCH-3F.F.F | | |
| | | | 4.0 CBC-33F | 4.0 | BCH-5.FCF3 | | |

-continued

| example | 115 | 116 | 117 | 118 | 119 | 120 | 121 |
|---|---|---|---|---|---|---|---|
| Clearing Point [°C.] | +82 | +75 | +84 | +88 | +77 | — | +77 |
| Viscosity [mm²s⁻¹] −20° C. | — | — | — | — | — | — | — |
| d · Δn (μm) = 0.4 | — | — | — | — | — | — | — |
| Δn (589 nm, 20° C.) | +0.0883 | 0.0876 | +0.0908 | +0.0925 | 0.0853 | +0.0905 | 0.0837 |
| $n_e$ (589 nm, 20° C.) | 1.5519 | 1.5666 | 1.5655 | 1.5641 | .5613 | 1.5575 | 1.5601 |
| Δε (1 kHz, 20° C.) | — | — | — | — | — | — | — |
| ε∥ (1 kHz, 20° C.) | — | — | — | — | — | — | — |
| $V_{(10,0,20)}$ [V] | 1.82 | 1.51 | 1.65 | 1.74 | 1.64 | 1.68 | 1.71 |
| $V_{(60,0,20)}$ [V] | 2.29 | 1.95 | 2.13 | 2.21 | 2.12 | 2.14 | 2.17 |
| $V_{(90,0,20)}$ [V] | 2.89 | 2.54 | 2.76 | 2.84 | 2.75 | 2.75 | 2.76 |
| Composition [%]: | | | | | | | |
| PCH-5F | | | | | | 12.0 CCH-32CF3 | |
| PCH-7F | 4.0 CCP-20CF3 | 8.0 PCH-5F | 7.0 PCH-7F | 7.0 PCH-7F | 10.0 PCH-7F | 14.0 CCH-52CF3 | 10.0 PCH-7F |
| CCP-20CF3 | 10.0 CCP-30CF3 | 11.0 CCP-20CF3 | 10.0 CCP-20CF3 | 10.0 CCP-20CF3 | 10.0 | | 10.0 CCP-2CF3 |
| CCP-30CF3 | 12.0 CCP-40CF3 | 10.0 CCP-30CF3 | 12.0 CCP-30CF3 | 12.0 CCP-30CF3 | 12.0 | | 12.0 CCP-30CF3 |
| CCP-40CF3 | 8.0 CCP-50CF3 | 7.0 CCP-40CF3 | 10.0 CCP-40CF3 | 10.0 CCP-40CF3 | | 10.0 CCP-20CF3 | 8.0 CCP-40CF3 |
| CCP-50CF3 | 12.0 BCH-3F,F | 10.0 CCP-50CF3 | 10.0 CCP-50CF3 | 10.0 CCP-50CF3 | 8.0 CCP-30CF3 | 12.0 CCP-30CF3 | 8.0 CCP-50CF3 |
| ECCP-3F,F | | 10.0 BCH-3F,F | 10.0 BCH-3F,F | 10.0 ECCP-3F,F | 12.0 CCP-40CF3 | 10.0 CCP-40CF3 | 12.0 ECCP-3F,F |
| ECCP-5F,F | 15.0 CCH-32CF3 | 13.0 BCH-5,FCF3 | 10.0 BCH-5,FCF3 | 10.0 BCH-3F,F | 12.0 CCP-50CF3 | 8.0 CCP-50CF3 | 10.0 |
| BCH-3F,F | 15.0 CCH-52CF3 | 12.0 CCP-5F,F | 12.0 | | 10.0 BCH-3F,F | 10.0 BCH-3F,F | 10.0 |
| BCH-5,FCF3 | | | ECCP-3F,F | ECCP-30CF3 | 8.0 BCH-5F,F | 8.0 BCH-5F,F | 15.0 BCH-5F,F |
| | 12.0 BCH-3F,F | 12.0 | ECCP-5F,F | ECCP-50CF3 | | | |
| | 12.0 BCH-5,FCF3 | | | | | | |

| example | 122 | 123 | 124 | 125 | 126 | 127 | 128 |
|---|---|---|---|---|---|---|---|
| Clearing Point [°C.] | +78 | +86 | +99 | +74 | +82 | +83 | +74.5 |
| Viscosity [mm²s⁻¹] −20° C. | — | — | — | — | — | — | — |
| d · Δn (μm) = 0.4 | — | — | — | — | — | — | — |
| Δn (589 nm, 20° C.) | 0.0871 | +0.0942 | 0.0840 | +0.0867 | 0.0887 | +0.0918 | 0.0893 |
| $n_e$ (589 nm, 20° C.) | 1.5644 | .5675 | 1.5520 | 1.5643 | 1.5657 | 1.5697 | 1.5598 |
| Δε (1 kHz, 20° C.) | — | +6.7 | — | — | — | — | — |
| ε∥ (1 kHz, 20° C.) | — | 9.7 | — | — | — | — | — |
| $V_{(10,0,20)}$ [V] | 1.64 | 1.70 | 1.99 | 1.61 | 1.62 | 1.58 | 1.55 |
| $V_{(60,0,20)}$ [V] | 2.0 | 2.18 | 2.51 | 2.04 | 2.10 | 2.02 | 1.99 |
| $V_{(90,0,20)}$ [V] | 2.68 | 2.82 | 3.22 | 2.62 | 2.73 | 2.61 | 2.57 |
| Composition [%]: | | | | | | | |
| PCH-5F | 14.0 PCH-5F | 11.0 CCH-32CF3 | 2.0 PCH-5F | 14.0 PCH-7F | 11.0 PCH-5F | 10.0 PCH-5F | 8.0 |
| PCH-7F | 6.0 CCP-20CF3 | 7.0 CCH-52CF3 | 12.0 | 8.0 PCH-7F | 7.0 PCH-7F | 6.0 | 10.0 CCP-20CF3 |
| CCP-20CF3 | 10.0 CCP-30CF3 | 10.0 CCP-20CF3 | 10.0 CCP-20CF3 | 10.0 CCP-20CF3 | 10.0 CCP-20CF3 | 10.0 CCP-20CF3 | 12.0 CCP-30CF3 |
| CCP-30CF3 | 12.0 CCP-40CF3 | 12.0 CCP-30CF3 | 12.0 CCP-30CF3 | 12.0 CCP-30CF3 | 12.0 CCP-30CF3 | 12.0 CCP-30CF3 | 8.0 CCP-40CF3 |
| CCP-40CF3 | 8.0 CCP-50CF3 | 10.0 CCP-40CF3 | 8.0 CCP-40CF3 | 7.0 CCP-40CF3 | 10.0 CCP-40CF3 | 8.0 CCP-40CF3 | 12.0 CCP-50CF3 |
| CCP-50CF3 | 12.0 BCH-3F,F | 10.0 CCP-50CF3 | 12.0 CCP-50CF3 | 11.0 CCP-50CF3 | 12.0 CCP-50CF3 | 12.0 CCP-50CF3 | |
| ECCP-3F,F | 10.0 BCH-5F,F | 10.0 ECCP-3F,F | 10.0 ECCP-3F,F | 10.0 BCH-3F,F | 10.0 BCH-3F,F | 16.0 BCH-5F,F | |
| ECCP-5F,F | 8.0 ECCP-30CF3 | 10.0 ECCP-5F,F | 10.0 ECCP-5F,F | 10.0 BCH-5F,F | 8.0 BCH-5F,F | 9.0 | |
| BCH-3F,F | 8.0 ECCP-50CF3 | 8.0 | BCH-5F,F | 12.0 ECCP-3F,F | 10.0 ECCP-3F,F | 10.0 BCH-3F,F | 15.0 |
| BCH-5F,F | 12.0 | | 16.0 BCH-5,FCF3 | 8.0 ECCP-5F,F | 8.0 ECCP-5F,F | 8.0 BCH-5F,F | 15.0 |

-continued

| example | 129 | 130 | 131 | 132 | 133 | 134 | 135 |
|---|---|---|---|---|---|---|---|
| Clearing Point [°C.] | +87 | +75 | +69 | +85 | +85 | +85 | +86 |
| Viscosity [mm²s⁻¹] -20° C. | — | 150 | — | — | 160 | — | — |
| d · Δn (μm) = 0.4 | | | | | | | |
| Δn (589 nm, 20° C.) | +0.0938 | +0.0874 | +0.1233 | +0.0910 | +0.0914 | +0.0910 | +0.0931 |
| $n_o$ (589 nm, 20° C.) | 1.5680 | 1.5650 | 1.6236 | 1.5684 | 1.5682 | 1.5679 | 1.5709 |
| Δε (1 kHz, 20° C.) | — | — | — | — | — | — | — |
| ∥ (1 kHz, 20° C.) | — | — | — | — | — | — | — |
| $V_{(10,0,20)}$ [V] | 1.58 | 1.55 | 1.13 | 1.60 | n.d. | 1.61 | n.d. |
| $V_{(60,0,20)}$ [V] | 2.04 | 2.00 | 1.44 | 2.07 | | 2.07 | |
| $V_{(90,0,20)}$ [V] | 2.63 | 2.60 | 1.86 | 2.69 | | 2.68 | |
| Composition [%]: | | | | | | | |
| | PCH-5F 9.0 | BCH-3F.F 2.0 | PCH-5F 30.0 | PCH-5F 10.0 | PCH-5F 8.0 | PCH-5F 8.0 | PCH-5F 9.0 |
| | PCH-7F 4.0 | BCH-5F.F 9.0 | PCH-7F 60.0 | PCH-7F 5.0 | PCH-7F 7.0 | PCH-7F 7.0 | |
| | CCP-20CF3 10.0 | CBC-55F 11.0 | CCP-20CF3 10.0 | CCP-20CF3 11.0 | CCP-20CF3 12.0 | CCP-20CF3 12.0 | CCP-20CF3 5.0 |
| | CCP-30CF3 12.0 | | CCP-30CF3 12.0 | CCP-30CF3 14.0 | CCP-30CF3 10.0 | CCP-30CF3 10.0 |
| | CCP-40CF3 9.0 | | CCP-40CF3 8.0 | CCP-40CF3 9.0 | CCP-40CF3 9.0 | CCP-40CF3 12.0 |
| | CCP-50CF3 12.0 | | CCP-50CF3 12.0 | CCP-50CF3 12.0 | CCP-50CF3 12.0 | CCP-50CF3 9.0 |
| | BCH-3F.F 15.0 | | BCH-3F.F 14.0 | BCH-3F.F 14.0 | BCH-3F.F 12.0 | BCH-3F.F 15.0 |
| | BCH-5F.F 10.0 | | BCH-5F.F 9.0 | BCH-5F.F 9.0 | BCH-5F.F 11.0 | BCH-5F.F 10.0 |
| | ECCP-3F.F 11.0 | | ECCP-3F.F 7.0 | ECCP-3F.F 11.0 | ECCP-3F.F 8.0 | ECCP-3F.F 10.0 |
| | ECCP-5F.F 8.0 | | ECCP-5F.F 9.0 | ECCP-5F.F 8.0 | ECCP-5F.F 7.0 | ECCP-5F.F 8.0 |
| | | | | | | | CCH-32CF3 10.0 |
| | | | | | | | CCH-52CF3 10.0 |

| example | 136 | 137 | 138 | 139 | 140 | 141 | 142 |
|---|---|---|---|---|---|---|---|
| Clearing Point [°C.] | +87 | +86 | +75 | +75 | +62 | +88 | +74 |
| Viscosity [mm²s⁻¹] -20° C. | — | — | — | — | — | — | — |
| d · Δn (μm) = 0.4 | | | | | | | |
| Δn (589 nm, 20° C.) | 0.0915 | +0.0905 | +0.0870 | +0.0876 | +0.1264 | +0.1353 | +0.1298 |
| $n_o$ (589 nm, 20° C.) | 1.5680 | 1.5669 | 1.5645 | 1.5650 | 1.6296 | 1.6370 | 1.6319 |
| Δε (1 kHz, 20° C.) | — | — | — | — | — | — | — |
| ∥ (1 kHz, 20° C.) | — | — | — | — | — | — | — |
| $V_{(10,0,20)}$ [V] | 1.59 | 1.60 | 1.53 | 1.52 | 1.54 | 1.80 | 1.67 |
| $V_{(60,0,20)}$ [V] | 2.04 | 2.06 | 1.97 | 1.97 | 1.74 | 2.04 | 1.89 |
| $V_{(90,0,20)}$ [V] | 2.63 | 2.67 | 2.56 | 2.57 | 2.11 | 2.44 | 2.27 |
| Composition [%]: | | | | | | | |
| | PCH-5F 9.0 | PCH-6F 9.0 | PCH-6F 7.0 | | BCH-3F.F 13.1 | BCH-3F.F 12.0 | BCH-3F.F 12.0 |
| | PCH-7F 6.0 | PCH-7F 6.0 | PCH-7F 7.0 | PCH-5F 12.0 | BCH-5F.F 20.2 | BCH-5F.F 18.0 | BCH-5F.F 20.0 |
| | CCP-20CF3 12.0 | CCP-20CF3 12.0 | CCP-20CF3 11.0 | BCH-3F.F 9.0 | BCH-5F.F 22.7 | BCH-3F.F 21.0 | BCH-3F.F 23.0 |
| | CCP-30CF3 12.0 | CCP-30CF3 12.0 | CCP-30CF3 12.0 | BCH-5F.F 11.0 | BCH-5F.F 44.0 | BCH-5F.F 39.0 | BCH-5F.F 40.0 |
| | CCP-40CF3 10.0 | CCP-40CF3 10.0 | CCP-40CF3 7.0 | BCH-5F.F 12.0 | CBC-33F 5.0 | CBC-33F 5.0 | CBC-55F 5.0 |
| | CCP-50CF3 12.0 | CCP-50CF3 12.0 | CCP-50CF3 11.0 | | CBC-55F 5.0 | CBC-55F 5.0 | |
| | BCH-3F.F 12.0 | BCH-3F.F 12.0 | ECCP-3F.F 10.0 | ECCP-3F.F 11.0 | | | |
| | BCH-5F.F 10.0 | BCH-5F.F 10.0 | ECCP-5F.F 7.0 | ECCP-5F.F 7.0 | | | |
| | ECCP-3F.F 10.0 | ECCP-3F.F 10.0 | BCH-3F.F 12.0 | BCH-3F.F 12.0 | | | |

-continued

| example | 143 | 144 | 145 | 146 | 147 | 148 |
|---|---|---|---|---|---|---|
| | 7.0 ECCP-5F.F | 7.0 BCH-5F.F | 9.0 BCH-5F.F.F | 9.0 | | |
| Clearing Point [°C] | +73 | +85 | +88 | +77 | +84 | +84 |
| Viscosity [mm²s⁻¹] -20° C. | — | — | — | 294 | — | — |
| d · Δn (μm) = 0.4 | | | | | | |
| Δn (589 nm, 20° C.) | +0.0868 | +0.0927 | +0.0921 | +0.1225 | +0.0908 | +0.0791 |
| n₀ (589 nm, 20° C.) | 1.5637 | 1.5709 | 1.5687 | 1.6198 | 1.5676 | 1.5494 |
| Δε (1 kHz, 20° C.) | — | — | — | — | — | — |
| ε∥ (1 kHz, 20° C.) | — | — | — | — | — | — |
| V₍₁₀,₀,₂₀₎ [V] | 1.45 | 1.81 | 1.60 | 2.21 | 1.57 | 1.78 |
| V₍₆₀,₀,₂₀₎ [V] | 1.87 | 2.32 | 2.05 | 2.59 | 2.00 | 2.28 |
| V₍₉₀,₀,₂₀₎ [V] | 2.43 | 3.02 | 2.66 | 2.98 | 2.59 | 2.97 |
| Composition [%]: | PCH-20F.F 10.0 | PCH-5F 10.0 | PCH-5F 5.0 | PCH-20F.F 8.0 | PCH-20F.F 7.5 | PCH-5F 10.0 |
| | PCH-40F.F 5.0 | PCH-7F 5.0 | PCH-6F 5.0 | PCH-40F.F 8.0 | PCH-40F.F 5.0 | |
| | CCP-20CF3 11.0 | CCP-20CF3 11.0 | PCH-7F 11.0 | CCP-20CF3 12.0 | CCP-20CF3 11.0 | PCH-7F 8.0 |
| | CCP-30CF3 12.0 | CCP-30CF3 12.0 | FET-3F 12.0 | CCP-30CF3 6.0 | CCP-30CF3 12.0 | CCP-20CF3 10.0 |
| | CCP-40CF3 8.0 | CCP-40CF3 8.0 | FET-5F 8.0 | CCP-40CF3 4.0 | CCP-40CF3 8.0 | CCP-30CF3 12.0 |
| | CCP-50CF3 12.0 | CCP-50CF3 12.0 | CFET-3F.F 12.0 | CCP-50CF3 8.0 | CCP-50CF3 12.0 | CCP-40CF3 10.0 |
| | BCH-3F.F.F 14.0 | BCH-20F.F 14.0 | BCH-3F.F.F 14.0 | BCH-3F.F.F 9.0 | BCH-3F.F.F 14.0 | CCP-50CF3 12.0 |
| | BCH-5F.F.F 9.0 | BCH-5F.F.F 9.0 | BCH-5F.F.F 9.0 | BCH-5F.F.F 14.0 | BCH-5F.F.F 9.0 | BCH-3F.F.F 12.0 |
| | EECP-3F.F 11.0 | ECCP-3F.F 11.0 | ECCP-3F.F 11.0 | ECCP-3F.F 13.0 | ECCP-3F.F 11.0 | ECCP-3F.F 12.0 |
| | ECCP-5F.F 8.0 | ECCP-5F.F 8.0 | BCH-5F.F 13.0 | ECCP-5F.F 8.0 | ECCP-5F.F 10.5 | |
| | | | | BCH-52F 2.0 | | CCP-3CF3.F.F 26.0 |
| | | | | CBC-33F 3.0 | | |
| | | | | CBC-53F 2.0 | | |
| | | | | CBC-55F 2.0 | | |
| | | | | BCCP-30CF3 7.0 | | |

| example | 149 | 150 | 151 | 152 | 153 | 154 |
|---|---|---|---|---|---|---|
| Clearing Point [°C] | +82 | +87 | +63 | +89 | +80 | +91 |
| Viscosity [mm²s⁻¹] -20° C. | — | — | — | — | — | — |
| d · Δn (μm) = 0.4 | | | | | | |
| Δn (589 nm, 20° C.) | +0.1210 | +0.1260 | +0.0816 | +0.0927 | +0.0779 | +0.0945 |
| n₀ (589 nm, 20° C.) | 1.6180 | 1.6239 | 1.5575 | 1.5687 | 1.5486 | 1.5713 |
| Δε (1 kHz, 20° C.) | — | — | — | — | — | — |
| ε∥ (1 kHz, 20° C.) | — | — | — | — | — | — |
| V₍₁₀,₀,₂₀₎ [V] | 2.25 | 2.33 | 1.55 | 1.61 | 1.64 | 1.71 |
| V₍₆₀,₀,₂₀₎ [V] | 2.56 | 2.63 | 1.99 | 2.07 | 2.10 | 2.18 |
| V₍₉₀,₀,₂₀₎ [V] | 3.09 | 3.14 | 2.62 | 2.69 | 2.74 | 2.83 |
| Composition [%]: | PCH-5F 7.6 | PCH-5F 7.6 | PCH-5F 10.0 | PCH-5F 8.0 | PCH-5F 12.0 | PCH-5F 8.0 |
| | PCH-6F 7.6 | PCH-6F 7.6 | PCH-7F 7.0 | PCH-7F 5.0 | PCH-7F 8.0 | PCH-7F 5.0 |
| | PCH-7F 7.6 | PCH-7F 7.6 | CCP-20CF3 15.0 | CCP-20CF3 10.0 | CCP-20CF3 10.0 | CCP-20CF3 10.0 |
| | FET-3F 5.7 | FET-3F 5.7 | CCP-30CF3 10.0 | CCP-30CF3 12.0 | CCP-30CF3 10.0 | CCP-30CF3 12.0 |
| | FET-5F 3.8 | PC-5F 3.8 | CCP-40CF3 12.0 | CCP-40CF3 8.0 | CCP-40CF3 12.0 | CCP-40CF3 8.0 |
| | CFET-3F.F 7.6 | CFET-3F.F 7.6 | CCP-50CF3 8.0 | CCP-50CF3 10.0 | CCP-50CF3 8.0 | CCP-50CF3 10.0 |
| | BCH-3F.F.F 13.3 | BCH-3F.F.F 13.3 | BCH-3F.F.F 10.0 | BCH-3F.F.F 10.0 | BCH-3F.F.F 12.0 | BCH-3F.F.F 10.0 |
| | BCH-6F.F.F 12.3 | CCP-3CF3.F.F 12.3 | BCH-5F.F 16.0 | BCH-5F.F 10.0 | BCH-5F.F 12.0 | BCH-5F.F 10.0 |
| | BCH-52F 7.6 | BCH-5F.F 7.6 | | | | |

| example | 155 | 156 | 157 | 158 | 159 | 160 |
|---|---|---|---|---|---|---|
| Clearing Point [°C.] | +82 | +90 | +86 | +91 | +88 | +86 |
| Viscosity [mm²s⁻¹] −20° C. | — | — | — | — | — | — |
| d · Δn (μm) = 0.4 | | | | | | |
| Δn (589 nm, 20° C.) | +0.0776 | +0.0960 | +0.1379 | +0.0900 | +0.0945 | +0.1370 |
| n₀ (589 nm, 20° C.) | 1.5491 | 1.5710 | 1.6417 | 1.5640 | 1.5655 | 1.6405 |
| Δε (1 kHz, 20° C.) | — | — | — | — | — | — |
| ε‖ (1 kHz, 20° C.) | 1.73 | 1.66 | 2.19 | 1.65 | 1.59 | 2.05 |
| V₍₁₀,₀,₂₀₎ [V] | 2.22 | 2.10 | 2.47 | 2.12 | 2.05 | 2.33 |
| V₍₆₀,₀,₂₀₎ [V] | 2.88 | 2.71 | 2.96 | 2.75 | 2.68 | 2.82 |
| V₍₉₀,₀,₂₀₎ [V] | | | | | | |
| Composition [%]: | 12.0 PCH-5F | 8.0 PCH-5F | 5.0 PCH-5F | 13.0 PCH-5F | 9.0 PCH-5F | 5.0 |
| | | 5.0 PCH-6F | 8.0 | | 6.0 PCH-6F | 8.0 |
| | PCH-7F | 10.0 PCH-7F | 4.0 CCP-20CF3 | 10.0 CCP-20CF3 | 12.0 PCH-7F | 4.0 |
| | 8.0 CCP-20CF3 | 12.0 FET-3F | 8.0 CCP-30CF3 | 12.0 CCP-30CF3 | 12.0 FET-3F | 8.0 |
| | 10.0 CCP-30CF3 | 8.0 FET-5F | 7.0 CCP-40CF3 | 8.0 CCP-40CF3 | 10.0 FET-5F | 7.0 |
| | 12.0 CCP-40CF3 | 10.0 CFET-3F.F | 10.0 CCP-50CF3 | 10.0 CCP-50CF3 | 12.0 CFET-3F.F | 10.0 |
| | 8.0 CCP-50CF3 | 12.0 CFET-5F.F | 12.0 BCH-3F.F | 12.0 BCH-3F.F | 12.0 CFET-5F.F | 9.0 |
| | 12.0 BCH-3F.F | 10.0 BCH-3F.F | 12.0 BCH-5F.F | 12.0 BCH-5F.F | 10.0 BCH-3F.F | 12.0 |
| | 12.0 BCH-5F.F | 9.0 BCH-5F.F | 6.0 CCP-5F.F.F | 9.0 ECCP-3F.F | 10.0 BCH-5F.F | 6.0 |
| | ECCP-3F.F | 6.0 BCH-3F.F.F | 12.0 BCH-5F.F.F | 6.0 | 7.0 BCH-3F.F.F | 12.0 |
| | 12.0 CCP-5F.F.F | 12.0 BCH-5F.F.F | CBC-33F | | | CBC-33F |
| | 14.0 CCP-3CF3.F | | CBC-53F | | | CBC-53F |
| | | | CBC-55F | | | CBC-55F |

| example | 161 | 162 | 163 | 164 | 165 | 166 |
|---|---|---|---|---|---|---|
| Clearing Point [°C.] | +85 | +82 | +93 | +79 | +86 | +91 |
| Viscosity [mm²s⁻¹] −20° C. | 530 | — | 590 | 1050 | — | — |
| d · Δn (μm) = 0.4 | | | | | | |
| Δn (589 nm, 20° C.) | +0.1360 | +0.0928 | +0.1395 | +0.1375 | +0.0932 | +0.0937 |
| n₀ (589 nm, 20° C.) | 1.6395 | 1.5681 | 1.6430 | 1.6400 | 1.5682 | 1.5705 |
| Δε (1 kHz, 20° C.) | — | — | — | — | — | — |
| ε‖ (1 kHz, 20° C.) | 2.00 | 1.55 | 2.13 | 1.49 | 1.58 | 1.56 |
| V₍₁₀,₀,₂₀₎ [V] | 2.27 | 1.98 | 2.43 | 1.69 | 2.03 | 2.02 |
| V₍₆₀,₀,₂₀₎ [V] | 2.72 | 2.56 | 2.90 | 2.01 | 2.65 | 2.61 |
| V₍₉₀,₀,₂₀₎ [V] | | | | | | |
| Composition [%]: | 5.0 PCH-3CF3 | 13.0 PCH-5F | 6.0 BCH-3F.F | 30.0 PCH-5CF3 | 13.0 PCH-5F | 8.0 |
| | 8.0 | | 9.0 BCH-5F.F.F | 50.0 | | 5.0 |
| | 4.0 CCP-20CF3 | 10.0 FET-3F | 7.0 CFET-3F.F | 10.0 CCP-20CF3 | 10.0 PCH-6F | 10.0 PCH-6F |
| | 7.0 CCP-30CF3 | 12.0 FET-5F | 7.0 CFET-5F.F | 10.0 CCP-30CF3 | 10.0 CCP-20CF3 | 10.0 PCH-7F |
| | 7.0 CCP-40CF3 | 8.0 CFET-3F.F | 10.0 | CCP-40CF3 | 12.0 CCP-30CF3 | 10.0 CCP-20CF3 |
| | 10.0 CCP-50CF3 | 10.0 CFET-5F.F | 10.0 | CCP-50CF3 | 8.0 CCP-40CF3 | 12.0 CCP-30CF3 |
| | PCH-5F | | | | CCP-50CF3 | 8.0 CCP-40CF3 |
| | PCH-6F | | | | | 10.0 CCP-50CF3 |
| | PCH-7F | | | | | |
| | FET-3F | | | | | |
| | FET-5F | | | | | |
| | CFET-3F.F | | | | | |

-continued

| example | 167 | 168 | 169 | 170 | 171 | 172 |
|---|---|---|---|---|---|---|
| | CFET-5F.F | 10.0 BCH-3F.F | 10.0 BCH-3F.F | 10.0 BCH-3F.F | BCH-3F.F | 10.0 BCH-3F.F |
| | BCH-3F.F | 10.0 BCH-5F.F | 10.0 BCH-5F.F | 10.0 BCH-5F.F | BCH-5F.F | 10.0 BCH-5F.F |
| | BCH-5F.F | 12.0 CCP-3F.F.F | 12.0 BCH-3F.F.F | 12.0 CCP-3F.F.F | CCP-3F.F.F | 12.0 CCP-3F.F.F |
| | BCH-3F.F.F | 12.0 CCP-5F.F.F | 9.0 BCH-5F.F.F | 10.0 CCP-5F.F.F | CCP-5F.F.F | 9.0 |
| | BCH-5F.F.F | 10.0 ECCP-3F.F | 6.0 CBC-33F | 3.0 ECCP-3F.F | ECCP-3F.F | 6.0 ECCP-3F.F |
| | CBC-33F | 2.0 | CBC-53F | 3.0 | | CCP-5CF3.F.F |
| | CBC-55F | 3.0 | CBC-55F | 3.0 | | |
| | CBC-55F | 2.0 | | | | |
| Clearing Point [°C] | +91 | +81 | +86 | +61.5 | +87 | +64.5 |
| Viscosity [mm²s⁻¹] −20° C. | — | — | — | — | — | — |
| d · Δn (μm) = 0.4 | | | | | | |
| Δn (589 nm, 20° C.) | +0.0875 | +0.0841 | +0.0858 | +0.0637 | +0.0949 | +0.0652 |
| n₀ (589 nm, 20° C.) | 1.5591 | 1.5573 | 1.5586 | 1.5380 | 1.5672 | 1.5338 |
| Δε (1 kHz, 20° C.) | — | — | — | — | — | — |
| ε∥ (1 kHz, 20° C.) | — | — | — | — | — | — |
| V(10,0,20) [V] | 1.59 | 1.50 | 1.57 | 2.49 | 1.54 | 1.68 |
| V(60,0,20) [V] | 2.06 | 1.94 | 2.04 | 3.00 | 1.98 | 2.14 |
| V(90,0,20) [V] | 2.66 | 2.52 | 2.63 | 3.84 | 2.58 | 2.77 |
| Composition [%]: | 8.0 PCH-5F | 10.0 PCH-5F | 12.0 CCP-3F.F.F | 8.0 PCH-5F | 5.0 PCH-5F | 7.0 |
| | 8.0 PCH-7F | 11.0 PCH-7F | 6.0 CCP-5F.F.F | 8.0 PCH-7F | 6.0 PCH-7F | 7.0 |
| | 10.0 CCP-20CF3 | 8.0 CCP-20CF3 | 12.0 CCP-20CF3 | 8.0 CCP-20CF3 | 11.0 PCH-302 | 6.0 |
| | 10.0 CCP-30CF3 | 9.0 CCP-30CF3 | 12.0 CCP-30CF3 | 0 CCP-30CF3 | 12.0 CCH-3CF3 | 12.0 |
| | 10.0 CCP-40CF3 | 9.0 CCP-40CF3 | 7.0 CCP-40CF3 | 8.0 CCP-40CF3 | 10.0 CCH-5CF3 | 12.0 |
| | 10.0 CCP-50CF3 | 9.0 CCP-50CF3 | 7.0 CCP-50CF3 | 0 CCP-50CF3 | 12.0 CCP-3F.F.F | 10.0 |
| | 15.0 CCP-5CF3.F.F | 15.0 CCP-5CF3.F.F | 15.0 CCH-301 | 9.01 BCH3.FCF3 | 12.0 CCP-5F.F.F | 9.0 |
| | 15.0 CCP-3CL.F.F | 15.0 CCP-3CL.F.F | 15.0 CCH-302 | 9.0 BCH-5.FCF3 | 11.0 CCP-30CF3 | 10.0 |
| | 14.0 CCP-5CL.F.F | 14.0 CCP-5CL.F.F | 14.0 CCH-303 | 8.0 CCP-3F.F.F | 12.0 CCP-50CF3 | 9.0 |
| | | | | CCH-501 | 8.0 CCP-5F.F.F | 9.0 |
| | | | | CCH-502 | 8.0 CP-3F | 6.0 |
| | | | | PCH-301 | 8.0 CP-4F | 6.0 |
| | | | | PCH-302 | 7.0 CP-5F | 6.0 |
| | | | | PCH-501 | 7.0 | |
| | | | | CCPC-36 | 4.0 | |

| example | 173 | 174 | 175 | 176 | 177 | 178 |
|---|---|---|---|---|---|---|
| Clearing Point [°C] | +89 | +97 | +98.7 | +84 | +96 | +89.2 |
| Viscosity [mm²s⁻¹] −20° C. | — | — | — | — | — | — |
| d · Δn (μm) = 0.4 | | | | | | |
| Δn (589 nm, 20° C.) | +0.0965 | +0.0994 | 0.1343 | +0.1354 | +0.1097 | +0.0921 |
| n₀ (589 nm, 20° C.) | 1.5562 | 1.5790 | 1.6330 | 1.6385 | 1.5872 | 1.5703 |
| Δε (1 kHz, 20° C.) | — | — | 5.97 | — | — | — |
| ε∥ (1 kHz, 20° C.) | — | — | 9.99 | — | — | — |
| V(10,0,20) [V] | 1.47 | 1.67 | — | 1.99 | 1.45 | 1.62 |
| V(60,0,20) [V] | 1.91 | 2.15 | — | 2.28 | 1.86 | 2.10 |
| V(90,0,20) [V] | 2.49 | 2.80 | — | 2.84 | 2.40 | 2.72 |
| Composition [%]: | 4.0 PCH-5F | 5.0 BCH-3CL.F.F | 41.0 PCH-5F | 5.0 PCH-5F | 10.0 PCH-5F | 8.0 |
| | 5.0 PCH-7F | 6.0 BCH-5CL.F.F | 59.0 PCH-6F | 8.0 PCH-7F | 10.0 PCH-7F | 5.0 |

-continued

| example | 179 | 180 | 181 | 182 | 183 | 184 |
|---|---|---|---|---|---|---|
| Clearing Point [°C.] | +73 | +80 | +82 | +89 | +80 | +89 |
| Viscosity [mm²s⁻¹] −20° C. | — | — | — | — | — | — |
| d · Δn (μm) = 0.5 | | | | | | |
| Δn (589 nm, 20° C.) | +0.0880 | +0.0990 | +0.0858 | 0.098 | +0.0877 | +0.0903 |
| $n_o$ (589 nm, 20° C.) | 1.5641 | 1.5794 | 1.5609 | 1.574 | 1.5621 | 1.5590 |
| Δε (1 kHz, 20° C.) | — | — | — | — | — | — |
| ε∥ (1 kHz, 20° C.) | — | — | — | — | — | — |
| $V_{(10,0,20)}$ [V] | 1.64 | 1.63 | 1.74 | 1.61 | 1.56 | 1.60 |
| $V_{(60,0,20)}$ [V] | 2.03 | 2.03 | 2.12 | 2.06 | 1.91 | 2.03 |
| $V_{(90,0,20)}$ [V] | 2.60 | 2.60 | 2.71 | 2.69 | 2.43 | 2.63 |
| Composition [%]: | | | | | | |
| | 5.0 PCH-5F | 10.0 PCH-5F | 5.0 PCH-5F | 6.3 PCH-5F | 5.0 PCH-5F | 5.0 PCH-5F |
| | 13.0 PCH-6F | 10.0 PCH-7F | 9.0 PCH-7F | 7.6 PCH-7F | 6.0 PCH-7F | 6.0 PCH-7F |
| | 7.0 PCH-7F | 8.0 CCP-20CF3 | 7.0 CCP-20CF3 | 13.9 CCP-20CF3 | 11.0 CCP-20CF3 | 11.0 CCP-20CF3 |
| | 10.0 CCP-20CF3 | 10.0 CCP-30CF3 | 10.0 CCP-30CF3 | 15.2 CCP-30CF3 | 12.0 CCP-30CF3 | 12.0 CCP-30CF3 |
| | 11.0 CCP-30CF3 | 8.0 CCP-40CF3 | 11.0 CCP-40CF3 | 12.7 CCP-40CF3 | 10.0 CCP-40CF3 | 10.0 CCP-40CF3 |
| | 10.0 CCP-40CF3 | 10.0 CCP-50CF3 | 10.0 CCP-50CF3 | 15.2 CCP-50CF3 | 12.0 CCP-50CF3 | 12.0 CCP-50CF3 |
| | 10.0 CCP-50CF3 | 8.0 BCH-3FF | 12.0 BCH-3FF | 15.2 CUP-3FF | 12.0 CUP-30CF3 | 12.0 CCP-3FFF |
| | 12.0 BCH-3FF | 10.0 BCH-3FFF | 12.0 BCH-3FFF | 13.9 CUP-5FF | 11.0 CUP-50CF3 | 11.0 CCP-3FFF |
| | 12.0 BCH-5FF | 10.0 BCH-5FFF | 12.0 BCH-5FF | 12.0 BCH-5FF | 12.0 CCP-3FFF | 12.0 CCP-3FFF |
| | 10.0 BCH-3FFF | 4.0 CP-30CF3 | 6.0 | | 9.0 CCP-5FFF | 9.0 |
| | 4.0 CP-30CF3 | 4.0 CP-50CF3 | | | | |
| | 4.0 CF-50CF3 | | | | | |

| example | 185 | 186 | 187 | 188 | 189 | 190 |
|---|---|---|---|---|---|---|
| Clearing Point [°C.] | +95 | +86 | +85 kr < 1 h | 129.3 | +84 | +98 |
| Viscosity [mm²s⁻¹] −20° C. | — | — | — | — | — | — |
| d · Δn (μm) = 0.5 | | | | | | |
| Δn (589 nm, 20° C.) | +0.0970 | +0.0950 | +0.0958 | 0.0838 | +0.0904 | 0.089 |
| $n_o$ (589 nm, 20° C.) | 1.5679 | 1.5708 | 1.5583 | 1.5395 | 1.5618 | 1.559 |
| Δε (1 kHz, 20° C.) | — | — | — | +8.74 | — | — |
| ε∥ (1 kHz, 20° C.) | — | — | — | 12.7 | — | — |
| $V_{(10,0,20)}$ [V] | 1.73 | 1.58 | 1.59 | — | 1.51 | 1.76 |
| $V_{(60,0,20)}$ [V] | 2.15 | 1.98 | 1.96 | — | 1.88 | 2.24 |
| $V_{(90,0,20)}$ [V] | 2.77 | 2.58 | 2.44 | — | 2.38 | 2.89 |
| Composition [%]: | | | | | | |
| | 5.0 PCH-5F | 5.0 PCH-5F | 5.0 PCH-5F | 34.0 PCH-5F | 5.0 PCH-5F | 5.0 PCH-5F |
| | 6.0 PCH-7F | 6.0 PCH-7F | 6.0 PCH-7F | 66.0 PCH-7F | 6.0 PCH-7F | 6.0 PCH-7F |

-continued

| example | 191 | 192 | 193 | 194 | 195 |
|---|---|---|---|---|---|
| | CCP-20CF3 11.0 | CCP-20CF3 11.0 | CCP-20CF3 11.0 | CCP-20CF3 11.0 | CCP-20CF3 11.0 |
| | CCP-30CF3 12.0 | CCP-30CF3 12.0 | CCP-30CF3 12.0 | CCP-30CF3 12.0 | CCP-30CF3 12.0 |
| | CCP-40CF3 10.0 | CCP-40CF3 10.0 | CCP-40CF3 10.0 | CCP-40CF3 10.0 | CCP-40CF3 10.0 |
| | CCP-50CF3 12.0 | CCP-50CF3 12.0 | CCP-50CF3 12.0 | CCP-50CF3 12.0 | CCP-50CF3 12.0 |
| | CUP-30CF3 12.0 | CUP-3F.F 12.0 | CUP-30CF3 12.0 | CUP-3F.F 12.0 | CUP-3F.F 12.0 |
| | CUP-50CF3 11.0 | CUP-5F.F 11.0 | CUP-50CF3 11.0 | CUP-5F.F 11.0 | CUP-5F.F 11.0 |
| | CCP-3CL.F.F 12.0 | CCP-3CL.F.F 12.0 | CCP-3CF3.F.F 12.0 | CCP-30CF2.F.F 12.0 | CCP-3CL.F.F 12.0 |
| | CCP-5CL.F.F 9.0 | CCP-5CL.F.F 9.0 | CCP-5CF3.F.F 9.0 | CCP-50CF2.F.F 9.0 | CCP-5CL.F.F 11.0 |
| | | | | | CCP-3CF3.F.F 12.0 |
| | | | | | CCP-5CF3.F.F 9.0 |
| Clearing Point [°C.] | +98 | +97 | +98 | +96 | +97 |
| Viscosity [mm²s⁻¹] −20° C. | ce 91 < sm < 99 | — | — | ce 2 < sm < 3 | ce 74 < kr < 98 |
| $\Delta$n (589 nm, 20° C.) | — | +0.0920 | +0.0921 | +0.0892 | +0.0900 |
| $n_o$ (589 nm, 20° C.) | — | 1.5586 | 1.5591 | 1.5492 | 1.5609 |
| d·$\Delta$n ($\mu$m) = 0.5 | — | — | — | — | — |
| $\Delta\epsilon$ (1 kHz, 20° C.) | — | 1.66 | 1.59 | 1.83 | 1.67 |
| $\epsilon_\parallel$ (1 kHz, 20° C.) | — | 2.05 | 2.02 | 2.26 | 2.06 |
| $V_{(10,0,20)}$ [V] | — | 2.57 | 2.61 | 2.89 | 2.66 |
| $V_{(60,0,20)}$ [V] | | | | | |
| $V_{(90,0,20)}$ [V] | | | | | |
| Composition [%]: | PCH-5F 5.0 | PCH-5F 5.0 | PCH-5F 8.0 | PCH-5F 5.0 | |
| | PCH-7F 6.0 | PCH-7F 5.0 | PCH-7F 8.0 | PCH-7F 6.0 | |
| | CCP-20CF3 11.0 | CCP-20CF3 11.0 | CCP-20CF3 9.0 | CCP-20CF3 11.0 | |
| | CCP-30CF3 12.0 | CCP-30CF3 12.0 | CCP-30CF3 10.0 | CCP-30CF3 12.0 | |
| | CCP-40CF3 10.0 | CCP-40CF3 10.0 | CCP-40CF3 9.0 | CCP-40CF3 10.0 | |
| | CCP-50CF3 12.0 | CCP-50CF3 12.0 | CCP-50CF3 10.0 | CCP-50CF3 10.0 | |
| | CUP-30CF3 12.0 | CUP-30CF3 12.0 | CUP-30CF3 12.0 | CUP-3F.F 12.0 | |
| | CCP-3CF3.F.F 12.0 | CUP-50CF3 11.0 | CCP-3CF3.F.F 12.0 | CUP-5F.F 12.0 | |
| | CCP-5CF3.F.F 11.0 | CCP-30CF2.F.F 12.0 | CCP-50CF3 12.0 | CCP-30CF2.F.F 11.0 | |
| | CCP-3CL.F.F 12.0 | CCP-50CF2.F.F 11.0 | CCP-30CF2.F.F 11.0 | CCP-50CF2.F.F 12.0 | |
| | CCP-5CL.F.F 9.0 | CH-33 4.0 | CCP-50CF2.F.F 11.0 | CH-33 9.0 | |

| example | 196 | 197 | 198 | 199 | 200 |
|---|---|---|---|---|---|
| Clearing Point [°C.] | +103 | +98 | +80 | +95 | +91 |
| Viscosity [mm²s⁻¹] −20° C. | ce 91 < sm < 99 | — | — | 744h? | 24 < kr < 42 |
| $\Delta$n (589 nm, 20° C.) | +0.0913 | +0.0921 | +0.0910 | +0.0941 | +0.0934 |
| $n_o$ (589 nm, 20° C.) | 1.5603 | 1.5591 | 1.5570 | 1.5666 | 1.5648 |
| d·$\Delta$n ($\mu$m) = 0.5 | — | — | — | — | — |
| $\Delta\epsilon$ (1 kHz, 20° C.) | 1.67 | 1.59 | 1.59 | 1.54 | 1.48 |
| $\epsilon_\parallel$ (1 kHz, 20° C.) | 2.05 | 2.02 | 2.02 | 1.97 | 1.91 |
| $V_{(10,0,20)}$ [V] | 2.56 | 2.61 | 2.62 | 2.58 | 2.50 |
| $V_{(60,0,20)}$ [V] | | | | | |
| $V_{(90,0,20)}$ [V] | | | | | |
| Composition [%]: | PCH-5F 8.0 | PCH-5F 5.0 | PCH-5F 5.0 | PCH-5F 5.0 | PCH-5F 5.0 |
| | CCP-20CF3 9.0 | PCH-7F 5.0 | PCH-7F 6.0 | PCH-7F 5.0 | PCH-7F 5.0 |
| | CCP-30CF3 10.0 | CCP-20CF3 9.0 | CCP-20CF3 9.0 | CCP-20CF3 9.0 | CCP-20CF3 9.0 |

-continued

| example | 201 | 202 | 203 | 204 | 205 | 206 |
|---|---|---|---|---|---|---|
| Clearing Point [°C.] | +92 | +95 | +95 | +95 | +93 | +83 |
| Viscosity [mm²s⁻¹] | 24 < kr < 42 | | | | | |
| −20° C. | | | | | 49 < kr < 120 | |
| d · Δn (μm) = 0.5 | | | | | 107 | |
| Δn (589 nm, 20° C.) | +0.0933 | +0.0921 | +0.0917 | +0.1404 | +0.0870 | +0.0881 |
| $n_e$ (589 nm, 20° C.) | 1.5643 | 1.5638 | 1.5637 | 1.6420 | 1.5564 | 1.5561 |
| Δε (1 kHz, 20° C.) | | | | +11.6 | | |
| ε∥ (1 kHz, 20° C.) | | | | 15.7 | | |
| $V_{(10,0,20)}$ [V] | 1.49 | 1.55 | 1.53 | 1.25 | 1.88 | 1.47 |
| $V_{(60,0,20)}$ [V] | 1.91 | 1.99 | 1.96 | 1.58 | 2.31 | 1.82 |
| $V_{(90,0,20)}$ [V] | 2.51 | 2.61 | 2.54 | 2.05 | 2.88 | 2.27 |
| Composition [%]: | 5.0 PCH-5F | 5.0 PCH-5F | 5.0 BCH-3F.F | 12.0 PCH-5F | 5.0 PCH-5F | 5.0 PCH-5F |
| | 5.0 PCH-7F | 5.0 PCH-7F | 5.0 CFET-5F.F.F | 20.0 PCH-7F | 6.0 PCH-7F | 6.0 PCH-7F |
| | 9.0 CCP-20CF3 | 9.0 CCP-20CF3 | 9.0 BCH-3F.F.F | 23.0 CCP-20CF3 | 11.0 CCP-20CF3 | 11.0 CCP-20CF3 |
| | 11.0 CCP-30CF3 | 11.0 CCP-30CF3 | 11.0 BCH-5F.F | 40.0 CCP-30CF3 | 12.0 CCP-30CF3 | 12.0 CCP-30CF3 |
| | 10.0 CCP-40CF3 | 10.0 CCP-40CF3 | 10.0 CBC-55F | 5.0 CCP-40CF3 | 10.0 CCP-40CF3 | 10.0 CCP-40CF3 |
| | 11.0 CCP-50CF3 | 11.0 CCP-50CF3 | 11.0 | | 12.0 CCP-50CF3 | 12.0 CCP-50CF3 |
| | 11.0 CUP-3F.F | 11.0 CUP-3F.F | 11.0 | | 12.0 CUP-30CF3 | 12.0 CUP-30CF3 |
| | 10.0 CUP-5F.F | 10.0 CUP-5F.F | 10.0 | | 12.0 CUP-50CF3.F | 12.0 CUP-50CF2.F.F |
| | 12.0 CCP-30CF2.F.F | 12.0 CCP-30CF2.F.F | 12.0 | | 11.0 CCP-30CF2.F.F | 11.0 CCP-3F.F |
| | 12.0 CCP-50CF2.F.F | 12.0 CCP-50CF2.F.F | 12.0 | | 12.0 CCP-50CF2.F.F | 12.0 CCP-5F.F |
| | 4.0 CCUP-30CF3 | 4.0 CCEPC-53 | 4.0 | | 9.0 CCUP-3F.F | 9.0 CCUP-3F.F |
| | | | | | 5.0 CCP-3CL.F.F | |
| | | | | | 5.0 CCP-5CL.F.F | |

| example | 207 | 208 | 209 | 210 | 211 | 212 |
|---|---|---|---|---|---|---|
| Clearing Point [°C.] | +128 | +92 | +81 | +92 | +104 | +94 |
| Viscosity [mm²s⁻¹] | — | kr < 15 | 432 h? | 744 h? | 744 h? | 744 h? |
| −20° C. | | | | | | |
| d · Δn (μm) = 0.5 | | | | | | |
| Δn (589 nm, 20° C.) | +0.089 | +0.0870 | +0.0874 | +0.0913 | +0.0953 | +0.0875 |
| $n_e$ (589 nm, 20° C.) | 1.554 | 1.5601 | 1.5610 | 1.5654 | 1.5713 | 1.5590 |
| Δε (1 kHz, 20° C.) | — | — | — | — | — | — |
| ε∥ (1 kHz, 20° C.) | — | — | — | — | — | — |
| $V_{(10,0,20)}$ [V] | 1.95 | 1.68 | 1.70 | 1.63 | 1.72 | 1.72 |
| $V_{(60,0,20)}$ [V] | 2.35 | 2.08 | 2.11 | 2.01 | 2.13 | 2.15 |
| $V_{(90,0,20)}$ [V] | 3.01 | 2.71 | 2.74 | 2.53 | 2.69 | 2.81 |
| Composition [%]: | 34.0 PCH-5F | 10.0 PCH-301 | 4.0 PCH-5F | 5.0 PCH-5F | 5.0 PCH-5F | 5.0 PCH-5F |
| | 66.0 PCH-7F | 10.0 PCH-5F | 9.0 PCH-7F | 5.0 CH-7F | 5.0 PCH-7F | 5.0 PCH-7F |
| | CCP-30CF2.F.F | 9.0 PCH-7F | 9.0 CCP-20CF3 | 8.0 CCP-20CF3 | 8.0 CCP-20CF3 | 8.0 CCP-20CF3 |
| | CCP-50 CF2.F.F | 11.0 CCP-20CF3 | 9.0 CCP-30CF3 | 9.0 CCP-30CF3 | 8.0 CCP-30CF3 | 9.0 CCP-30CF3 |
| | | 10.0 CCP-30CF3 | 11.0 CCP-50CF3 | 9.0 CCP-50CF3 | 8.0 CCP-50CF3 | 9.0 CCP-50CF3 |

-continued

| example | 213 | 214 | 215 | 216 | 217 | 218 |
|---|---|---|---|---|---|---|
| Composition [%]: | | | | | | |
| PCH-5F | 8.0 | | | | | |
| PCH-7F | 7.0 | | | | | |
| CCP-20CF3 | 5.0 | | | | | |
| CCP-30CF3 | 6.0 | | | | | |
| CCP-20CF3 | 6.0 | | | | | |
| CCP-50CF3 | 7.0 | CCP-50CF3 | CCP-40CF3 | 10.0 ECCP-3F.F | 8.0 ECCP-3F.F | 8.0 ECCP-3F.F |
| ECCP-3F | 7.0 | CUP-3FF | CCP-50CF3 | 11.0 ECCP-5F.F | 8.0 ECCP-5F.F | 8.0 ECCP-5F.F |
| ECCP-5F | 8.0 | CUP-5FF | CUP-3FF | 7.0 CUP-3FF | 9.0 CUP-3FF | 8.0 CUP-3FF |
| ECCP-3F.F | 7.0 | CCP-30CF2.FF | CUP-5FF | 10.0 CUP-5FF | 9.0 CUP-5FF | 8.0 CUP-5FF |
| ECCP-5F.F | 6.0 | CCP-50CF2.FF | CCP-30CF2.FF | 10.0 CCP-30CF2.FF | 12.0 CCP-30CF2.FF | 10.0 CCP-30CF2.FF |
| CUP-3FF | 7.0 | CBC-33F | CCP-50CF2.FF | 9.0 CCP-50CF2.FF | 15.0 CCP-50CF2.FF | 15.0 CCP-50CF2.FF |
| CUP-5FF | 6.0 | | CBC-33F | 4.0 CBC-33F | 3.0 CBC-33F | 3.0 CP-30CF3 |
| CCP-30CF2.FF | 5.0 | | | | CBC-53F | 3.0 CP-50CF3 |
| CCP-50CF2.FF | 7.0 | | | | CBC-55F | 3.0 |
| CBC-33F | 13.0 | | | | | |
| CBC-53F | 4.0 | | | | | |
| CBC-55F | 4.0 | | | | | |
| Clearing Point [°C.] | +100 | +102 | +107 | +99 | +100 | +99 |
| Viscosity [mm²s⁻¹] −20° C. | 240 h? | 240 h? | 2 h < sm < 3 h | 240 h? | 216 h? | 350 |
| d · Δn (μm) = 0.5 | | | | | | |
| Δn (589 nm, 20° C.) | +0.0896 | +0.0925 | +0.0841 | +0.0838 | +0.0907 | +0.1064 |
| $n_o$ (589 nm, 20° C.) | 1.5686 | 1.5700 | 1.5618 | 1.5551 | 1.5692 | 1.5903 |
| Δε (1 kHz, 20° C.) | — | — | — | — | — | +6.7 |
| ε∥ (1 kHz, 20° C.) | — | — | — | — | — | 10.3 |
| $V_{(10,0,20)}$ [V] | 1.97 | 1.86 | 1.88 | 1.88 | 1.88 | 1.82 |
| $V_{(60,0,20)}$ [V] | 2.45 | 2.30 | 2.33 | 2.33 | 2.32 | 2.23 |
| $V_{(90,0,20)}$ [V] | 3.17 | 2.92 | 3.01 | 3.01 | 2.94 | 2.89 |

| example | 219 | 220 | 221 | 222 | 223 | 224 |
|---|---|---|---|---|---|---|
| | | | | | | |
| | | | | | | |
| | | PCH-5F | 5.0 | PCH-5F | 4.0 | PCH-5F 7.0 |
| | | PCH-7F | 5.0 | PCH-7F | 4.0 | PCH-7F 7.0 |
| | | CCP-20CF3 | 5.0 | CCP-20CF3 | 5.0 | CCP-20CF3 5.0 |
| | | CCP-30CF3 | 8.0 | CCP-30CF3 | 7.0 | CCP-30CF3 6.0 |
| | | CCP-50CF3 | 8.0 | CCP-50CF3 | 9.0 | CCP-50CF3 6.0 |
| | | ECCP-3F | 12.0 | ECCP-3F | 11.0 | ECCP-3F 8.0 |
| | | ECCP-3F.F | 11.0 | ECCP-3F.F | 10.0 | BCH-3F.F 11.0 |
| | | ECCP-5F.F | 10.0 | ECCP-5F.F | 4.0 | ECCP-5F.F 11.0 |
| | | CUP-3FF | 6.0 | CUP-3FF | 3.0 | CUP-3FF 6.0 |
| | | CUP-5FF | 5.0 | CUP-5FF | 8.0 | CUP-5FF 5.0 |
| | | CCP-30CF2.FF | 14.0 | CCP-30CF2.FF | 7.0 | CCP-30CF2.FF 7.0 |
| | | CCP-50CF2.FF | 7.0 | CCP-50CF2.FF | 4.0 | CCP-50CF2.FF 13.0 |
| | | CP-30CF3 | 3.0 | CP-20CF3 | 7.0 | CBC-33F 4.0 |
| | | CP-50CF3 | 13.0 | CP-50CF3 | 4.0 | CBC-53F 4.0 |
| | | | | CBC-33F | 4.0 | CBC-55F 4.0 |
| | | | | CBC-53F | 4.0 | |
| Clearing Point [°C.] | +88 | +101 | +93 | +99 | +101 | +103 |
| Viscosity [mm²s⁻¹] −20° C. | 216 h? | 168 h? | 168 h? | 168 h? | 168 h? | 168 h |
| d · Δn (μm) = 0.5 | | | | | | |
| Δn (589 nm, 20° C.) | +0.0813 | +0.085 | — | +0.0951 | +0.0913 | +0.0960 |
| $n_o$ (589 nm, 20° C.) | 1.5536 | 1.5560 | — | 1.5761 | 1.5690 | 1.5756 |
| Δε (1 kHz, 20° C.) | — | +7.2 | — | — | — | — |
| ε∥ (1 kHz, 20° C.) | — | 10.8 | — | — | — | — |
| $V_{(10,0,20)}$ [V] | 1.85 | 1.77 | — | 1.90 | 1.84 | 1.90 |
| $V_{(60,0,20)}$ [V] | 2.28 | 2.20 | — | 2.34 | 2.28 | 2.38 |
| $V_{(90,0,20)}$ [V] | 2.96 | 2.77 | — | 2.96 | 2.89 | 3.09 |

5,480,581

| example | 225 | 226 | 227 | 228 | 229 | 230 |
|---|---|---|---|---|---|---|
| Composition [%]: | PCH-5F | 9.0 PCH-5F | 5.0 PCH-5F | 9.0 PCH-5F | 7.0 PCH-5F | 6.0 PCH-5F |
| | PCH-7F | 8.0 PCH-7F | 5.0 PCH-7F | 9.0 PCH-7F | 7.0 PCH-7F | 6.0 PCH-7F |
| | CCP-20CF3 | 8.0 CCP-20CF3 | 8.0 CCP-20CF3 | 10.0 CCP-20CF3 | 5.0 CCP-20CF3 | 6.0 CCP-20CF3 |
| | CCP-30CF3 | 9.0 CCP-30CF3 | 9.0 CCP-30CF3 | 12.0 CCP-30CF3 | 6.0 CCP-30CF3 | 8.0 CCP-30CF3 |
| | CCP-50CF3 | 8.0 CCP-50CF3 | 9.0 CCP-50CF3 | 10.0 CCP-50CF3 | 6.0 CCP-50CF3 | 8.0 CCP-50CF3 |
| | ECCP-3FF | 11.0 ECCP-3FF | 11.0 ECCP-3FF | 11.0 ECCP-3FF | 8.0 ECCP-3FF | 6.0 ECCP-3FF |
| | ECCP-5FF | 10.0 ECCP-5FF | 10.0 ECCP-5FF | 10.0 ECCP-5FF | 11.0 ECCP-3FF | 10.0 ECCP-3FF |
| | CUP-3FF | 4.0 CUP-3FF | 5.0 CCP-30CF2.FF | 9.0 ECCP-5FF | 11.0 ECCP-5FF | 11.0 ECCP-5FF |
| | CUP-5FF | 3.0 CUP-5FF | 4.0 CCP-50CF2.FF | 14.0 BCH-3FF | 4.0 CUP-3FF | 4.0 CUP-3FF |
| | CCP-30CF2.FF | 8.0 CCP-30CF2.FF | 8.0 CP-20CF3 | 3.0 BCH-5FF | 4.0 CUP-5FF | 6.0 BCH-3FF |
| | CCP-50CF2.FF | 14.0 CCP-50CF2.FF | 14.0 CP-50CF3 | 3.0 CUP-3FF | 6.0 CCP-30CF2.FF | 6.0 BCH-5FF |
| | CP-20CF3 | .0 | | CUP-5FF | 5.0 CCP-50CF2.FF | 7.0 CUP-3FF |
| | CP-30CF3 | 4.0 | | CCP-30CF2.FF | 6.0 CBC-33F | 11.0 CUP-5FF |
| | CP-50CF3 | 4.0 | | CCP-50CF2.FF | 6.0 CBC-53F | 3.0 CCP-30CF2.FF |
| | | | | CBC-33F | 4.0 | 4.0 CCP-50CF2.FF |
| | | | | CBC-53F | 4.0 | CBC-33F |
| | | | | | | CBC-53F |

| example | 225 | 226 | 227 | 228 | 229 | 230 |
|---|---|---|---|---|---|---|
| Clearing Point [°C.] | +89 | +103 | | +102 | +99 | +99 |
| Viscosity [mm²s⁻¹] -20° C. | ? | 290 | | 168 h | 330 | 168 h? |
| d · Δn (μm) = 0.5 | | 870 | | 96 < kr < 120 | 1040 | 560 |
| Δn (589 nm, 20° C.) | +0.0783 | +0.0848 | | +0.0949 | +0.0960 | +0.0964 |
| n₀ (589 nm, 20° C.) | 1.5489 | 1.5559 | | 1.5730 | 1.5751 | 1.5767 |
| Δε (1 kHz, 20° C.) | — | +6.9 | | — | +5.3 | — |
| ε‖ (1 kHz, 20° C.) | — | 10.5 | | — | 10.4 | — |
| V(10,0,20) [V] | 1.94 | 1.81 | | 1.74 | 1.79 | 1.86 |
| V(60,0,20) [V] | 2.41 | 2.24 | | 2.15 | 2.21 | 2.28 |
| V(90,0,20) [V] | 3.12 | 2.83 | | 2.71 | 2.81 | 2.87 |

| Composition [%]: | 231 | 232 | 233 | 234 | 235 | 236 |
|---|---|---|---|---|---|---|
| | 9.0 PCH-5F | | 5.0 PCH-5F | 6.0 PCH-5F | 7.0 PCH-5F | |
| | 10.0 PCH-7F | | 5.0 PCH-7F | 6.0 PCH-6F | 7.0 PCH-7F | |
| | 10.0 CCP20CF3 | | 8.0 CCP-20CF3 | 6.0 PCH-7F | 5.0 CCP-20CF3 | |
| | 11.0 CCP30CF3 | | 9.0 CCP-30CF3 | 8.0 CCP-20CF3 | 6.0 CCP-30CF3 | |
| | 10.0 CCP-50CF3 | | 9.0 CCP-50CF3 | 8.0 CCP-30CF3 | 8.0 CCP-50CF3 | |
| | 11.0 ECCP-3FF | | 11.0 ECCP-3FF | 7.0 CCP-50CF3 | 6.0 ECCP-3F | |
| | 10.0 ECCP-5FF | | 10.0 ECCP-5FF | 11.0 ECCP-3FF | 10.0 ECCP-3FF | |
| | 11.0 CUP-3FF | | 5.0 CUP-3FF | 10.0 ECCP-5FF | 14.0 ECCP-5FF | |
| | 14.0 CUP-5FF | | 4.0 CUP-5FF | 6.0 BCH-3FF | 4.0 BCH-3FF | |
| | 4.0 CCP-30CF2.FF | | 8.0 CCP-30CF2.FF | 5.0 BCH-5FF | 9.0 BCH-5FF | |
| | CCP-50CF2.FF | | 14.0 CCP-50CF2.FF | 4.0 CUP-3FF | 14.0 CUP-5FF | |
| | CP-30CF3 | | 6.0 CCP-30CF2.FF | 10.0 CUP-5FF | 2.0 CCP-30CF2.FF | |
| | CP-50CF3 | | CBC-33F | 7.0 CCP-30CF2.FF | CCP-50CF2.FF | |
| | | | 3.0 CBC-53F | 11.0 CCP-50CF2.FF | CBC-33F | |
| | | | 4.0 | 4.0 CP-30CF3 | CBC-53F | |
| | | | | | CBC-55F | |

| example | 231 | 232 | 233 | 234 | 235 | 236 |
|---|---|---|---|---|---|---|
| Clearing Point [°C.] | +86 | +91 | +93 | +91 | +89 | |
| Viscosity [mm²s⁻¹] -20° C. | — | — | — | 200 | — | — |

-continued

| | | | | | | | | | | | | |
|---|---|---|---|---|---|---|---|---|---|---|---|---|
| d · Δn (μm) = 0.5 | | | | | | | | | | | | |
| Δn (589 nm, 20° C.) | | +0.0980 | | +0.0901 | | +0.0923 | | +0.0787 | | +0.0891 | | — |
| $n_e$ (589 nm, 20° C.) | | 1.5756 | | 1.5614 | | 1.5653 | | 1.5503 | | 1.5627 | | — |
| Δε (1 kHz, 20° C.) | | +5.8 | | +5.2 | | +5.2 | | +5.6 | | +5.3 | | — |
| ε∥ (1 kHz, 20° C.) | | 9.04 | | 8.46 | | 8.30 | | 9.0 | | 8.5 | | — |
| $V_{(10,0,20)}$ [V] | | 1.88 | | 2.06? | | 2.04? | | 1.95 | | 1.99? | | — |
| $V_{(60,0,20)}$ [V] | | 2.22 | | 2.42? | | 2.42? | | 2.42 | | 2.35? | | — |
| $V_{(90,0,20)}$ [V] | | 2.74 | | 3.03? | | 3.02? | | 3.12 | | — | | — |
| Composition [%]: | PCH-5F | 8.5 | PCH-5F | 8.5 | PCH-5F | 8.5 | PCH-5F | 6.0 | PCH-5F | 8.5 | PCH-5F | 7.0 |
| | PCH-6F | 6.8 | PCH-6F | 6.8 | PCH-6F | 6.8 | PCH-6F | 6.0 | PCH-6F | 6.8 | PCH-7F | 7.0 |
| | PCH-7F | 5.1 | PCH-7F | 5.1 | PCH-7F | 5.1 | PCH-7F | 6.0 | PCH-7F | 5.1 | CCP-20CF3 | 9.0 |
| | CCP-20CF3 | 6.8 | CCP-20CF3 | 6.8 | CCP-20CF3 | 6.8 | CCP-20CF3 | 8.0 | CCP-20CF3 | 6.8 | CCP-30CF3 | 10.0 |
| | CCP-30CF3 | 10.2 | CCP-30CF3 | 10.2 | CCP-30CF3 | 10.2 | CCP-30CF3 | 10.0 | CCP-30CF3 | 10.2 | CCP-50CF3 | 10.0 |
| | CCP-40CF3 | 6.0 | CCP-40CF3 | 6.0 | CCP-40CF3 | 6.0 | CCP-50CF3 | 10.0 | CCP-40CF3 | 6.0 | ECCP-3F.F | 12.0 |
| | CCP-50CF3 | 9.3 | CCP-50CF3 | 9.3 | CCP-50CF3 | 9.3 | ECCP-3F.F | 14.0 | CCP-50CF3 | 9.3 | ECCP-5F.F | 11.0 |
| | BCH-3F.F | 10.2 | BCH-3F.F | 10.2 | BCH-3F.F | 10.2 | ECCP-5F.F | 14.0 | BCH-3F.F | 10.2 | CUP-3F.F | 5.5 |
| | BCH-5F.F | 8.5 | BCH-5F.F | 8.5 | BCH-5F.F | 8.5 | CCP-30CF2.F.F | 9.0 | BCH-5F.F | 8.5 | CUP-5F.F | 4.5 |
| | ECCP-30CF3 | 4.2 | ECCP-30CF3 | 4.2 | ECCP-30CF3 | 4.2 | CCP-50CF2.F.F | 14.0 | ECCP-30CF3 | 4.2 | CCP-30CF2.F.F | 9.0 |
| | ECCP-50CF3 | 4.2 | ECCP-50CF3 | 4.2 | ECCP-50CF3 | 4.2 | CP-30CF3 | 3.0 | ECCP-50CF3 | 4.2 | CCP-50CF2.F.F | 15.0 |
| | CBC-33F | 1.7 | CBC-33F | 1.7 | CBC-33F | 1.7 | | | CBC-33F | 1.7 | | |
| | CBC-53F | 1.7 | CBC-53F | 1.7 | CBC-53F | 1.7 | | | CBC-53F | 1.7 | | |
| | CBC-55F | 1.7 | CBC-55F | 1.7 | CBC-55F | 1.7 | | | CBC-55F | 1.7 | | |
| | BCH-3F.F.F | 15.0 | CCP-30CF2.F.F | 15.0 | CCP-3CL.F.F | 15.0 | | | CCP-3F.F.F | 15.0 | | |
| example | 237 | | 238 | | 239 | | 240 | | 241 | | 242 | |
| Clearing Point [°C.] | | +109 | | +108 | | +90 | | +89 | | +90 | | +91 |
| Viscosity [$mm^2s^{-1}$] | | — | | — | | — | | — | | — | | 280 |
| −20° C. | | | | | | | | | | | | |
| d · Δn (μm) = 0.5 | | | | | | | | | | | | |
| Δn (589 nm, 20° C.) | | +0.0870 | | +0.0866 | | +0.0821 | | +0.0818 | | +0.0797 | | +0.0787 |
| $n_e$ (589 nm, 20° C.) | | 1.5622 | | 1.5620 | | 1.5542 | | 1.5539 | | 1.5513 | | 1.5503 |
| Δε (1 kHz, 20° C.) | | — | | — | | — | | — | | — | | 5.85 |
| ε∥ (1 kHz, 20° C.) | | — | | — | | — | | — | | — | | 9.34 |
| $V_{(10,0,20)}$ [V] | | — | | 1.97 | | 1.69 | | 1.68 | | 1.76 | | 1.80 |
| $V_{(60,0,20)}$ [V] | | — | | 2.41 | | 2.09 | | 2.05 | | 2.17 | | 2.21 |
| $V_{(90,0,20)}$ [V] | | — | | 2.99 | | 2.61 | | 2.57 | | 2.70 | | 2.75 |
| Composition [%]: | PCH-5F | 6.0 | PCH-5F | 6.0 | PCH-5F | 8.0 | PCH-5F | 8.0 | PCH-5F | 9.0 | PCH-5F | 6.0 |
| | PCH-7F | 6.0 | PCH-7F | 6.0 | PCH-7F | 8.0 | PCH-6F | 8.0 | PCH-7F | 9.0 | PCH-7F | 5.0 |
| | CCP-20CF3 | 8.0 | CCP-20CF3 | 8.0 | CCP-20CF3 | 8.0 | CCP-20CF3 | 8.0 | CCP20CF3 | 8.0 | CCH-303 | 5.0 |
| | CCP-30CF3 | 9.0 | CCP-30CF3 | 9.0 | CCP-30CF3 | 9.0 | CCP-30CF3 | 9.0 | CCP-30CF3 | 9.0 | CCH-501 | 4.0 |
| | CCP-50CF3 | 9.0 | CCP-50CF3 | 9.0 | CCP-50CF3 | 8.0 | CCP-50CF3 | 8.0 | CCP-50CF3 | 8.0 | CCP-20CF3 | 6.0 |
| | ECCP-3F.F | 11.0 | ECCP-3F.F | 11.0 | ECCP-3F.F | 11.0 | ECCP-3F.F | 11.0 | ECCP-3F.F | 12.0 | CCP-30CF3 | 6.0 |
| | ECCP-5F.F | 10.0 | ECCP-5F.F | 10.0 | ECCP-5F.F | 10.0 | ECCP-5F.F | 10.0 | ECCP-5F.F | 11.0 | CCP-40CF3 | 6.0 |
| | CUP-3F.F | 5.0 | CP-3F.F | 5.0 | CUP03F.F | 4.0 | CUP-3F.F | 4.0 | CUP-3F.F | 3.0 | CCP-50CF3 | 6.0 |
| | CUP-5F.F | 4.0 | CUP-5F.F | 4.0 | CUP-5F.F | 3.0 | CUP-5F.F | 3.0 | CCP-30CF2.F.F | 8.0 | ECCP-3F.F | 12.0 |
| | CCP-30CF2.F.F | 8.0 | CCP-30CF2.F.F | 8.0 | CCP-30CF2.F.F | 8.0 | CCP-30CF2.F.F | 8.0 | CCP-50CF2.F.F | 14.0 | ECCP-5F.F | 12.0 |
| | CCP-50CF2.F.F | 14.0 | CCP-50CF2.F.F | 14.0 | CCP-50CF2.F.F | 14.0 | CCP-50CF2.F.F | 14.0 | CP-30CF3 | 5.0 | CUP-3F.F | 4.0 |
| | CCEPC-53 | 10.0 | CCEPC-35 | 5.0 | CP-30CF3 | 5.0 | CP-30CF3 | 5.0 | CP-50CF3 | 4.0 | CCP-30CF2.F.F | 12.0 |
| | | | CCEPC-53 | 5.0 | CP-50CF3 | 4.0 | CP-50CF3 | 4.0 | | | CCP-50CF2.F.F | 12.0 |
| | | | | | | | | | | | CP-30CF3 | 4.0 |

-continued

| example | 243 | 244 | 245 | 246 | 247 | 248 |
|---|---|---|---|---|---|---|
| Clearing Point [°C] | +90 | +89 | +93 | +107.2 | +101 | +94 |
| Viscosity [mm²s⁻¹] −20° C. | — | — | — | — | — | — |
| d · Δn (μm) = 0.5 | | | | | | |
| Δn (589 nm, 20° C.) | +0.0753 | +0.0762 | +0.1083 | +0.0935 | +0.1108 | +0.0910 |
| $n_e$ (589 nm, 20° C.) | 1.5467 | 1.5478 | 1.5954 | 1.5699 | 1.5985 | 1.5627 |
| Δε (1 kHz, 20° C.) | — | — | — | — | — | — |
| ε∥ (1 kHz, 20° C.) | — | — | — | — | — | — |
| $V_{(10,0,20)}$ [V] | 1.97 | 1.96 | 1.80 | 1.88 | 1.87 | — |
| $V_{(60,0,20)}$ [V] | 2.43 | 2.42 | 2.22 | 2.33 | 2.29 | — |
| $V_{(90,0,20)}$ [V] | 3.05 | 3.04 | 2.86 | 2.94 | 2.95 | — |
| Composition [%]: | 6.0 PCH-5F | 6.0 PCH-5F | 7.0 PCH-5F | 6.0 PCH-5F | 7.0 PCH-5F | 5.0 PCH-5F |
| | 6.0 PCH-7F | 6.0 PCH-7F | 7.0 PCH-7F | 6.0 PCH-6F | 6.0 PCH-7F | 5.0 PCH-7F |
| | 6.0 CCH-303 | 7.0 PCH-7F | 8.0 CCP-20CF3 | 8.0 PCH-7F | 7.0 CCP-20CF3 | 9.0 CCP-20CF3 |
| | 6.0 CCH-501 | 8.0 CCP-20CF3 | 5.0 CCP-30CF3 | 9.0 CCP-20CF3 | 5.0 CCP-30CF3 | 11.0 CCP-30CF3 |
| | 5.0 CCP-20CF3 | 8.0 CCP-30CF3 | 6.0 CCP-50CF3 | 9.0 CCP-30CF3 | 6.0 CCP-40CF3 | 10.0 CCP-40CF3 |
| | 6.0 CCP-30CF3 | 9.0 CCP-50CF3 | 6.0 ECCP-3F.F | 11.0 CCP-50CF3 | 6.0 CCP-50CF3 | 11.0 CCP-50CF3 |
| | 6.0 CCP-40CF3 | 6.0 ECCP-3F.F | 12.0 CUP-3F.F | 10.0 BCH-3F.F | 12.0 CUP-3F.F | 11.0 CUP-3F.F |
| | 6.0 CCP-50CF3 | 6.0 ECCP-5F.F | 12.0 CUP-5F.F | 5.0 BCH-5F.F | 6.0 CUP-5F.F | 10.0 CUP-5F.F |
| | 6.0 ECCP-3F.F | 14.0 CCP-30CF2.F.F | 6.0 CUP-5F.F | 4.0 CUP-3F.F | 6.0 CCP-30CF2.F.F | 12.0 CCP-30CF2.F.F |
| | 14.0 CCP-30CF2.F.F | 12.0 CCP-50CF2.F.F | 5.0 CCP-30CF2.F.F | 8.0 CUP-5F.F | 5.0 CCP-50CF2.F.F | 12.0 CCP-50CF2.F.F |
| | 12.0 CCP-50CF2.F.F | 12.0 CP-30CF3 | 4.0 CCP-50CF2.F.F | 14.0 CCP-30CF2.F.F | 4.0 CCECP-5F.F | 4.0 CCECP-5F.F |
| | 12.0 CP-30CF3 | 3.0 CP-50CF3 | 7.0 CBC-33F | 5.0 CCP-50CF2.F.F | 7.0 CBC-33F | |
| | 3.0 CP-50CF3 | | 4.0 CBC-53F | 5.0 CBC-33F | 4.0 CBC-53F | |
| | | | 4.0 CBC-55F | 5.0 CBC-53F | 3.0 CBC-55F | |
| | | | 3.0 CBC-33 | | 3.0 CBC-33 | |
| | | | | | 3.0 CBC-53 | |

We claim:

1. A liquid-crystalline medium based on a mixture of polar compounds having positive dielectric anisotropy, comprising:

one or more compounds of formula I

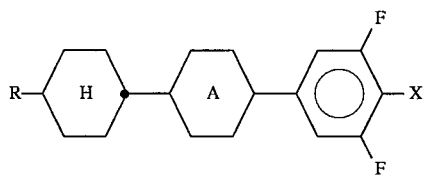

in which X is fluorine, chlorine, $OCF_3$ or $OCHF_2$, ring A is trans-1,4-cyclohexylene or 1,4-phenylene, and R is alkyl, oxaalkyl, fluoroalkyl or alkenyl, in each case having up to 7 carbon atoms; and one or more compounds selected from formula II

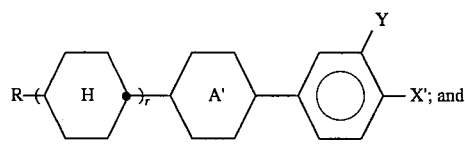

one or more compounds selected from formula IV

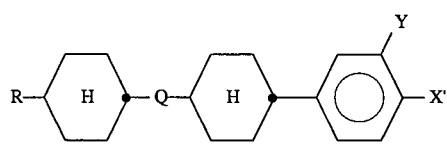

wherein

R is as defined above,

Q is —$C_2H_4$—, —$C_4H_8$— or —CO—O—,

X' is F, Cl, $CF_3$ or $OCHF_2$,

Y is H or F,

A' is trans-1,4-cyclohexylene, and r is 0 or 1.

2. A medium according to claim 1, further comprising one or more compounds selected from formulae V and VI:

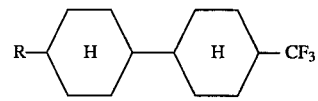

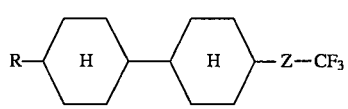

wherein

R is alkyl, oxaalkyl, fluoroalkyl or alkenyl, in each case having up to 7 carbon atoms; and Z is —$C_2H_4$, —CO—O— or —O—CO—.

3. A medium according to claim 1, further comprising one or more compounds selected from formulae VII to XII:

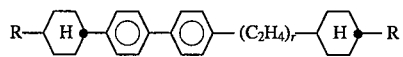

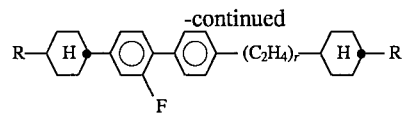

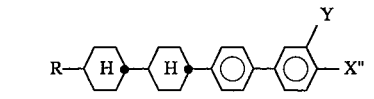

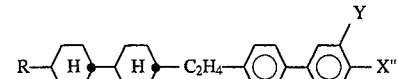

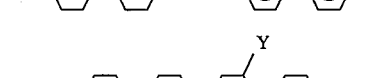

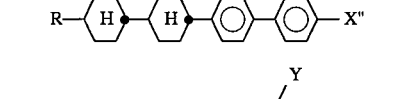

wherein

R is alkyl, oxaalkyl, fluoroalkyl or alkenyl, in each case having up to 7 carbon atoms;

X" is F, Cl, $CF_3$, $OCF_3$ or $OCHF_2$;

Y is H or F; and r is 0 or 1.

4. A medium according to claim 1, wherein the proportion of compounds of the formulae I, II, and IV together in the total mixture is at least 50% by weight.

5. A medium according to claim 1, wherein the proportion of compounds of the formula I in the total mixture is from 10–50% by weight.

6. A medium according to claim 1, wherein the proportion of compounds of formulae II and IV in the total mixture is 30–70% by weight.

7. In an electrooptical liquid-crystal display device containing a liquid-crystalline medium, the improvement wherein said medium is one of claim 1.

8. A medium according to claim 1, wherein X is chlorine, $OCF_3$ or $OCHF_2$.

9. A medium according to claim 1, further comprising one or more compounds of formula A

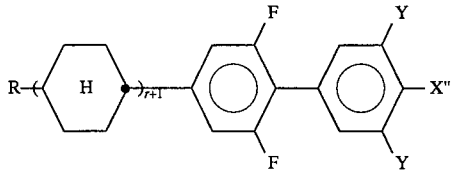

in which

R is alkyl, oxaalkyl, fluoroalkyl or alkenyl in each case having up to 7 carbon atoms, X" is F, Cl, $CF_3$, $OCF_3$ or $OCHF_2$, Y is, in each case, H or F, and r is 0 or 1.

10. A medium according to claim 9, wherein the X and two Y substituents in said compound of formula A are selected from one of the following groups (a)–(d):

|     | Y | X" | Y |
| --- | --- | --- | --- |
| (a) | F | F | H, |

-continued

|     | Y | X" | Y |
|-----|---|-----|---|
| (b) | H | OCF₃ | H, |
| (c) | F | OCF₃ | H, or |
| (d) | F | OCHF₂ | H. |

11. A medium according to claim 9, wherein ring A is cyclohexylene and X is OCHF₂ in formula I.

12. A medium according to claim 9, wherein the compound of formula A is of the formula

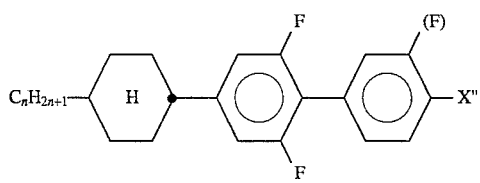

wherein (F) is F or H and n is 1 to 7.

13. A medium according to claim 2, further comprising one or more compounds selected from formulae VII to XII:

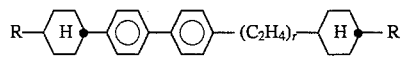 VII

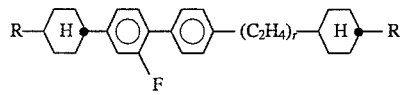 VIII

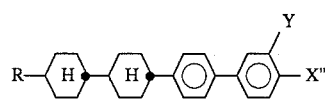 IX

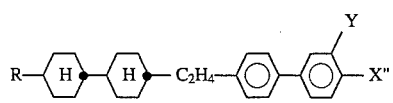 X

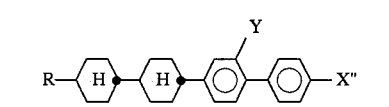 XI

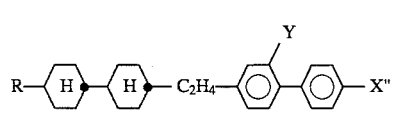 XII wherein

R is alkyl, oxaalkyl, fluoroalkyl or alkenyl, in each case having up to 7 carbon atoms, X" is F, Cl, CF₃, OCF₃ or OCHF₂, Y is H or F, and r is 0 or 1.

14. In a method of generating an electrooptical liquid crystal display using an electrooptical liquid crystal display device, the improvement wherein said device is one of claim 7.

15. A medium according to claim 1, wherein Q is —C₂H₄— or —C₄H₈—.

16. A medium according to claim 1, further comprising one or more compounds of the formula

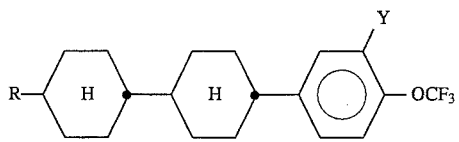

wherein

R is alkyl, alkoxy, fluoroalkyl or alkenyl, in each case having up to 7 carbon atoms, and Y is H or F.

17. A medium according to claim 13, wherein said medium consists essentially of compounds selected from formulae I, II, and IV–XII.

18. A liquid-crystalline medium based on a mixture of polar compounds having positive dielectric anisotropy comprising:

one or more compounds of formula I

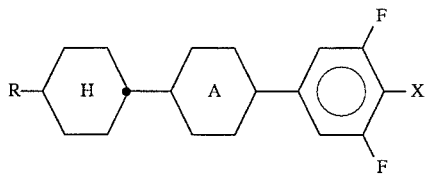

and one or more compounds of formula A

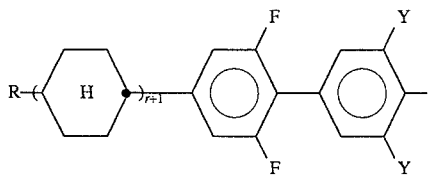

in which

R is alkyl, oxaalkyl, fluoroalkyl or alkenyl, in each case having up to 7 carbon atoms, X is F, Cl, CF₃, OCF₃ or OCHF₂, ring A is trans-1,4-cyclohexylene or 1,4-phenylene, Y is, in each case, H or F, and r is 0 or 1.

19. A medium according to claim 18, wherein the X and two Y substituents in said compound of formula A are selected from one of the following groups (a)–(d):

|     | Y | X | Y |
|-----|---|-----|---|
| (a) | F | F | H |
| (b) | H | OCF₃ | H, |
| (c) | F | OCF₃ | H, or |
| (d) | F | OCHF₂ | H. |

20. A medium according to claim 18, wherein formula A is of the formula

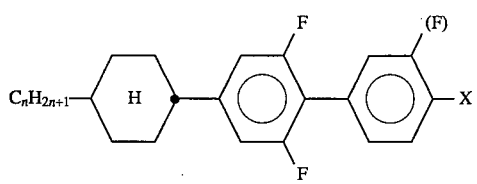

wherein (F) is F or H and n is 1 to 7.

21. A liquid-crystalline medium based on a mixture of polar compounds having positive dielectric anisotropy, comprising:

one or more compounds of formula I

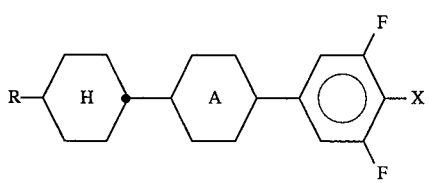

in which X is fluorine, chlorine, $CF_3$, $OCF_3$ or $OCHF_2$, ring A is trans-1,4-cyclohexylene or 1,4-phenylene, and R is alkyl, oxaalkyl, fluoroalkyl or alkenyl, in each case having up to 7 carbon atoms, and one or more compounds selected from formulae V and VI:

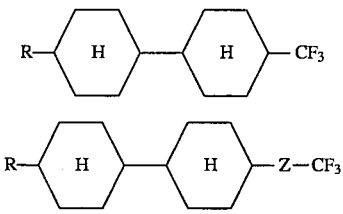

wherein

R is alkyl, oxaalkyl, fluoroalkyl or alkenyl, in each case having up to 7 carbon atoms, and Z is $—C_2H_4—$, $—CO—O—$ or $—O—CO—$.

22. A liquid-crystalline medium based on a mixture of polar compounds having positive dielectric anisotropy, comprising:

one or more compounds of formula I

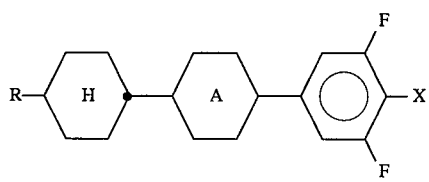

in which X is fluorine, chlorine, $CF_3$, $OCF_3$ or $OCHF_2$, ring A is trans-1,4-cyclohexylene or 1,4-phenylene, and R is alkyl, oxaalkyl, fluoroalkyl or alkenyl, in each case having up to 7 carbon atoms; and one or more compounds selected from formulae II, III and IV

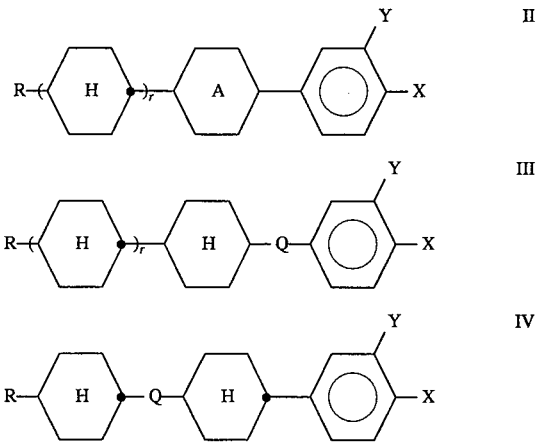

wherein

R is as defined above;

Q is $—C_2H_4—$, $—C_4H_8—$ or $—CO—O$;

X is as defined above;

Y is H or F;

ring A is as defined above; and r is 0 or 1;

further comprising one or more compounds selected from formulae V and VI:

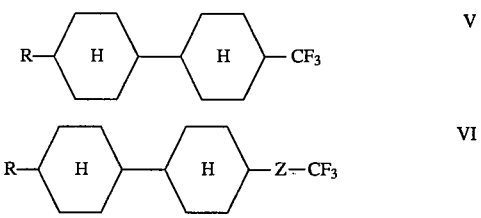

wherein

R is as defined above; and

Z is $—C_2H_4$, $—CO—O—$ or $—O—CO—$; and further comprising one or more compounds selected from formulae VII to XII:

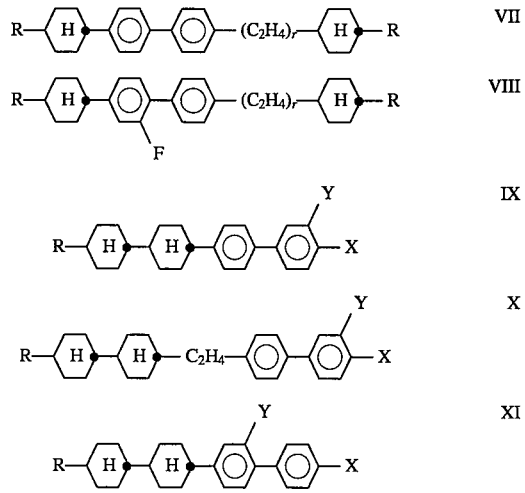

-continued
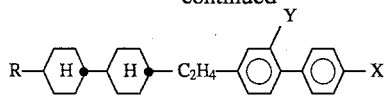
wherein
R, X, Y and r are as defined above.
23. A medium according to claim 22, wherein said medium consists essentially of compounds selected from formulae I, II, and IV–XII.
* * * * *